(12) United States Patent
Kawahara et al.

(10) Patent No.: US 7,412,153 B2
(45) Date of Patent: *Aug. 12, 2008

(54) INFORMATION RECORDING DEVICE AND METHOD, AND INFORMATION RECORDING SYSTEM

(75) Inventors: Minoru Kawahara, Kanagawa (JP); Noboru Yanagita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1157 days.

This patent is subject to a terminal disclaimer.

(21) Appl. No.: 10/070,239

(22) PCT Filed: Jul. 2, 2001

(86) PCT No.: PCT/JP01/05726

§ 371 (c)(1),
(2), (4) Date: Jun. 20, 2002

(87) PCT Pub. No.: WO02/01565

PCT Pub. Date: Jan. 3, 2002

(65) Prior Publication Data

US 2002/0181944 A1    Dec. 5, 2002

(30) Foreign Application Priority Data

Jun. 30, 2000    (JP)    ............... P2000-200372

(51) Int. Cl.
| | |
|---|---|
| H04N 7/26 | (2006.01) |
| H04N 5/91 | (2006.01) |
| G11B 27/00 | (2006.01) |
| G11B 5/02 | (2006.01) |
| G11B 15/14 | (2006.01) |
| G11B 5/027 | (2006.01) |
| G08B 13/14 | (2006.01) |

(52) U.S. Cl. ............ 386/111; 386/52; 386/64; 386/81; 386/95; 386/124; 340/572.1; 360/48; 360/55; 360/64; 360/84

(58) Field of Classification Search ............ 340/568.1, 340/572.1, 572.2, 572.7, 825.53; 348/239; 345/418; 386/46, 52, 56, 64, 69, 70, 81, 386/83, 95, 111, 124; 360/5, 8, 48, 55, 60, 360/64, 69, 84, 85

See application file for complete search history.

(56) References Cited

U.S. PATENT DOCUMENTS 4,175,267 A * 11/1979 Tachi .................. 386/12

(Continued)

FOREIGN PATENT DOCUMENTS

| | | |
|---|---|---|
| EP | 0 851 421 | 7/1998 |
| EP | 0 978 841 | 2/2000 |
| JP | 9-167473 | 6/1997 |
| JP | 9-171676 | 6/1997 |

(Continued)

OTHER PUBLICATIONS

J. H. Wilkinson, Sony BPE, U.K., Linking Essence and Metadata in a System Environment, Jul. 6, 1999, IEE NBSS.*

(Continued)

*Primary Examiner*—Thai Tran
*Assistant Examiner*—Syed Y Hasan
(74) *Attorney, Agent, or Firm*—Frommer Lawrence & Haug LLP; William S. Frommer; Thomas F. Presson

(57) ABSTRACT

In recording information, an SMPTE 339M-defined UMID buried in video and audio material signals to be recorded to a magnetic tape (30) or a UMID generated from information other than the material signals, is written to a contactless memory tag (37), whereby it is made possible to acquire a UMID for material signals recorded in the recording medium without having to actually read the material signals recorded in the recording medium and use the UMID for data search, validation, etc.

18 Claims, 59 Drawing Sheets

U.S. PATENT DOCUMENTS

| | | | | |
|---|---|---|---|---|
| 4,626,932 A | * | 12/1986 | Muller | 386/115 |
| 5,506,689 A | * | 4/1996 | Lim | 386/4 |
| 5,835,939 A | * | 11/1998 | Kurokawa et al. | 711/113 |
| 5,956,458 A | * | 9/1999 | Sezan et al. | 386/95 |
| 6,100,788 A | * | 8/2000 | Frary | 340/10.1 |
| 6,195,497 B1 | * | 2/2001 | Nagasaka et al. | 386/46 |
| 6,519,105 B1 | * | 2/2003 | Takayama | 360/55 |
| 6,611,394 B1 | * | 8/2003 | Kato et al. | 360/69 |
| 2002/0035664 A1 | * | 3/2002 | Yates et al. | 711/111 |

FOREIGN PATENT DOCUMENTS

| | | |
|---|---|---|
| JP | 10-240518 | 9/1998 |
| JP | 10-308088 | 11/1998 |

OTHER PUBLICATIONS

Wilkinson J H et al: "Tools and Techniques for Globally Unique Content Identification" SMPTE Journal, SMPTE Inc. Scarsdale, N.Y., US, vol. 109, No. 10, Oct. 2000, pp. 795-799, XP000969315 ISSN: 0036-1682.

* cited by examiner

| SMPTE label | | | | | | | | DESCRIPTION | Value Length | Value Range |
|---|---|---|---|---|---|---|---|---|---|---|
| 01 | 00 | 00 | 00 | 00 | 00 | 00 | 00 | CLASS 1 ID AND LOCATOR | | |
| 01 | 01 | 00 | 00 | 00 | 00 | 00 | 00 | GLOBALLY UNIQUE ID | | |
| 01 | 01 | 01 | xx | Null | Null | Null | Null | UMID VIDEO | | |
| 01 | 01 | 02 | xx | Null | Null | Null | Null | UMID AUDIO | | |
| 01 | 01 | 03 | xx | Null | Null | Null | Null | UMID DATA | | |
| 01 | 01 | 04 | xx | Null | Null | Null | Null | UMID SYSTEM | | |
| 01 | 01 | 10 | 00 | 00 | 00 | 00 | 00 | INTERNATIONAL BROADCASTING STATION ID | | |
| 01 | 01 | 10 | 01 | 00 | 00 | 00 | 00 | ORGANIZATION CATEGORY | 127 bytes max. | |
| 01 | 01 | 10 | 03 | 00 | 00 | 00 | 00 | PROGRAM ID | | |
| 01 | 01 | 10 | 03 | 01 | 00 | 00 | 00 | UPID | | |
| 01 | 01 | 10 | 03 | 02 | 00 | 00 | 00 | UPN | | |
| 01 | 01 | 10 | 04 | 00 | 00 | 00 | 00 | MEDIUM ID | | |
| 01 | 01 | 10 | 04 | 01 | 00 | 00 | 00 | SAME AS LINE 64 | | |
| 01 | 01 | 10 | 04 | 01 | 00 | 00 | 00 | EBU ID NO | | |
| 01 | 01 | 11 | 00 | 00 | 00 | 00 | 00 | ISO ID | | |
| 01 | 01 | 11 | 01 | 00 | 00 | 00 | 00 | ISO AUDIO VISUAL NO. | | |
| 01 | 01 | 11 | 02 | 00 | 00 | 00 | 00 | ISO BOOK NO. | | |
| 01 | 01 | 11 | 03 | 00 | 00 | 00 | 00 | ISO SERIAL NO. | | |
| 01 | 01 | 11 | 04 | 00 | 00 | 00 | 00 | ISO MUSICAL WORK CODE | | |
| 01 | 01 | 11 | 05 | 00 | 00 | 00 | 00 | ISO PRINTED MUSIC NO. | | |
| 01 | 01 | 11 | 06 | 00 | 00 | 00 | 00 | ISO COMMERCIAL ID | | |
| 01 | 01 | 11 | 07 | 00 | 00 | 00 | 00 | ISO RECORDING CODE | | |
| 01 | 01 | 11 | 08 | 00 | 00 | 00 | 00 | ISO REPORT NO. | | |
| 01 | 01 | 11 | 09 | 00 | 00 | 00 | 00 | ISO GLOSSARY | | |
| 01 | 01 | 11 | 0A | 00 | 00 | 00 | 00 | ISO TEXTUAL WORK CODE | | |
| 01 | 01 | 13 | 01 | 00 | 00 | 00 | 00 | DIGITAL OBJECT ID | | |
| 01 | 01 | 14 | 00 | 00 | 00 | 00 | 00 | COMPOSITE ID | | |
| 01 | 01 | 14 | 01 | 00 | 00 | 00 | 00 | SERIAL ITEM AND CONTRIBUTION ID | | |
| 01 | 01 | 14 | 02 | 00 | 00 | 00 | 00 | BOOK ITEM AND COMPONENT ID | | |
| 01 | 01 | 14 | 03 | 00 | 00 | 00 | 00 | AUDIO VISUAL ITEM AND COMPONENT ID | | |
| 01 | 01 | 14 | 04 | 00 | 00 | 00 | 00 | DESTINATION ID | | |
| 01 | 01 | 15 | 00 | 00 | 00 | 00 | 00 | SAME AS LINE 66 | | |
| 01 | 01 | 15 | 01 | 00 | 00 | 00 | 00 | INTERNET GLOBALLY UNIQUE ID | | |

FIG.4

| SMPTE label | | | | | | | | DESCRIPTION | Value Length | Value Range |
|---|---|---|---|---|---|---|---|---|---|---|
| 01 | 03 | 02 | 02 | 00 | 00 | 00 | 00 | SLOT ID | 4 bytes | |
| 01 | 03 | 02 | 03 | 00 | 00 | 00 | 00 | OBJECT TEXT ID | | |
| 01 | 03 | 02 | 03 | 01 | 00 | 00 | 00 | GROUP NAME | variable | |
| 01 | 03 | 02 | 03 | 02 | 00 | 00 | 00 | SLOT NAME | variable | |
| 01 | 03 | 02 | 03 | 03 | 00 | 00 | 00 | OBJECT NAME | variable | |
| 01 | 04 | 05 | 00 | 00 | 00 | 00 | 00 | LOCAL LOCATOR | | |
| 01 | 04 | 05 | 01 | 00 | 00 | 00 | 00 | LOCAL MEDIUM LOCATOR | | |
| 01 | 04 | 05 | 01 | 01 | 00 | 00 | 00 | LOCAL FILE PASS | 127 bytes max. | |
| 01 | 04 | 05 | 03 | 00 | 00 | 00 | 00 | FILM LOCATOR | | |
| 01 | 04 | 05 | 03 | 01 | 00 | 00 | 00 | EDGE CODE | 32 chars max. | |
| 01 | 04 | 05 | 03 | 02 | 00 | 00 | 00 | FRAME CODE | 32 chars max. | |
| 01 | 04 | 05 | 03 | 03 | 00 | 00 | 00 | KEY CODE | 4 bytes | |
| 01 | 04 | 05 | 03 | 04 | 00 | 00 | 00 | Ink NO | 32 chars max. | |
| 01 | 04 | 05 | 03 | 05 | 00 | 00 | 00 | SEGMENT START CODE | 8 bytes | |
| 01 | 04 | 10 | 00 | 00 | 00 | 00 | 00 | PROXY LOCATOR | | |
| 01 | 04 | 10 | 01 | 00 | 00 | 00 | 00 | PROXY TEXT | 127 bytes max. | |
| 01 | 04 | 10 | 02 | 00 | 00 | 00 | 00 | PROXY FRAME | 127 bytes max. | |
| 01 | 04 | 10 | 03 | 00 | 00 | 00 | 00 | PROXY SOUND | 127 bytes max. | |
| 01 | 04 | 10 | 04 | 00 | 00 | 00 | 00 | KEY DATA | 127 bytes max. | |
| 01 | 04 | 11 | 00 | 00 | 00 | 00 | 00 | HANDWRITE | | |
| 01 | 05 | 11 | 01 | 00 | 00 | 00 | 00 | HANDWRITTEN NAME | variable | |
| 01 | 05 | 01 | 00 | 00 | 00 | 00 | 00 | TITLE | | |
| 01 | 05 | 01 | 01 | 00 | 00 | 00 | 00 | TITLE TYPE | 127 bytes max. | |
| 01 | 05 | 01 | 02 | 00 | 00 | 00 | 00 | MAIN TITLE | 127 bytes max. | |
| 01 | 05 | 01 | 03 | 00 | 00 | 00 | 00 | SUB TITLE | 127 bytes max. | |
| 01 | 05 | 01 | 04 | 00 | 00 | 00 | 00 | SERIES NO. | 32 chars max. | |
| 01 | 05 | 01 | 05 | 00 | 00 | 00 | 00 | EPISODE NO. | 32 chars max. | |
| 01 | 05 | 01 | 06 | 00 | 00 | 00 | 00 | SCENE NO. | 32 chars max. | |
| 01 | 05 | 01 | 07 | 00 | 00 | 00 | 00 | TAKE NO. | 2 bytes | |
| 01 | 10 | 00 | 00 | 00 | 00 | 00 | 00 | OWNER | | |
| 01 | 10 | 01 | 00 | 00 | 00 | 00 | 00 | OWNER UNDER CISAC | | |
| 01 | 10 | 01 | 01 | 00 | 00 | 00 | 00 | CONTACT PERSON | | |
| 01 | 10 | 02 | 00 | 00 | 00 | 00 | 00 | ID UNDER AGICOA | | |

FIG.5

| SMPTE label | | | | | | | | DESCRIPTION | Value Length | Value Range |
|---|---|---|---|---|---|---|---|---|---|---|
| 04 | 01 | 01 | 00 | 00 | 00 | 00 | 00 | VIDEO'S BASIC CHARACTERISTIC | | |
| 04 | 01 | 01 | 01 | 00 | 00 | 00 | 00 | VIDEO SOURCE DEVICES AND APPARATUSES | 32 chars max. | |
| 04 | 01 | 01 | 02 | 00 | 00 | 00 | 00 | OE CONVERSION METHOD | | |
| 04 | 01 | 01 | 02 | 01 | 00 | 00 | 00 | GAMMA CHARACTERISTIC | | |
| 04 | 01 | 01 | 02 | 01 | 01 | 00 | 00 | GAMMA FORMULA | 4 chars max. | See types dictionary |
| 04 | 01 | 01 | 02 | 01 | 02 | 00 | 00 | GAMMA | 8 bytes | |
| 04 | 01 | 01 | 02 | 02 | 00 | 00 | 00 | BRIGHTNESS COMPUTATION | 4 chars max. | See types dictionary |
| 04 | 01 | 01 | 02 | 03 | 00 | 00 | 00 | COLORIMETRI CODE | 4 chars max. | See types dictionary |
| 04 | 01 | 01 | 03 | 00 | 00 | 00 | 00 | SCANNING INFORMATION | | |
| 04 | 01 | 01 | 03 | 01 | 00 | 00 | 00 | COMPONENT SEQUENCE | 4 chars max. | See types dictionary |
| 04 | 01 | 01 | 03 | 02 | 00 | 00 | 00 | COLOR FRAME INDEX | 1 bytes | 00h=default,01h-07h=field number |
| 04 | 01 | 01 | 03 | 03 | 00 | 00 | 00 | VERTICAL RATE | 1 bytes | See types dictionary |
| 04 | 01 | 01 | 03 | 04 | 00 | 00 | 00 | FRAME RATE | 1 bytes | See types dictionary |
| 04 | 01 | 01 | 04 | 00 | 00 | 00 | 00 | ASPECT RATIO | 1 bytes | See types dictionary |
| 04 | 01 | 01 | 00 | 01 | 00 | 00 | 00 | NO. OF LINES | | |
| 04 | 01 | 01 | 01 | 01 | 01 | 00 | 00 | TOTAL NO. OF LINES/FRAME | 2 bytes | |
| 04 | 01 | 01 | 02 | 01 | 02 | 00 | 00 | ACTIVE LINES/FRAME | 2 bytes | |
| 04 | 01 | 01 | 03 | 01 | 03 | 00 | 00 | LEADING EDGE | 4 bytes | |
| 04 | 01 | 01 | 04 | 01 | 04 | 00 | 00 | TRAILING EDGE | 4 bytes | |
| 04 | 01 | 01 | 04 | 02 | 00 | 00 | 00 | ASPECT RATIO STANDARD | | |
| 04 | 01 | 01 | 04 | 02 | 01 | 01 | 00 | ASPECT RATIO | | |
| 04 | 01 | 01 | 04 | 02 | 01 | 01 | 01 | IMAGE ASPECT RATIO | 1 bytes | |
| 04 | 01 | 01 | 04 | 02 | 01 | 01 | 02 | SAME AS ABOVE | 8 bytes | |
| 04 | 01 | 01 | 04 | 02 | 01 | 02 | 00 | ASPECT RATIO BY SENSOR | 1 bytes | See types dictionary |
| 04 | 01 | 01 | 04 | 02 | 02 | 00 | 00 | STORAGE HEIGHT | 4 bytes | |
| 04 | 01 | 01 | 04 | 02 | 03 | 00 | 00 | STORAGE WIDTH | 4 bytes | |
| 04 | 01 | 01 | 04 | 02 | 04 | 00 | 00 | SAMPLE HEIGHT | 4 bytes | |
| 04 | 01 | 01 | 04 | 02 | 05 | 00 | 00 | SAMPLE WIDTH | 4 bytes | |
| 04 | 01 | 01 | 04 | 02 | 06 | 00 | 00 | SAMPLE X OFFSET | 4 bytes | |
| 04 | 01 | 01 | 04 | 02 | 07 | 00 | 00 | SAMPLE Y OFFSET | 4 bytes | |
| 04 | 01 | 01 | 04 | 02 | 08 | 00 | 00 | DISPLAY HEIGHT | 4 bytes | |
| 04 | 01 | 01 | 04 | 02 | 09 | 00 | 00 | DISPLAY WIDTH | 4 bytes | |
| 04 | 01 | 01 | 04 | 02 | 0A | 00 | 00 | DISPLAY X OFFSET | 4 bytes | |

FIG.6

| Category | Data No. | Byte Count | Assignment |
|---|---|---|---|
| 1 | D0 --> D33 | 34 | Activity Map |
|  | D34 --> D35 | 2 | Reserved |
| 2 | D36 --> D39 | 4 | VITC TC |
|  | D40 --> D43 | 4 | VITC UB |
|  | D44 | 1 | Check Sum of VITC |
|  | D45 | 1 | Reserved |
| 3 | D46 --> D47 | 2 | REC ID |
|  | D48 --> D51 | 4 | Reserved |
| 4 | D52 --> D53 | 2 | Model Name |
|  | D54 --> D56 | 3 | VTR Serial No. |
|  | D57 | 1 | Destination |
| 5 | D58 --> D61 | 4 | Date of Recording |
| 6 | D62 | 1 | VTR status |
|  | D63 --> D67 | 5 | Reserved |
| 7 | D68 --> D125 | 58 | Reserved |
| 8 | D126 --> D169 | 44 | Meta-data |
| 9 | D170 --> D215 | 46 | Reserved |
| 10 | D216 | 1 | Not Used |

FIG.8

| Category | Assignment | Data No. | DESCRIPTION |
|---|---|---|---|
| 2 | VITC TC | D36 --> D39 | VITC TC data |
|  |  |  | D36:Frame D37:Second D38:Minute D39:Hour |
|  | VITC UB | D40 --> D43 | VITC TC data |
|  |  |  | D36:Frame D37:Second D38:Minute D39:Hour |
|  | Check SUM | D44 | VALUE RESULTED FROM INTEGRATION OF D36 TO D43 AND INVERSION OF INTEGRATED VALUE |
| 3 | REC_ID | D46,D47 | REC_ID=Sec+Min+Hour+0x0011 |
|  |  |  | +(VALUE RESULTED FROM LEFTWARD SHIFT BY 8 BITS OF FRAME COUNTER |
| 4 | Model Name | D52,D53 |  |
|  | VTR Serial No. | D54 --> D56 | Serial No. |
|  | Destination | D57 |  |
| 5 | Date of Recording | D58 --> D61 |  |
| 6 | VTR status | D62 | INFORMATION ON RECORDING FREQUENCY AND NUMBER OF LINES |
|  |  |  | B0:EXISTENCE OR ABSENCE OF 0.1% WITH RESPECT TO Frame FREQUENCY |
|  |  |  | 0:0.1% ON  1:0.1% OFF |
|  |  |  | B1:NUMBER OF VALID LINES |
|  |  |  | 0:1035  1:1080 |
|  |  |  | B2:SELECTION OF SDI OR SDTI |
|  |  |  | 0:SDI  1:SDTI(DUB) |
|  |  |  | B4,B3:Frame FREQUENCIES |
|  |  |  | 00:30Hz |
|  |  |  | 01:25Hz |
|  |  |  | 10:24Hz |
|  |  |  | B5:SELECTION OF Interlace OR PsF |
|  |  |  | 0:Interlace 1:PsF |
|  |  |  | RELATION BETWEEN B5,B4,B3 AND B0 AND SYSTEM FREQUENCY |
|  |  |  | B76543210 |
|  |  |  |    XX000XX0  59.94i |
|  |  |  |    XX000XX1  60i |
|  |  |  |    XX001XX1  50i |
|  |  |  |    XX100XX0  29.97PsF |
|  |  |  |    XX100XX1  30PsF |
|  |  |  |    XX101XX1  25PsF |
|  |  |  |    XX110XX0  23.98PsF |
|  |  |  |    XX110XX1  24PsF |

FIG.9

| Block No. | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0000 | Memory Management Table |||||||||||||||
| 0001 | Manufacture ID Table |||||||||||||||
| 0002 | Format Definition Table |||||||||||||||
| 0003 | Common Area |||||||||||||||
| nnnn | |||||||||||||||

FIG.12

| Offset Address (Byte) | | |
|---|---|---|
| 0 | Memory_size | 04h |
| 1 | (Hamming 8/4 code) | 00h |
| 2 | Manufacture_code MANUFACTURER | 03h |
| 3 | (Hamming 8/4 code) | 00h |
| 4 | Version VERSION | 01h |
| 5 | Lot_number | |
| 6 | | |
| 7 | Reserve 00h | 00h |
| 8 | Application_id APPLICATION (01h Read/Write Media) | 01h |
| 9 | (Hamming 8/4 code) | |
| 10 | Media_id LABEL SHAPE | 82h |
| 11 | (Hamming 8/4 code) | 00h |
| 12 | Application_id Dependent Field Reserve | 00h |
| 13 | | 00h |
| 13 | | 00h |
| 13 | | 00h |

FIG.13

| Offset Address | MSB 7 | 6 | 5 | 4 | 3 | 2 | 1 | LSB 0 |
|---|---|---|---|---|---|---|---|---|
| 0 | Reserve | \multicolumn{7}{c|}{Memory_size=(bit0~bit6)×256Bytes} |
| 1 | \multicolumn{8}{c|}{00h} |

FIG.14

| Offset Address | MSB 7 | 6 | 5 | 4 | 3 | 2 | 1 | LSB 0 |
|---|---|---|---|---|---|---|---|---|
| 5 | <Year> | | <Day> | | | <Month> | | |
| 6 | | | | | | | | UD |

FIG.15

| Offset Address (Byte) | | |
|---|---|---|
| 0 | VIDEO SOURCE DEVICE ID | 2 DIGITS (BCD) (VIDEO SOURCE DEVICE ID AT MANUFACTURER) |
| 1 | ID | HUNDRED THOUSANDS AND TEN THOUSANDS (BCD) |
| 2 | ID | THOUSANDS AND HUNDREDS (BCD) |
| 3 | ID Reserve | TENS AND ONES (BCD) |
| 4 | Reserve | Reserve 00h |
| 5 | (FIXED VALUE) | 7Fh,02h,00h,00h,01h,05h,20h,0FFh,0FFh,0FFh, 0FFh |
| 6 | | |
| 7 | | |
| 8 | | |
| 9 | | |
| 10 | | |
| 11 | | |
| 12 | | |
| 13 | | |
| 14 | | |
| 15 | | |

FIG.16

| Byte0 | Byte1 | Byte2 | Byte3 | Byte4 | Byte5 | Byte6 | Byte7 |
|---|---|---|---|---|---|---|---|
| Media_ID | Lot_Number | | | ID (Block #0001 byte0~byte4) | | | |

FIG.17

| MSB | | | | | | | | LSB |
|---|---|---|---|---|---|---|---|---|
| P1 | D1 | P2 | D2 | P3 | D3 | P4 | D4 |

FIG.18

$P1 = 1 \oplus D1 \oplus D3 \oplus D4$ $P2 = 1 \oplus D1 \oplus D2 \oplus D4$ $P3 = 1 \oplus D1 \oplus D2 \oplus D3$ $P4 = 1 \oplus P1 \oplus D1 \oplus P2 \oplus D2 \oplus P3 \oplus D3 \oplus D4$ $\oplus$ EXCLUSIVE OR

FIG.19

| HEX. | HAMMING BASE 8/4 BINARY |
|---|---|
| 0 | 10101000 |
| 1 | 00001011 |
| 2 | 00100110 |
| 3 | 10000101 |
| 4 | 10010010 |
| 5 | 00110001 |
| 6 | 00011100 |
| 7 | 10111111 |
| 8 | 01000000 |
| 9 | 11100011 |
| A | 11001110 |
| B | 01101101 |
| C | 01111010 |
| D | 11011001 |
| E | 11110100 |
| F | 01010111 |

FIG.20

| LOW | HIGH |
|---|---|
| 04h | 00h |

FIG.21

| Offset Address (Byte) | | |
|---|---|---|
| 0 | Keyword Code | KEY CODE FOR REWRITING BLOCK NO. 0002 |
| 1 | | FFh AND FEh FIXED VALUES |
| 2 | Application Name & Version | APPLICATION NAME |
| 12 | | |
| 13 | WriteProtect | 0:Write Enable 1:Write Disable |
| 14 | Country Number | COUNTRY NO. (BCD) EX. UNDEFINED 00h JAPAN 00h USA 00h |
| 15 | | 00h 81h 01h |

FIG.22

| Block No. | Address | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| #0003 | 0030 | < | | | | | | Cassette ID | | | | | | | | | |
| #0004 | 0040 | | | | > | < | | | | | | Data Base Key | | | | | |
| #0005 | 0050 | | | | | | | | > | < | | | | | | | > |
| #0006 | 0060 | | | | | | | Title | | | | | | | | | |
| #0007 | 0070 | | | | | | | Administrator | | | | | | | | | |
| #0008 | 0080 | | Serial No. | | | | | | | | | Model Name | | | | | |
| #0009 | 0090 | Pointer | EOSR_ID | RS | RT | EOS Point | | | | | Thread | | | Update | | |
| #000A | 00A0 | DataTOPP | FAT Definition | | | | Reserve | | | | | FQ | | | ADStatus | | |
| #000B | 00B0 | | | | | | | Data Area | | | | | | | | | |
| → | → | | | | | | | → | | | | | | | | | |
| → | → | | | | | | | → | | | | | | | | | |

FIG.23

| Byte0 | Byte1 | Byte2 | Byte3 |
|-------|-------|-------|-------|
| LL | LH | HL | HH (NUMBER OF SIGNIFICANT DIGITS) |

FIG.24

| BYTE0 | BYTE1 |
|-------|-------|
| L | H |
| Max. FFFFh ||

FIG.25

| MSB7 | 6 | 5 | 4 | 3 | 2 | 1 | LSB0 |
|---|---|---|---|---|---|---|---|
| NOT YET MEASURED | TOP/END | (N EOT) | END OF TAPE | CASSETTE SIZE 00:S, 01:M, 10:L | | Reserve | |

FIG.26

| TAPE STATUS | Bit6 | Bit4 |
|---|---|---|
| TOP | 0 | 1 |
| MIDDLE | 0 | 0 |
| END | 1 | 1 |

FIG.27

|  | MSB 7 | 6 | 5 | 4 | 3 | 2 | 1 | LSB 0 |
|---|---|---|---|---|---|---|---|---|
| DATA-1 | CF | DF | 10F | | | 1F | | |
| DATA-2 | | | 10S | | | 1S | | |
| DATA-3 | | | 10M | | | 1M | | |
| DATA-4 | | | 10H | | | 1H | | |

FIG.28

| Block No. | Address | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| #0009 | 0090 | 00 | 06 | 00 | 00 | 00 | 00 | 00 | 00 | 00 | 00 | 07 | 00 | 19 | 98 | 05 | 06 |
| #000A | 00A0 | 00 | 00 | 00 | 00 | 00 | 00 | 00 | 00 | 00 | 00 | 00 | 00 | 00 | 00 | 00 | 00 |
| #000B | 00B0 | 01 | 00 | 15 | 59 | 59 | 23 | 00 | 00 | 00 | 00 | 00 | 00 | 00 | 00 | 00 | 00 |

FIG.30

| Offset Address | MSB 7 | 6 | 5 | 4 | 3 | 2 | 1 | LSB 0 |
|---|---|---|---|---|---|---|---|---|
| 0 | Reserved | | | | | | Pscked FAT Count | |
| 1 | Stored FAT Count (LOWER 8 bits) | | | | | | | |
| 2 | Stored FAT Count (UPPER 8 bits) | | | | | | | |

FIG.32

| MSB7 | 6 | 5 | 4 | 3 | 2 | 1 | LSB0 |
|---|---|---|---|---|---|---|---|
| Interlace Mode | Reserve | Recording Bit Rate | | | Recording Video Frequency | | |

FIG.33

| Offset Address | MSB 7 | 6 | 5 | 4 | 3 | 2 | 1 | LSB 0 |
|---|---|---|---|---|---|---|---|---|
| 0 | AUDIO Status(CH-2) | | | | AUDIO Status(CH-1) | | | |
| 1 | AUDIO Status(CH-4) | | | | AUDIO Status(CH-3) | | | |
| 2 | AUDIO Status(CH-6) | | | | AUDIO Status(CH-5) | | | |
| 3 | AUDIO Status(CH-8) | | | | AUDIO Status(CH-7) | | | |

FIG.34

| Block No. | Address | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| #000B | 00B0 | < | Extended Area Format ID | | | | | | | | Format Version | | | | | | |
| #000C | 00C0 | Reel Name | | | | | | | | EDL File Name | | | | | | | |
| #000D | 00D0 | Stocked Floor No. | | Stocked Shelf No. | | | | | | Stocked Step No. | | | | Stocked Position | | | |
| #000E | 00E0 | | | | | | | | Reserve | | | | | | | | |
| #000F | 00F0 | | | | | | | | Reserve | | | | | | | | |
| #0010 | 0100 | V | | | | | | | | Comment | | | | | | | |
| #0011 | 0110 | | | | | | | | | | | | | | | | |
| #0012 | 0120 | | | | | | | | | ∨ | | | | | | | |
| #0013 | 0130 | | | | | | | | → | → | | | | | | | |
| → | → | | | | | | | | | | | | | | | | |

| Status | CUE Point | IN Point | OUT Point | Scene No. | Cut No. | Take No. | Re-Served | Real Time | Date | UMID | Additional Information |
|---|---|---|---|---|---|---|---|---|---|---|---|
| 2 | 4 | 4 | 4 | 3 | 4 | 1 | 1 | 4 | 4 | Max.53 | ARBITRARY (Bytes) |

Bit NOS.15 14 13,...,0

FIG.37

| Status | CUE DATA |
|---|---|
| 01h | 00h |

| Status | | CUE DATA | | | | IN DATA | | | | | OUT DATA | | | |
|---|---|---|---|---|---|---|---|---|---|---|---|---|---|---|
| 07h | 00h | | | | | | | | | | | | | |

FIG.38

| Classification | Flow/Mode/ DataSize (UPPER) | DataSize (LOWER) | Data |
|---|---|---|---|

FIG.39

|  | MSB 7 | 6 | 5 | 4 | 3 | 2 | 1 | LSB 0 |
|---|---|---|---|---|---|---|---|---|
| Classifi-cation | Classification+0 | | | | | | | |
| Classifi-cation+N | | | | | | | | |
| Flow/Mode /Data B.C. | Delimiter 1:Limit | Flow | | Mode | | Data Byte Count (UPPER 4 Bits) | | |
| Data B.C. | Data Byte Count (LOWER 8 Bits) | | | | | | | |
|  | Data0<br>...<br>DataN | | | | | | | |

FIG.40

| Time Snap(data omitted) | | | | Rnd | |
|---|---|---|---|---|---|
| Frame | Second | Minute | Hour | Lower | Upper |

FIG.42

| Universal Label | Instance Number | | | Time Snap (8 Bytes) | | | | | | | Material Number (16 Bytes) | | | | | | | | |
|---|---|---|---|---|---|---|---|---|---|---|---|---|---|---|---|---|---|---|
| | | | | | | | | | | | | Rnd | | Machine Node (6 Bytes) | | | | |
| 11th | 12th | low | mid | up | Frame | Sec | Min | Hour | MJDl | MJDm | MJDu | Tzone | Low | up | 1st | 2nd | 3rd | 4th | 5th | msd |
| 0 | 1 | 2 | 3 | 4 | 5 | 6 | 7 | 8 | 9 | 10 | 11 | 12 | 13 | 14 | 15 | 16 | 17 | 18 | 19 | 20 |

FIG.43

| U.L. 12,3 | Instance Number | Basic UMID(21 Bytes) | | | | | | Signature Metadata(32 Bytes) | | | | | |
|---|---|---|---|---|---|---|---|---|---|---|---|---|---|
| | | Material Number (16) | | | Time/Data stamp(8) | | Spatial coordinate(12) | | | Country Code | Organization | User Code |
| | | Time Snap (8) | Rnd | Machine Node (6) | Time | Data | Altitude | Longitude | Latitude | | | |
| 0 | 5 | 10 | 15 | 20 | | 25 | 30 | 35 | 40 | 45 | 50 |

| 01 10 | 00 30 58 00 | 4D 80 0B | 04 01 01 03 04 00 00 00 | 01 1E |
| 01 10 | 00 00 00 01 | 4D 80 16 | 01 05 01 02 00 00 00 00 | 0D 54 68 65 20 | ... |
| 01 10 | 00 00 05 01 | 4D 80 14 | 01 05 01 03 00 00 00 00 | 0B 41 70 70 6C | ... |
| 01 00 | 00 00 10 01 | | | |

FIG.49

| Flag1 [bit2,1] | Universal Label(12 Bytes) | | | | | | | | | | | | L | Instance | Time Snap(8 Bytes) | | | | | | | | RND | Machine Node(6 Bytes) | | | | | | Signature Meta |
|---|---|---|---|---|---|---|---|---|---|---|---|---|---|---|---|---|---|---|---|---|---|---|---|---|---|---|---|---|---|---|
| Least [01] | #06 | #0A | #2B | #34 | #01 | #01 | #01 | #01 | #01 | #01 | #01 | p | (p) | p p | p | | | | | | | | | | | | | | | |
| Basic [10] | #06 | #0A | #2B | #34 | #01 | #01 | #01 | #01 | #01 | #01 | #01 | #01 | #13 | | | | | | | | | | | | | | | | | | |
| extended [11] | #06 | #0A | #2B | #34 | #01 | #01 | #01 | #01 | #01 | #01 | #01 | #01 | #33 | p p | p | p | p | p | p | p | p | p | | p | p | p | p | p | p | p for Extended |

FIG.50

```
3FF  000  000  2D8                          ...EAV
000  3FF  2F0  101  120                     ...ANC for Meta-data, data count=32
206  10A  22B  134  101  101  101  101  104  211   ...universal label
113                                         ...length
200  200  200                               ...instance
129  152  259  110  295  244  205  197      ...time snap
1DF  13D                                    ...random
189  227  200  102  104  143                ...machine node
```

FIG.51

| | | |
|---|---|---|
| 3FF 000 000 2AC | | ...SAV |
| 000 3FF 3FF 2F0 101 14C | | ...ANC for Meta-data, data count=76 |
| 206 10E 22B 134 101 101 101 101 205 101 102 200 200 200 | | |
| 10D 154 168 265 120 154 265 26C 265 22D 146 269 26C 265 | | ...main title |
| 206 10E 22B 134 101 101 101 101 205 101 203 200 200 200 | | |
| 10B 241 170 170 26C 269 263 161 274 269 26F 16E | | ...sub title |
| 206 10E 22B 134 101 101 101 101 104 101 203 104 200 200 200 | | |
| 101 21E | | ...frames |

FIG.52

| TAPE ID | TITLE | INTENDED USE | NUMBER OF THREADED TIMES | JUDGE | COMMENT |
|---|---|---|---|---|---|
| HD-10001 | FROM SOUTHERN COUNTRY | LIBRARY | 6 | EXCELLENT | |
| D2-22029 | OSAKA KIN-YU-DO | DRAMA | 20 | FAIR | |
| SX-23478 | "MIMI-NO-KUNI" WORDS OF PRIME MINISTER HAYASHI | SHARING | 100 | NOT FAIR | TO BE VOIDED ON JUNE 19, 2000 |
| IMX-67870 | K2 GRAND PRIX | SHARING | 20 | GOOD | |

FIG.56

INFORMATION RECORDING DEVICE AND METHOD, AND INFORMATION RECORDING SYSTEM

TECHNICAL FIELD

The present invention relates to an information recording apparatus and method, and to an information recording system, adapted to record unique identification information associated with informative material signals to be recorded to various types of removable recording media.

BACKGROUND ART

Heretofore, ISO (International Organization for Standardization)/SMPTE (Society of Motion Picture and Television Engineers) has provided some standards for digital video signals. Of the standards, SMPTE 330M defines globally unique IDs called UMID (unique master identifier) as IDs allocated to video and audio material signals, respectively.

Since the UMID is basically a data piggybacked on material signals such as video and audio signals, however, in case the video and audio material signals are recorded in a recording medium for example, the UMID cannot be read unless the material signals are reproduced from the recording medium. Therefore, the UMID can only be applied in a limited range.

That is, the UMID is a key for tracking, searching or collating material signals such as video and audio signals. When the recording medium having material signals recorded therein is for example a removable-type one whose location is unknown, however, it will take a long time, or it will be substantially impossible, to search the material signals recorded in the recording medium.

Also since the UMID has a unique value for each clip, in case the recording medium is a cassette tape capable of a longtime recording, the UMID is of tens kilobytes per tape roll. Therefore, for recording a UMID to a medium of a small recording capacity, for transmission of a UMID over a transmission line of a small transmission capacity or for using a UMID with an analog apparatus, the required amount of information for the UMID should desirably be reduced.

DISCLOSURE OF THE INVENTION

Accordingly, the present invention has an object to overcome the above-mentioned drawbacks of the prior art by providing an information recording apparatus and method, and also an information recording system, capable of reading a UMID without actually playing a recording medium, and effectively using the UMID for searching and validating a desired data.

The above object can be attained by providing an information recorder comprising means for extracting a predetermined standard-defined UMID buried in material signals to be recorded to a replaceable recording medium, and means for writing/reading information to/from a contactless information storage means appended to or incorporated in the replaceable recording medium and which is operative responsively to an electromagnetic field to send or receive information in a contactless manner to or from outside via the electromagnetic field; the writing/reading means writing the UMID extracted by the extracting means to the contactless information storage means.

Also, the above object can be attained by providing an information recording method comprising steps of extracting a predetermined standard-defined UMID buried in material signals to be recorded to a replaceable recording medium, and writing/reading information to/from a contactless information storage means appended to or incorporated in the replaceable recording medium and which is operative responsively to an electromagnetic field to send or receive information in a contactless manner to or from outside via the electromagnetic field; the extracted UMID being written to the contactless information storage means.

Also, the above object can be attained by providing an information recorder comprising means for generating, from information other than material signals to be recorded to a replaceable recording medium, a UMID indicating the material signals, and means for writing/reading information to/from a contactless information storage means appended to or incorporated in the replaceable recording medium and which is operative responsively to an electromagnetic field to send or receive information in a contactless manner to or from outside via the electromagnetic field; the writing/reading means writing the generated UMID to the contactless information storage means.

Also, the above object can be attained by providing an information recording method comprising steps of generating, from information other than material signals to be recorded to a replaceable recording medium, a UMID indicating the material signals, and writing/reading information to/from a contactless information storage means appended to or incorporated in the replaceable recording medium and which is operative responsively to an electromagnetic field to send or receive information in a contactless manner to or from outside via the electromagnetic field; the generated UMID being written to the contactless information storage means.

Also, the above object can be attained by providing an information recording system comprising means for writing/reading information to/from a contactless information storage means appended to or incorporated in the replaceable recording medium and which is operative responsively to an electromagnetic field to send or receive information in a contactless manner to or from outside via the electromagnetic field, an information recorder for writing, to the contactless information storage means by the writing/reading means, a UMID extracted from material signals to be recorded and indicating the material signals recorded to the recording medium or a UMID generated from information other than the material signals to be recorded to the recording medium and indicating the material signals, and a UMID storage unit for storing a UMID read from the contactless information storage means appended to or incorporated in each of a plurality of recording mediums.

Also, the above object can be attained by providing an information recording method comprising steps of writing a UMID extracted from material signals to be recorded and indicating the material signals or a UMID generated from information other than the material signals to be recorded to the recording medium and indicating the material signals to a contactless information storage means appended to or incorporated in the replaceable recording medium and which is operative responsively to an electromagnetic field to send or receive information in a contactless manner to or from outside via the electromagnetic field, and storing the UMID read from the contactless information storage means appended to or incorporated in each of a plurality of recording mediums.

BRIEF DESCRIPTION OF THE DRAWINGS

FIG. 4 illustrates a part of the meta data defined in SMPTE 298M and 335M.

FIG. 5 illustrates another part of the meta data defined in SMPTE 298M and 335M.

FIG. 6 illustrates a still another part of the meta data defined in SMPTE 298M and 335M.

FIG. 8 explains the format of Aux sync block in a high-definition video signal recording VTR.

FIG. 9 explains in detail the categories 2 to 6 in FIG. 8.

FIG. 12 outlines the memory map in a semiconductor memory in the contactless memory tag.

FIG. 13 outlines the memory management table area in a block No. 0000h of the memory map.

FIG. 14 explains in detail the lot number at byte Nos. 0h and 1h in the block No. 0000h of the memory map.

FIG. 15 explains in detail the lot number at byte Nos. 5h and 6h in the block No. 0000h of the memory map.

FIG. 16 outlines the manufacture ID table in the block No. 0001h of the memory map.

FIG. 17 explains in detail the label ID.

FIG. 18 explains the hamming 8/4 code.

FIG. 19 explains the generation of the protection bit and data for the hamming 8/4 code.

FIG. 20 shows the conversion table of the correspondence between hexadecimal numbers and hamming 8/4 codes (binary numbers), to which reference is made for checking the conversion of the hamming 8/4 code.

FIG. 21 shows data of the hamming 8/4 code, seen from outside the controller.

FIG. 22 outlines the format definition table area in the block No. 0002h of the memory map.

FIG. 23 explains in detail the common area at the block No. 0003h and subsequent blocks of the memory map.

FIG. 24 explains the serial number expressed with 4 bytes (Nos. 0h to 3h) in the block No. 0008h of the memory map.

FIG. 25 explains the pointers at the byte Nos. 0h and 1h and ID number (EOSR-ID) at the byte Nos. 2h and 3h in the block No. 0009h of the memory map.

FIG. 26 explains the remain status (RS) described at the byte No. 4h in the block No. 0009h of the memory map.

FIG. 27 explains bit Nos. 6 and 4 of the remain status (RS).

FIG. 28 explains the time code (Time Data) indicating the end of recording (EOS point) at the bit Nos. 6 to 9 in the block No. 0009h of the memory map.

FIG. 30 explains an example of setting of the blocks No. 0009h to 000Bh of the memory map.

FIG. 32 explains the file allocation table definition (FAT definition) at the byte Nos. 2h to 4h in the block No. 000Ah of the memory map.

FIG. 33 explains the field frequency (FQ) at a byte No. Bh in the block No. 000Ah of the memory map.

FIG. 34 explains the audio status at byte Nos. Ch to Fh in the block No. 000Ah of the memory map.

FIG. 35 explains the extended common area management table.

FIG. 36 explains the data format of the cue point indicating one clip area.

FIG. 37 explains the data structure of which two status bytes, namely, Nos. are 01h and 00h.

FIG. 38 explains the data structure of which two status bytes, namely, Nos. 07h and 00h.

FIG. 39 explains the data format of additional information of which 12th status bit is "1".

FIG. 40 explains in detail the additional information.

FIG. 42 explains the time snap of material number.

FIG. 43 explains the basic UMID of 21 bytes, assembled in the embodiment of the present invention.

FIG. 44 explains the basic UMID and signature meta data, assembled in the embodiment of the present invention.

FIG. 48 shows the byte string of 3 types of meta data whose declarations are omitted in the embodiment of the present invention.

FIG. 49 shows in detail the byte string of the meta data about the number of frames, title and subtitle.

FIG. 50 shows the reconstitution table used for reconstitution of normal UMID defined in SMPTE from UMID read from the contactless memory tag.

FIG. 51 explains UMID placed at EAV (end of active video) just before the 10th line of SDI Y channel of the high-definition video.

FIG. 52 explains the meta data indicative of a title placed at SAV (start of active video) of the 10th line of SDI Y channel of the high-definition video.

FIG. 56 illustrates the management table used for management of cassettes.

BEST MODE FOR CARRYING OUT THE INVENTION

The preferred embodiments of the present invention will be described herebelow with reference to the accompanying drawings.

Figure 1:
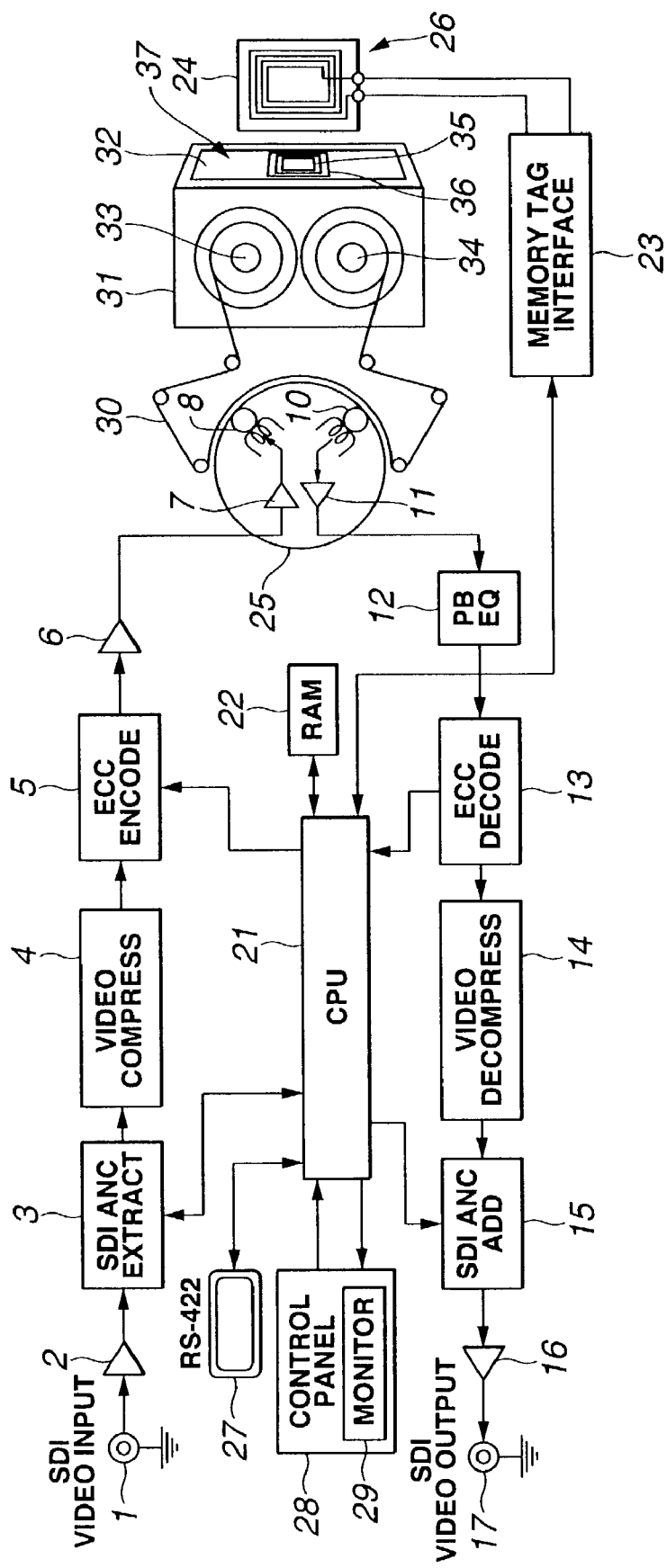
FIG. 1 is a block diagram of a VTR as one embodiment of the present invention.

Referring now to FIG. 1, there is schematically illustrated a video tape recorder (will be referred to as "VTR" hereunder) as the first embodiment of the present invention to write and read high-definition digital video signals.

As shown, the VTR is supplied at a video input terminal 1 thereof with video signals (e.g., 1080/60 interlaced video signals) sent in the form of SDI (serial digital data interface) ANC (ancillary) data packet from a video camera or the like for example. The video signals are amplified by an input amplifier 2 and supplied to an ANC extract integrated circuit (IC) 3. The video signals provided by the SID ANC extract IC 3 are sent along the main line to a video compression circuit 4. Note that the SDI ANC data packet will further be described later.

The video compression circuit 4 compresses the video signals to about 1/7 in amount of information by a predetermined compression coding method. The video signals compressed in the video compression circuit 4 are sent to an ECC (error correcting code) encoder 5.

The ECC encoder 5 adds an error correcting code to the compressed video signals. The output from the ECC encoder 5 is supplied to a recording signal processing circuit 6 where the data is modulated and controlled in gain for the purpose of recording, and then amplified in a recording amplifier 7, and sent to a write head 8 provided on the outer surface of a rotating drum 25.

There is wound on the rotating drum 25 at a predetermined angle of contact and with a constant tension a magnetic tape 30 led out from inside the cassette body of a video cassette 31 (the video cassette will be referred to simply as "cassette" and the cassette body be referred to as "cassette half" hereunder) by a tape loading mechanism (not shown). Further, the rotating drum 25 is driven to rotate at a predetermined speed by a drum drive motor (not shown). The magnetic tape 30 is caused to run at a predetermined speed by a supply reel 33 and take-up reel 34, driven by a reel motor (not shown) and a capstan motor (not shown). In the magnetic recording mechanism thus constructed, the write head 8 will write the signals to the magnetic tape 30 by a so-called helical scan.

Next, playback of signals recorded on the magnetic tape will be described. As in the above, the magnetic tape 30 is wound on the rotating drum 25 at the predetermined angle of contact and with the constant tension. As the rotating drum 25 is driven to rotate at the predetermined speed and the magnetic tape 30 is thus caused to run at the predetermined speed, a read head 10 provided also on the outer surface of the rotating drum 25 will read signals from the magnetic tape 30 by the so-called helical scan.

The signals read by the read head 10 from the magnetic tape 30 are amplified by a playback amplifier 11, equalized in waveform and demodulated in a playback equalizer 12, and sent to an ECC decoder 13.

The ECC decoder 13 uses the error correction code added to the signals from the playback equalizer 12 to make error correction of the signals, and sends the error-corrected signals (compression-coded video signals) to a video decompression circuit 14.

The video decompression circuit 14 uses a decompression-decoding method corresponding to the compression-coding method adopted in the video compression circuit 4 to expand the compression-coded video signals to the original video signals (e.g., 1080/60 interlaced video signals). The decompression-decoded video signals are sent to an SDI ANC addition circuit 15 which will further be described later.

The decompression-decoded video signals are converted to SDI serial data in the SDI ANC addition circuit 15, amplified by an output amplifier 16 and delivered at a video output terminal 17.

Note that no audio signal processing system is shown in FIG. 1 but the audio signals are time division-multiplexed with the video signals, recorded by the write head 8 on the rotating drum 25 to the magnetic tape 30 or read by the read head 10 also on the rotating drum 25 from the magnetic tape 30.

Also, there is attached on the cassette half of the cassette 31 in this embodiment a label 32 to which a title of content, for example, recorded in a magnetic tape is written by handwriting, printing or the like. The label 32 is not shown in detail in FIG. 1 but it has provided therein an IC chip 35 incorporating a semiconductor memory needing no record holding operation and which is rewritable, such as EEPROM (electrically erasable and programmable ROM), power rectifier/stabilizer, modem and a communication analyzer, and a contactless memory tag 37 incorporating a coil antenna 36 for electromagnetic power supply and signal transmission/reception, etc.

The contactless memory tag 37 has at least 3 functions as follows:

The first function is to provide an energy by electromagnetic coupling between a coil antenna 24 provided in the reader/writer 26 which is a dedicated writing/reading unit and the coil antenna 36 incorporated in the tag 37. The second function is to receive a write command and data and write the data to the semiconductor memory in the IC chip 35 in response to the write command, and the third one is to read data from the semiconductor memory in response to a received read command and send back the read data by the electromagnetic coupling.

As shown in FIG. 1, the reader/writer 26 is incorporated in the VTR and includes mainly the coil antenna 24 for electromagnetic coupling with the coil antenna 36 included in the contactless memory tag 37 provided in the label 32, and an interface unit 23 dedicated for sending commands to, and for sending and receiving data to and from the contactless memory tag 37. The interface unit 23 in the reader/writer 26 cooperates with the coil antenna 24 to supply a power to the contactless memory tag 37. Also, to write data to the contactless memory tag 37, the interface unit 23 modulates the write command and to-be-written data supplied from a CPU (central processing unit) 21 and sends the modulated command and data to the contactless memory tag 37. On the other hand, to read data from the contactless memory tag 37, the interface unit 23 modulates the read command supplied from the CPU 21 and sends the command to the contactless memory tag 37, and demodulates data read and sent back from the contactless memory tag 37 in response to the read command and sends the demodulated data to the CPU 21. Note that the contactless memory tag 37 and reader/writer 26 will further be described later.

The VTR, the first embodiment of the present invention, is designed to write/read meta data, as defined in SMPTE 298M and 335M for example, about video signals to be recorded to, or recorded in, the magnetic tape 30, such as information indicative of the attributes and contents, storage location, size, etc. of the video signals, along with the video signals. Note that the meta data defined in SMPTE 298M and 335M will further be described later.

Figure 2:
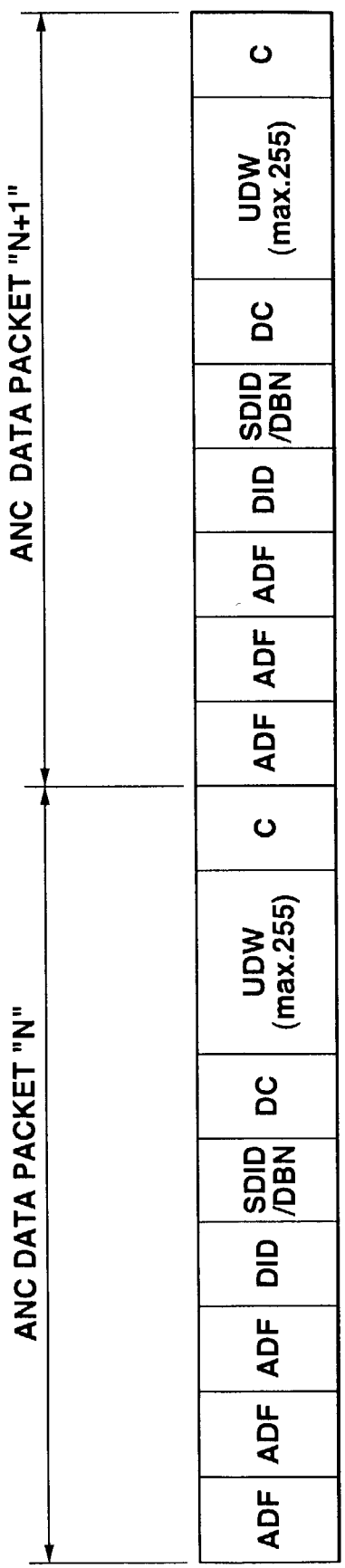
FIG. 2 explains the format of component ANC data packet.
Figure 3:
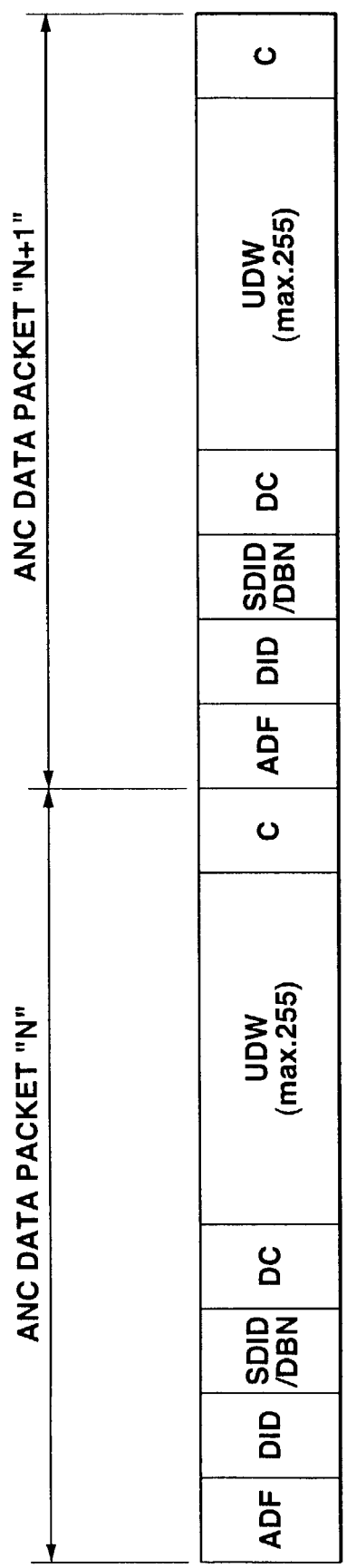
FIG. 3 explains the format of composite ANC data pattern.

In case the input video signals supplied to the video input terminal 1 have meta data piggybacked thereon, the meta data have been piggybacked in the form of SDI ANC packet shown in FIG. 2 or 3. Note that FIG. 2 shows the format of a component ANC data packet while FIG. 3 shows the format of a composite ANC data packet. As shown in FIG. 2, the component ANC data packet consists of ANC data flags (ADF) for 3 words, data ID (DID), secondary data ID (SDID) or data block number (DBN), data count (DC), user data word (UDW) of a maximum of 255 words, and a check sum (C). ADF indicates the beginning of the ANC data packet, and DID defines whether or not a subsequent data format is a type 1 consisting of a data block number (DBN) and data count (DC) or type 2 consisting of a secondary data ID (SDID) and data count (DC). As shown in FIG. 3, the composite ANC data packet consists of an ANC data flag (ADF) for 1 word, data ID (DID), secondary data ID (SDID) or data block number (DBN), data count (DC), user data word (UDW) and a check sum (C).

In these ANC data packets, the meta data is stated in the user data word (UDW). Note that the meta data will not be described in detail herein because it is defined in SMPTE 298M and 335M. As examples of the meta data defined in SMPTE 298M and 335M, meta data as shown in FIGS. 4 to 6 may be presented. Note that the meta data shown in FIGS. 4 to 6 form only a part of those defined in SMPTE 298M and 335M. As shown in FIGS. 4 to 6, SMPTE 298M and 335M define meta data as a KLV value consisting mainly of an SMPTE label as a key, Length indicating a data length and Value indicating the data content. These meta data include various pieces of information about video and audio materials such as a title, title type, main title, sub title and miscellaneous as well as various kinds of data used during an edition which will further be described later, such as series No., episode No., scene No., take No., video source device or apparatus, etc.

In the SDI ANC extract IC 3 shown in FIG. 1, the meta data is extracted from the user data word (UDW) in the ANC packet data as shown in FIGS. 2 and 3. The meta data extracted by the SDI ANC extract IC 3 is sent to the CPU 21 under which they will stored in a RAM 22.

Also, there will be processed, converted or combined as necessary and written as meta data to the RAM 22 information supplied from an external input terminal, information supplied from various accessory devices and apparatuses, information about the VTR in consideration, such as model name, serial number, etc., information such as current date and time basically generated by the CPU 21, information entered by the user operating a control panel 28 provided on the front panel or the like of the VTR. When meta data is supplied directly from an RS-422 terminal 27 as information in the RS-422 format for example, it will also be written to the RAM 22 via the CPU 21.

Further, information already written to the contactless memory tag 37 provided in the label 32 and read from the contactless memory tag 37 is also written to the RAM 22 via the CPU 21. That is, the label 32 incorporating the contactless memory tag 37 is previously attached to the cassette half of a virgin cassette, namely, a video cassette having a virgin recording tape. In case the semiconductor memory in the contactless memory tag 37 has already stored therein information such as titles and recording parameters, various ID codes of materials such as images and sounds recorded to the virgin recording tape, the reader/writer 26 will read the information from the semiconductor memory of the contactless memory tag 37, and write the information to the RAM 22.

Thus, in the above first embodiment of the present invention, all information about images and sounds recorded in the magnetic tape 30 in the cassette 31 will be once stored in the RAM 22. Data can be written to the RAM 22 in various formats. The formats may include the meta data itself as defined in SMPTE 298M and 335M, data derived from conversion or processing of the original data, etc.

Figure 7:
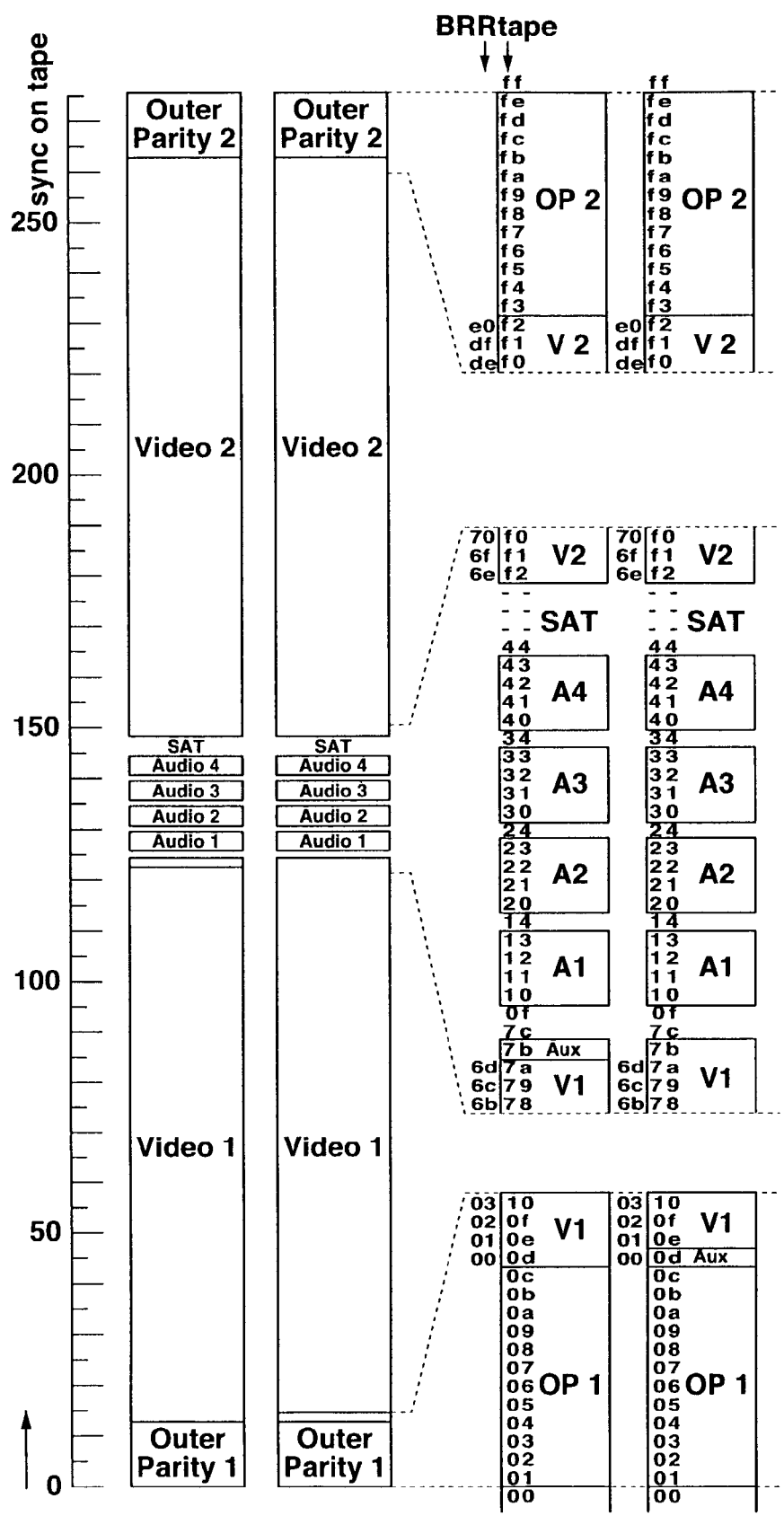
FIG. 7 explains video and audio data formats and Aux sync block.

The above information (meta data) stored in the RAM 22 is arranged therein by the CPU 21, and then sent to the ECC encoder 5, buried in the Aux sync block in the video and audio data recording format as shown in FIG. 7, and recorded to the magnetic tape 30 by the write head 8 similarly to the video and audio signals. Note that since the video and audio data recording format shown in FIG. 7 is for one track on the magnetic tape 30 and well known, it will not be described in further detail. The Aux sync block is placed between Video 1 and Outer parity 1 as shown in FIG. 7.

A format of the Aux sync block in the high-definition video signal recording VTR is defined as shown by way of example in FIGS. 8 and 9. Since these Aux sync block formats are well known, they will not be described any more. The meta data is written in an area of 44 bytes from Data No. D126 to D169 in Category 8 as shown in FIG. 8. Also, a model name is written at Data Nos. D52 and D53 in Category 4, a serial number is written at Data Nos. D54 to D56 in Category 4, a recording date is written at Data Nos. D58 to D61 in Category 5, and VTR status information such as a recording frequency, number of valid lines, etc. is written at Data No. D62 in Category 6.

Meta data and other necessary information (e.g., other information recorded in the Aux sync block) already recorded in the magnetic tape 30 are read by the read by the read head 10, arranged in the RAM 22 by the CPU 21, and then written to the semiconductor memory in the contactless memory tag 37 provided in the label 32 via the coil antenna 24 of the reader/writer 26.

To read the meta data from the magnetic tape 30, the ECC decoder 13 will extract the meta data about the signals read from the magnetic tape 30 by the read head 10 and which is buried in the Aux sync block, and send them to the CPU 21 where the meta data is once stored into the RAM 22.

On the other hand, to read the meta data recorded in the semiconductor memory of the contactless memory tag 37 in the label 32, the reader/writer 26 will read the meta data from the contactless memory tag 37, and store it once into the RAM 22 via the CPU 21.

To output the information (meta data) stored in the RAM 22 as piggybacked on for example video signals, the CPU 21 will arrange the meta data in the RAM 22, and then the SDI ANC addition circuit 15 will piggyback the meta data on the video signals in the form of the SDI ANC packet. Also, to output the information (meta data) stored in the RAM 22 directly from the RS-422 terminal 27, the CPU 21 will arrange the meta data in the RAM 22 and then deliver the meta data at the RS-422 terminal 27.

The embodiment will further be described herebelow. For edition of the data for example, cue points based on time code data for example, included in the meta data stored in the RAM 22, are displayed, as necessary, in the form of a cue points list on a monitor 29 provided on the control panel 28. At this time, the user operates the control panel 28 to select and cue up arbitrary time code data in the cue points list displayed on the monitor 29, and then operates a jog dial (not shown) on the control panel 28 to locate the time code data. Further, when commands for login and logout are given from the control panel 28, the time code data to log in and out are written to the RAM 22 via the CPU 21. The time code data is arranged for example in the RAM 22 by the CPU 21 in response to the operation of the control panel 28 by the user, and written to the contactless memory tag 37 via the interface unit 23 and coil antenna 24.

Figure 10:
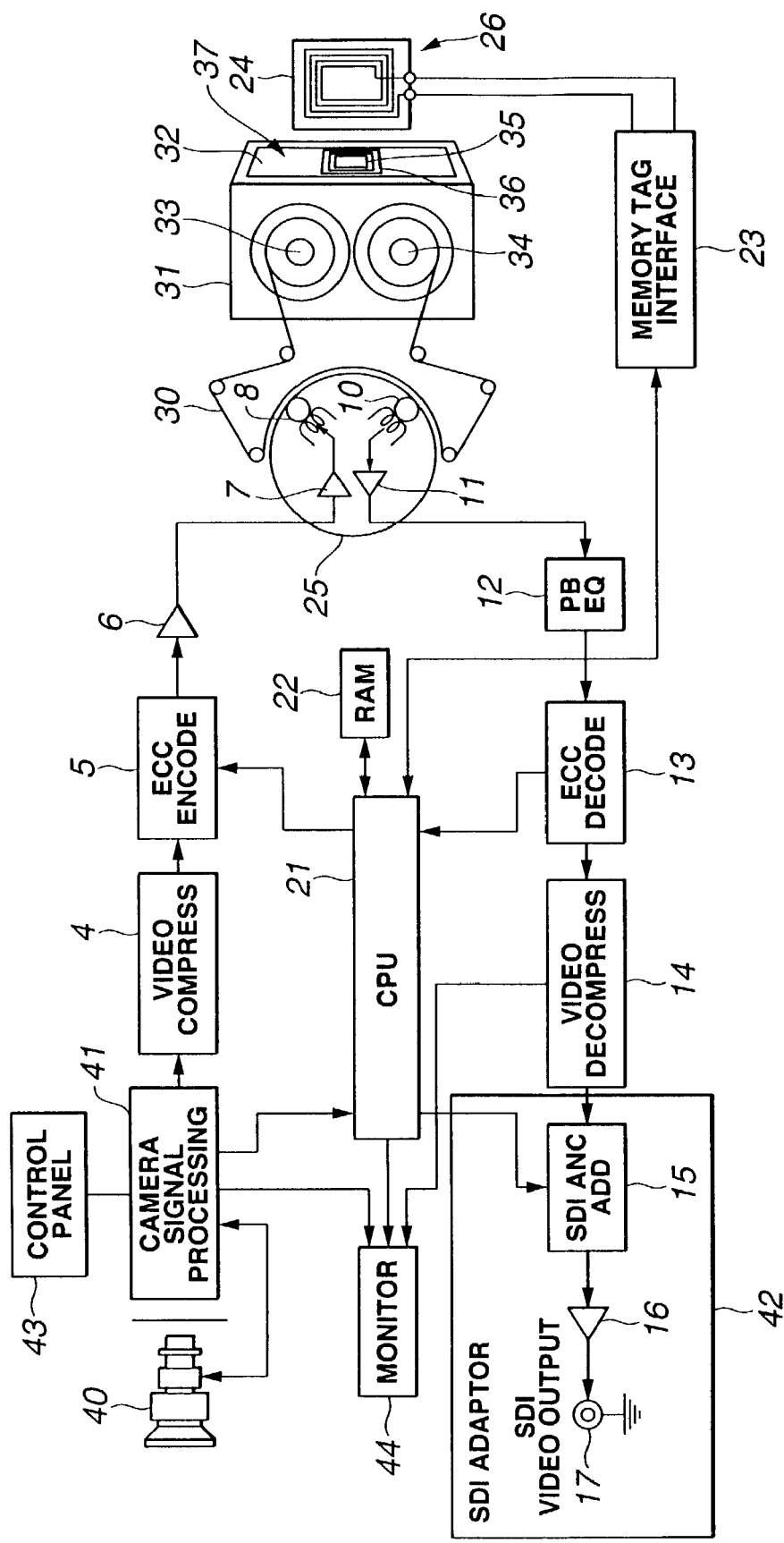
FIG. 10 is a block diagram of a combination camera/recorder as a second embodiment of the present invention, the recorder being a VTR.

Referring now to FIG. 10, there is illustrated in the form of a schematic block diagram a combination camera/recorder (VTR) as the second embodiment of the present invention. Note that in FIG. 10, the same components as in FIG. 1 are indicated with the same references as in FIG. 1 and they will not be described in detail. The second embodiment of the present invention, shown in FIG. 10, is different from the first embodiment shown in FIG. 1 in that the stage (video signal input system) upstream of the video compression circuit 4 consists of a video camera and the stage (video signal output system) downstream of the video decompression circuit 14 consists of an external SDI adaptor 42.

As shown in FIG. 10, the combination camera/recorder (VTR), the second embodiment of the present invention, includes a lens pickup block 40. The lens pickup block 40 includes a lens system provided with a focusing mechanism, zooming mechanism, diaphragm mechanism, etc. to form an object image or the like, and imaging device etc. to photoelectrically convert an incident light through the lens system. The image signals from the imaging device are sent to a camera signal processing circuit 41.

The camera signal processing circuit 41 controls the gain, knee, gamma, etc. of the image signals to generate video signals. The video signals are sent to a video compression circuit 4. Also, the camera signal processing circuit 41 has connected thereto a control panel 43 provided to control the video camera for various kinds of operations. The control panel 43 has provided thereon various buttons, switches, jog dial, etc. which are to be operated by the user to provide a command for start of picking up images at the lens pickup block 40, a command for start of recording the video signals picked up by the lens pickup block 40, commands for start, stop, pause, fast forward and quick reverse, respectively, of video signals recorded in the magnetic tape 30, and commands for login, logout, good shot, no-good shot, keep, etc. used during edition of the data.

Also in the second embodiment, the video signals supplied from the video decompression circuit 14 are sent to the SDI adaptor 42. The SDI adaptor 42 is an external unit, and it basically includes an SDI ANC addition circuit 15, output amplifier 16 and video output terminal 17, similar to those in the first embodiment.

Further in the second embodiment, video signals picked up by the lens pickup block 40 and processed in the camera signal processing circuit 41, video signals read from the magnetic tape 30 and reproduced by the video decompression circuit 14, and display signals such as texts generated by a CPU 21 based on the meta data once stored in a RAM 22, are sent also to a monitor 44 as necessary. Thus, the monitor 44 will display an image being picked up, an image read from the magnetic tape 30 or a list of data based on the meta data once stored in the RAM 22.

It should be reminded here that as in the VTR being the first embodiment of the present invention, the camera/recorder (VTR) being the second embodiment of the present invention is adapted to write/read meta data prescribed in SMPTE 298M and 335M for example along with video signals.

As in the second embodiment of the present invention, the combination camera/recorder (VTR) writes, as meta data to the RAM 22, as model name of the camera, processor settings such as gain, knee and the like, recording frequency, data bit rate, audio signal format information, filter selection information, information such as model name, focal distance, zooming factor, aperture size, etc., and various pieces of information (time code data) such as login, logout, good shot, no-good shot, keep and recording, start entered by the user operating the control panel 43, EOS (end of source), frame number, etc. Note that the meta data is generated by for example a CPU inside the camera signal processing circuit 41 from settings of the lens pickup block 40, internal settings for data-processing use, control information entered by the user operating the control panel 43, etc.

In the second embodiment, device-related information such as model name, serial number, etc., information such as current date and time generated by the CPU 21 and information entered by the user operating the control panel 43, will also be written as meta data to the RAM 22 as in the aforementioned first embodiment. Further, information read from a contactless memory tag 37 as necessary is also written as meta data to the RAM 22 via the CPU 21. The format of the meta data stored in the RAM 22 may be that of the meta data as defined in SMPTE 298M and 335M or a converted or processed one of the meta data.

These pieces of information (meta data) stored in the RAM 22 are arranged in the RAM 22 by the CPU 21, then sent to an ECC encoder 5 in which they are buried in an Aux sync block as in the first embodiment, and written to the magnetic tape 30 by the write head 8 like video and audio signals. Also, as in the first embodiment, the meta data recorded in the magnetic tape 30 and other information as well are arranged in the RAM 22 by the CPU 21, and written into the semiconductor memory in the contactless memory tag 37 via a coil antenna 24 of a built-in reader/writer 26.

On the other hand, to read the meta data from the magnetic tape 30, the meta data buried in the Aux sync block of the signals read by the read head 10 from the magnetic tape 30 is extracted by the ECC decoder 13, and then once stored into the RAM 22 by the CPU 21 as in the first embodiment. Also, to read the meta data from the contactless memory tag 37, the meta data is read from the contactless memory tag 37, and once stored into the RAM 22 by the CPU 21 as in the first embodiment.

Thereafter, to output the information (meta data) stored in the RAM 22 as piggybacked on video signals for example, the CPU 21 will arrange the meta date in the RAM 22, an SDI ANC addition circuit 15 in the SDI adaptor 42 will piggyback the meta data on the video signals in the form of SDI ANC packet.

Figure 11:
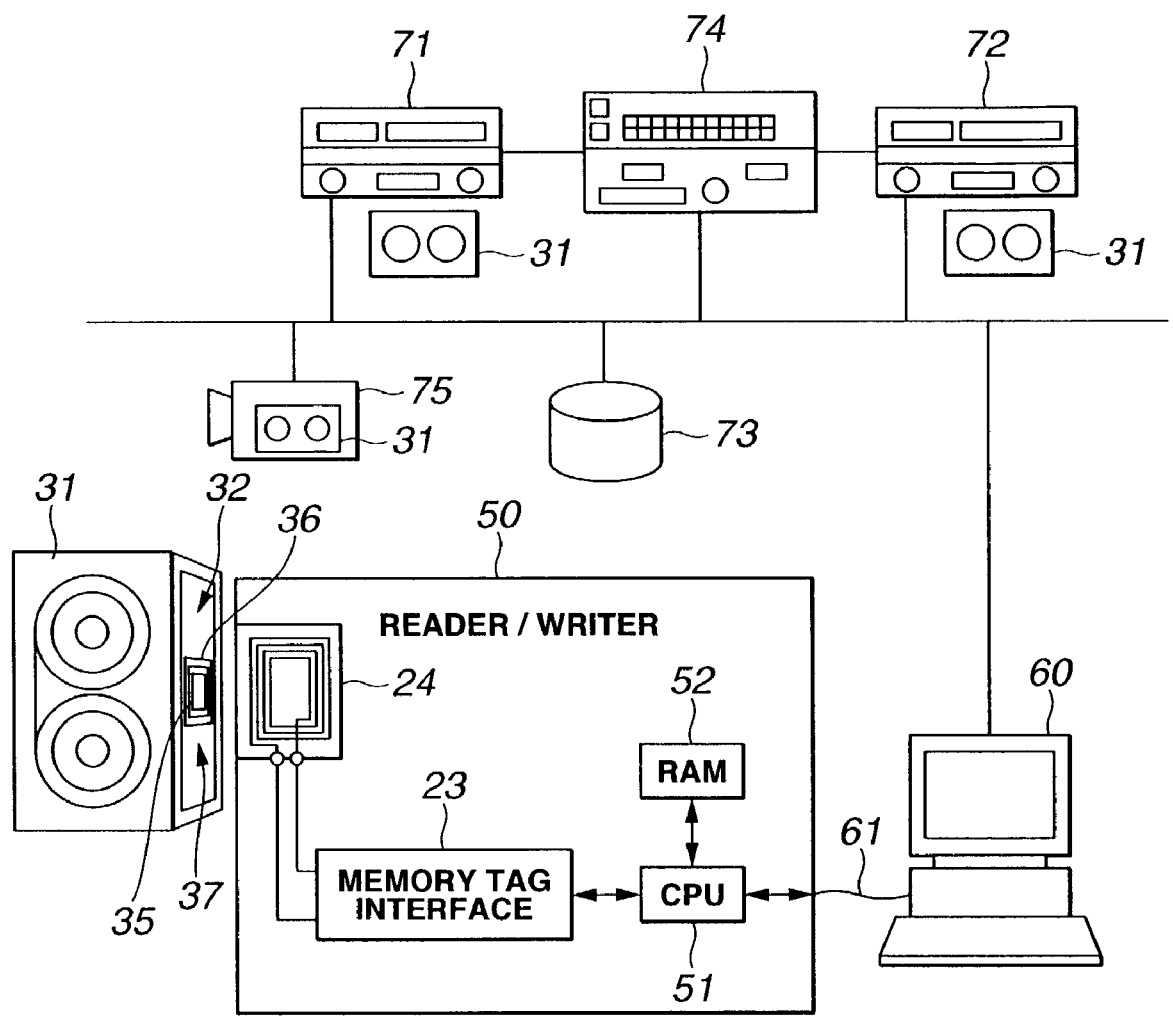
FIG. 11 is a block diagram of an edition system as a third embodiment of the present invention.

Referring now to FIG. 11, there is illustrated in the form of a schematic block diagram an edition system being the third embodiment of the present invention. The edition system uses for example a handy type reader/write 50 as constructed as a discrete device, which will further be described later, to write/read the meta data etc. to/from a contactless memory tag 37 provided in a label 32 attached to the cassette half of the cassette 31. The meta data are managed by a terminal 60, and stored in a data base unit 73 or sent to other VTRs 71 and 72 and edition unit 74. Further, the terminal 60 uses the meta data stored in the data base 73 for example to search a plurality of cassettes, manage the use of each cassette, search each cassette for materials such as images and sounds recorded in the cassette, judge the attributes of the images and sounds recorded in each cassette, and list the cassettes, materials recorded in the cassettes and histories of edition. Note that the search, cassette-use management, judgment of image and sound attributes, and listing, based on the meta data, will further be described late. Note also that in FIG. 11, the same elements as in FIGS. 1 and 10 are indicated with the same references as in FIGS. 1 and 10 and their detailed description will be omitted.

As shown in FIG. 11, the terminal 60 consists of a personal computer, work station or the like, for example. The terminal 60 is connected, in the form of a network, to the data base unit 73 provided with a large-capacity hard disc drive o the like, the VTRs 71 and 72 similar to the VTR shown in FIG. 1 as well as to the camera/recorder (VTR) 75 shown in FIG. 10 and the edition unit 74 which controls the operations of the plurality of VTRs to edit images and sounds. The network form includes an LAN (local area network) or a wide-area network like the Internet.

Also, the terminal 60 has installed therein a management software (application program) which uses the meta data stored in the data base unit 73, for example, and information about a contactless memory tag 37 attached to the cassette half of each cassette 31 to manage the cassette 31 loaded in each of the VTRs 71 and 72, materials such as images and sounds recorded in each cassette 31, and edition of the data as will further be described later.

The reader/writer 50 constructed as a discrete unit is generally similar to the reader/writer 26 incorporated in the aforementioned VTR, and thus includes a coil antenna 24 and memory tag interface unit 23. It further includes a RAM 52 to provisionally store data to be written to the contactless memory tag 37 and data read from the contactless memory tag 37, and a CPU 51 to write/read data to/from the RAM 52, arrange data in the RAM 52, generate a command for supply to the contactless memory tag 37, control the memory tag interface unit 23, and control data sending and reception to and from the terminal 60.

When in the terminal 60 in the edition system shown in FIG. 11, for example the meta data recorded in the semiconductor memory in the contactless memory tag 37 is read, first the user operates a keyboard, mouse or the like at the terminal 60 to enter a command for data read. Thus, a control signal for data read is sent from the terminal 60 to the reader/writer 50 via a cable 61.

Upon reception of the data-read control signal, a CPU 51 in the reader/writer 50 will send the data-read command to the memory tag interface unit 23. The memory tag interface unit 23 will cooperate with the coil antenna 24 to supply a power to the contactless memory tag 37 as above, modulate the data-read command and send it to the contactless memory tag 37, and demodulate data read and returned from the contactless memory tag 37 in response to the data-read command and send the data to the CPU 51. Receiving the data read from the contactless memory tag 37, the CPU 51 will send them to the terminal 60.

Having received the data read from the contactless memory tag 37, the terminal 60 sends the data to the data base unit 73, edition unit 74, etc. and also lists the data and displays the data list on a monitor. Note that login, logout, etc. included in the meta data are displayed in the form of a cue points list, for example.

Thereafter, to make data edition with the edition unit 74 with the cassette 31 loaded into the VTR 71 or 72, the edition 74 will edit the meta data stored in the data base unit 73 (meta data about video and audio signals recorded in the cassette 31 loaded in the VTR).

That is, when the user or an editor using the edition unit 74 designates necessary parts of the video and sound materials in referring to the time codes of login and logout in the cue points list being displayed on the monitor provided on a control panel or the like, for example, of the edition unit 74, the edition unit 74 will digitize the designated parts of the video and audio materials (conversion to data in frames, for example, conveniently handled during the edition), and edit the digitized data according to arbitrary directions given by the editor or user. Note that the edition unit 74 may be controlled by the terminal 60.

Also, as shown in FIG. 11, when the video and audio signals in the cassette 31 have been edited, meta data newly generated through the edition are stored in the data base unit 73 while being sent to the reader/write 50 via the terminal 60 for example and once stored in the RAM 52, and then arranged by the CPU 51, and written into the contactless memory tag 37 of the label 32 via the interface unit 23 and coil antenna 24.

It should be reminded here that for recording to the magnetic tape 30, the meta data is recorded into the Aux sync block as having previously been described but for recording to the semiconductor memory in the contactless memory tag 37 provided in the label 32, the meta data can be recorded in a format which will be described below. In this embodiment, meta data involved in the KLV (key length value) method defined in SMPTE 298M and 335M will be adopted for the convenience of the illustration and explanation.

FIG. 12 schematically shows a memory map in the semiconductor memory in the contactless memory tag 37. Data write/read to/from this semiconductor memory is effected in blocks (that is, in sectors), and one block (one sector) consists of 16 bytes including Nos. 0h to Fh ("h" means a hexadecimal notation; this will apply to the subsequent description as well). Access is made to the contactless memory tag 37 with the use of the dedicated reader/writer having previously been described. In the memory map, a block No. 0000h provides an area for a memory management table, No. 0001h provides an area for a manufacture ID table, No. 0002h provides an area for a format definition table, block Nos. 0003h to nnnnh (block No. nnnn is larger than No. 0003h and takes an arbitrary number corresponding to its memory capacity) provide a common area. The blocks other than the blocks Nos. 0000h and 0001h which are system definition blocks can freely be changed by the user. Note that the capacities of these blocks depend upon the version of the contactless memory tag.

Each of these areas in the memory map will be described herebelow.

FIG. 13 outlines the memory management table in the block No. 0000h. As shown in FIG. 13, a memory size is placed at the byte Nos. 0h and 1h, a manufacture code indicative of a manufacturer of the contactless memory tag provided in the label is placed at the byte Nos. 2h and 3h, a version of the contactless memory tag is placed at the byte No. 4h, and a lot number under which the contactless memory tag was manufactured in the manufacturer's factory is placed at the byte Nos. 5h and 6h. Note that the above lot number consists of a date at which the contactless memory tag was manufactured and information indicative of either the ante meridiem (before noon) or post meridiem (afternoon) of the manufacturing date. The byte No. 7h is "reserved", an application ID is placed at the byte Nos. 8h and 9h and a label form, that is, a medium ID corresponding to the type of a medium to which the label is to be attached, is placed at the byte Nos. 10h and 11h. An application ID-dependent field is placed at the byte Nos. 12h to 15h, but these bytes are "reserved" in this embodiment. Note that for example "00h" is used as a value indicating the "reservation".

FIG. 14 shows in detail the memory size placed at the byte Nos. 0h and 1h in the block No. 0000h. In the memory size, the bit No. 7 (LSB: most significant bit) of the byte No. 0h is "reserved" while the bit Nos. 0 to 6 are used to state the memory size. In the byte No. 1h, "00h" is placed to indicate the "reservation".

FIG. 15 shows in detail the lot number place at the byte Nos. 5h and 6h in the block No. 0000h. The lot number includes a manufacturing date indicated with bits descending from an MSB (most significant bit) toward lower bits. That is, the bit No. 7 (MSB) to lower bits of the byte No. 5h indicate a manufacturing day, bit Nos. 2 to 0 of the byte No. 5h and bit No.7 of the byte No. 6h indicate a manufacturing month, bit Nos. 6 to 1 of the byte No. 6 indicate a manufacturing year, and the least significant bit (LSB) of the byte No. 6h is a user-definable bit. Note that by way of example, "1998" may taken as "0" as a manufacturing year and incremented by one upon elapse of one year and the user may state, at the user-definable bit, either the ante meridiem or post meridiem in which the contactless memory tag is manufactured.

FIG. 16 outlines the manufacture ID table in the block No. 0001h. In the manufacture ID table as shown in FIG. 16, a video source device ID assigned at the manufacturer is placed at the byte No. 0h, a BCD (binary coded decimal) value in hundred thousands and ten thousands is placed at the byte No. 1h, a BCD value in thousands and hundreds is placed at the byte No. 2h, a BCD value in tens and ones is placed at the byte No. 3h, the byte No. 4h is "reserved" for the ID, and the byte Nos. 5h to 15h are "reserved" for a fixed value.

Note that the label (contactless memory tag) ID (label ID used for anti-collision purpose) is indicated by the byte Nos. 2h, 3h, 5h and 6h in the block No. 0000h and byte Nos. 0h to 4h in the block No. 0001h.

In this embodiment, a label ID is set for each label having the contactless memory tag provided therein. The label ID is a unique number assigned to the label itself, and access from an application to the contactless memory tag is made based on the label ID. FIG. 17 shows the label ID in detail. As shown in FIG. 17, the label ID consists of 8 bytes in which the byte No. 0h is for a medium ID in the memory management table in the block No. 0000h, byte Nos. 1h and 2h are for the lot number in the same memory management table and the byte Nos. 3h to 7h are for IDs at the byte Nos. 0h to 4h, respectively, in the manufacture ID table in the block No. 0001h.

Figure 18:
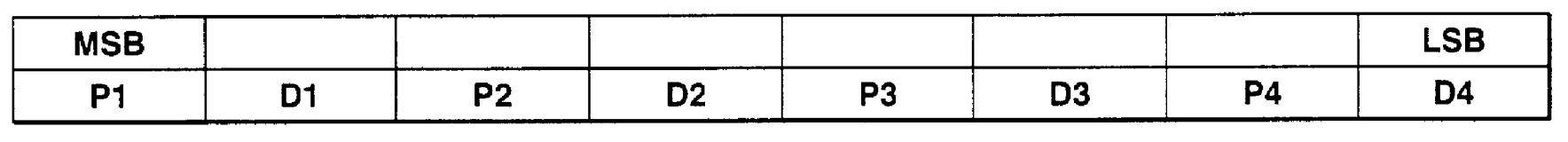

Next, there will further be described the Hamming 8/4 code used to express the memory size of the memory management table, manufacture code, application ID and medium ID in the block No. 0000h shown in FIG. 13. Of 8 bits in the Hamming 8/4 code, the bit Nos. 1, 3, 5 and 7 are provided as protection bits (additional signal), and bit Nos. 2, 4, 6 and 8 are provided as data (original signals). A 1-bit error is detected and corrected, and a 2-bit error is detected. The bit assignment will be described below with reference to FIGS. 18 and 19. The bit No. 7 (MSB) (P1) of the 8 bits is set to a value resulted from an exclusive OR of "1" made among the bit Nos. 6 (D1), 2 (D3) and 0 (LSB) (D4), bit No. 5 (P2) is set to a value resulted from an exclusive OR of "1" made among the bit Nos. 6 (D1), 4 (D2), 2 (D3) and 0 (D4), bit No. 3 (P3) is set to a value resulted from an exclusive OR of "1" made among the bit Nos. 6 (D1), 4 (D2) and 2 (D3), and bit No. 1 (P4) is set to a value resulted from an exclusive OR of "1" made among the bit Nos. 7 (P1), 6 (D1), 5 (P2), 4 (D2), 3 (P3), 2 (D3), 1 (P4) and 0 (D4). The conversion of the Hamming 8/4 code is checked by reference to a conversion table listing correspondences between hexadecimal values and Hamming 8/4 codes (binary) shown in FIG. 20 for example. The data about the Hamming 8/4 codes will look as shown in FIG. 21 for example from outside the controller. Note that FIG. 21 shows an example expressing the memory size.

The format definition table area in the block No. 0002h shown in FIG. 12 is outlined in FIG. 22. In this area, each application is recognized to check if a format shown in FIG. 22 is valid. Note that each of the data in the format is a character string. As shown in FIG. 22, a key code being a key word and used to rewrite the block (sector) No. 0002h is placed at the byte No. 0h, fixed codes (FFh, FEh) are placed at the byte No. 1h, name and version of an application are placed at the byte Nos. 2h to 12h, write-protect code is placed at the byte No. 13h, country code is placed at the byte No. 14h, and a number code is placed at the byte No. 15h. Note that when the write-protect code is "0", write is enabled, while the code is "1", write is disabled. In the country code, a country number is expressed in the BCD notation. For Japan for example, "00h" will be placed at the byte No. Eh of the country code and "81h" be at the byte No. Fh. For USA, "00h" will be placed at the byte No. Eh and "01h" is at the byte No. Fh.

Next, the common area provided by the block No. 0003h and subsequent blocks shown in FIG. 12 will be outlined herebelow. In the common area, the block Nos. 0003h to 000Ah provide a common area management table area, and the block No. 000Bh and subsequent blocks provide a data area. In the common area management table area, there is stored basic information for a medium (in this embodiment, the recording medium is a cassette tape by way of example) managed by the contactless memory tag in this embodiment.

FIG. 23 shows the common area in detail.

As shown in FIG. 23, a character string (e.g., Cassette ID) assigned to the label (contactless memory tag) is placed at 20 bytes from the byte No. 0h in the block No. 0003h to the byte No. 3h in the block No. 0004h, a character string as a data base key being a unique ID assigned for data-base search is placed at 20 bytes from the byte No. 4h in the block No. 0004h to the byte No. 7h in the block No. 0005h, and a character string of a title is placed at 24 bytes from the byte No. 8h in the block No. 0005h to the byte No. Fh in the block No. 0006h.

Also, a character string indicating an administrator is placed at 16 bytes from the byte Nos. 0h to Fh in the block No. 0007h, a binary value (whose maximum value is 000009999999, for example) indicating for example the serial number for a last device has been used is placed at 4 bytes from the byte Nos. 0h to 3h in the block No. 0008h, and a character string indicating for example the model name of the last device having been used is placed at 12 bytes from the byte Nos. 4h to Fh in the block No. 0008h.

Further, a binary value indicating a pointer equivalent to the total size of cue point data from the top address of the cue point data corresponding to a clip area from the start to end of recording (that is, a number of valid bytes in a data area in the block No. 000Bh and subsequent blocks) is placed at 2 bytes including Nos. 0h and 1h in the block No. 0009h, a binary value (EOSR-ID) indicating an ID number (random number) recorded at the EOS point in an video area on the tape and used to search for an end of source (EOS) point for example is placed at 2 bytes including Nos. 2h and 3h, a binary value indicating a remain status (RS) being the status of the supply reel of the cassette at the EOS point is placed at the byte No. 4h, a binary value indicating a remain time (RT) being a value corresponding to a diameter of the tape wound on the supply reel of the cassette at the EOS point is placed at the byte No. 5h, a time code indicating the EOS point is placed at 4 bytes from the byte Nos. 6 to 9, a binary value indicating a thread count being a number of times of tape cassette loading is placed at 2 bytes Nos. Ah and Bh, and a BCD value indicating a date of last recording (update) is placed at 4 bytes Nos. Ch to Fh.

Furthermore, a binary value indicating a top address of cue point data area (data TOPP:data top pointer) as an offset by one clip area (clip area offset) from the start to end of recording is placed at 2 bytes including Nos. 0h and 1h, in the block No. 000Ah. This binary value is a number of offset bytes taking "00B0h" as the byte No. 0. In case of "00E0h" for example, "0030h" is set as the binary value. A binary value indicating a definition (FAT definition) of a file allocation table (FAT) used to manage the file addresses in the cue points list (to define a total number of cue point packages stored in the data area and number of cue points per package, for example) is placed at 2 bytes including Nos. 2h and 3h in the block No. 000Ah, a binary value (e.g., 00h) indicating an extension-use reserve area is placed at 6 bytes including Nos. 5h to Ah, a field frequency (FQ: recording frequency) of video signals recorded in the tape is placed at the byte No. Bh, and a binary value indicating an audio status (AD Status) recorded in the tape is placed at the byte Nos. Ch to Fh. Note that the byte No. 2h in the block No. 000Ah indicates a thinning of FAT. "0h" it indicates that there is no FAT; "1h" indicates that FAT is thinned for 1 clip; "2h" indicates that FAT is thinned for 4 clips; and "3h" indicates that FAT is thinned for 16 clips. For example, in case FAT is thinned for 4 clips, the byte Nos. Eh and Fh in the block No. 003Fh provide an address of the clip 0 while the byte Nos. Ch and Dh in the block No. 003Fh provide an address of clip 4. The field frequency stated at the byte No. Bh in the block No. 000Ah indicates a video scan format (video_f), and the MSB of the byte No. Bh indicates either a progressive scan or interlaced scan. When the value of lower 3 bits is "000", it can indicate 29.97 frames/sec; "001" indicate 20 frames/sec; "100" indicate 23.98 frames/sec; and "101" indicate 24 frames/sec. In the common area in FIG. 23, an area down to the block No. 000Ah is a common area while the block No. 000Bh and subsequent blocks define a data area in which data are listed per clip.

FIG. 24 shows an example of the serial number defined by 4 bytes from the byte Nos. 0h to 3h in the block No. 0008h in FIG. 23, and FIG. 25 shows an example of the pointer defined by 2 bytes including Nos. 0h and 1h in the block No. 0009h in FIG. 23 and an example of the ID number (EOSR-ID) used to search for the EOS point defined by 2 bytes including Nos. 2h and 3h in the same block. Note that the same value as a random number stored in the tape is recorded at the ID number (EOSR-ID) of the EOS during the last recording. Since some time codes take the same value at the end of source point (EOS), the random number is used to permit differentiation between time codes having the same value.

FIG. 26 shows the content of the remain status (RS) stated at the byte No. 4h in the block No. 0009h in FIG. 23. As shown in FIG. 26, the bit No. 7 (MSB) takes a value "1" when the diameter of the tape wound on the reel of the cassette is not yet measured, the bit No. 6 indicates the tape top or end position and takes a value "0" when the tape is at the top position thereof while taking a value "1" when the tape is at the end position thereof. The bit No. 5 is unused, and the bit No. 4 takes a value "1" when the tape is at the top or end position thereof. The bit Nos. 3 and 2 indicate a cassette size, and take a value "00" when the cassette size is small (S), "01" when the cassette size is medium (M) and "10" when the cassette size is large (L). The bit Nos. 1 and 0 are unused. Note that the bit Nos. 6 and 4 will be as follows depending upon the tape status as shown in FIG. 27. That is, when the tape is at the top position thereof, the bit No. 6 takes a value "0" while the bit No. 4 takes a value "1". When the tape is in the middle position, both the bit Nos. 6 and 4 take a value "0". When the tape is at the end position thereof, both the bit Nos. 6 and 4 take a value "1".

FIG. 28 shows the content of the time code (time data) indicating the large recording position (EOS point) stated at the byte Nos. 6h to 9h in the block No. 0009h in FIG. 23. As shown in FIG. 28, the time code indicating the EOS point is indicated as a BCD Code of 4 bytes. Data indicating "frame" is stored at the first byte (DATA-1) of the 4 bytes, data indicating "seconds" is stored at the second byte (DATA-2), data indicating "minutes" is stored at the third byte (DATA-3), and data indicating "hours" is stored at the fourth byte (DATA-4). Also, a type is indicated by the use of a blank bit. Note that all the bits are filled with "FFh" to nullify data.

Figure 29:
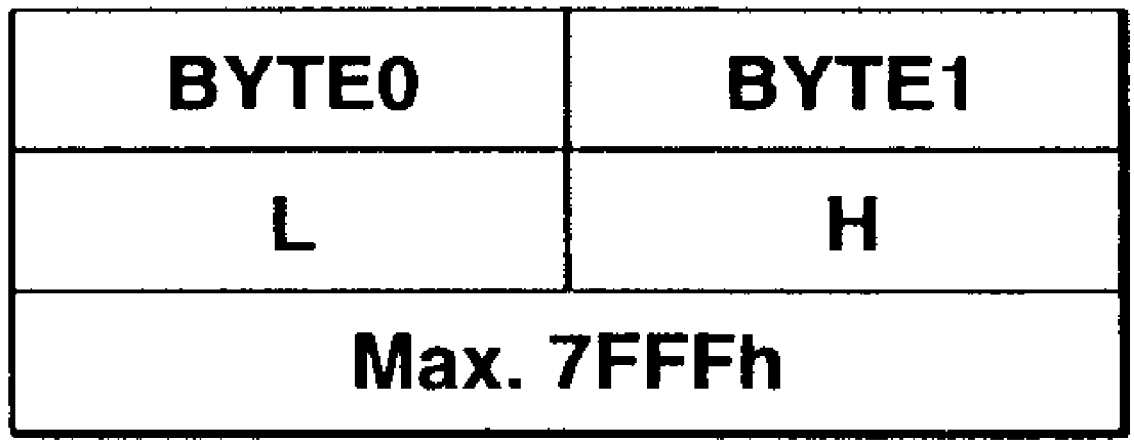
FIG. 29 explains the thread count indicating the number of times of cassette loading at byte Nos. Ah and Bh in the block No. 0009h of the memory map.

FIG. 29 shows an example of the thread count indicating a number of times of cassette loading, defined by 2 bytes including Nos. Ah and Bh in the block No. 0009h in FIG. 23. Note that this embodiment may also be adapted not to count up the thread count value when it has exceeded "7FFFh".

Figure 31:
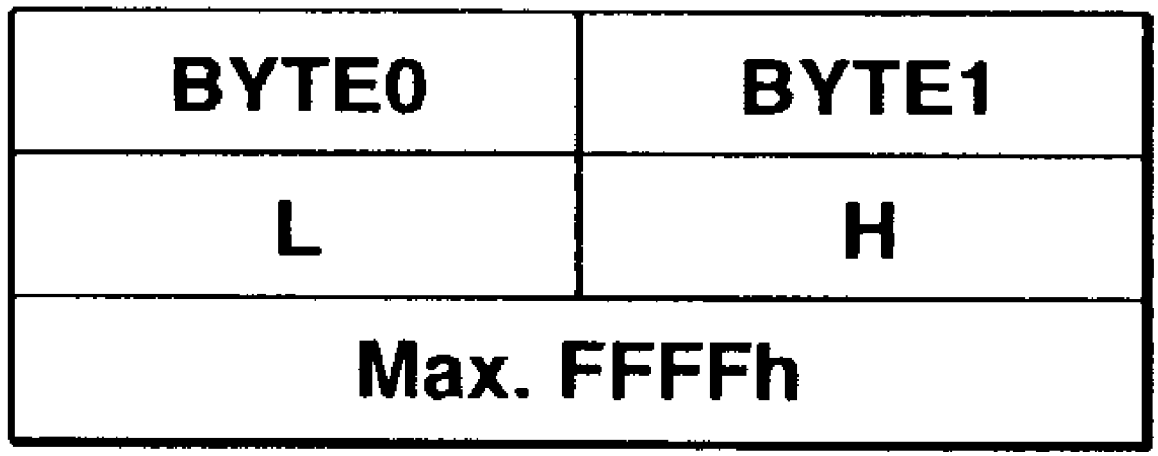
FIG. 31 explains the top address (data TOPP) of cue point data area at the byte Nos. 0h and 1h in the block No. 000Ah of the memory map.

FIG. 30 shows an example of the setting at the block Nos. 0009h to 000Bh in FIG. 23, and FIG. 31 shows an example of the top address (data TOPP) of the cue point data area, defined by the byte Nos. 0h and 1h in the block No. 000Ah in FIG. 23.

Also, FIG. 32 shows the content of the definition (FAT definition) of the file allocation table defined by 3 bytes including Nos. 2h to 4h in the block No. 000Ah in FIG. 23. With the definition, it is possible to make fine address management of the list of cue points intended for easy search for a cue point. For the address management, a top address (2 bytes) having a cue point stored therein is written frontward from the trailing end of th data area. At this time, each number of cue points at which an address is stored is designated, and a total number of stored cue point packages is defined. As shown in FIG. 32, the bit Nos. 7 to 2 of the byte No. 2h (offset address 0) in the block No. 000Ah are reserved, and a count value of cue packages (Packed FAT count) is stored at the bit Nos. 1 and 0. The 8 bits of the byte No. 3h (offset address 1) are upper 8 bits of 16 bits indicating a total number of stored cue point packages. Note that when the first and second bits of the packed FAT count take a value "00", they are unused; when they take a value "01", they store an address per cue; when they take a value "10", they store an address at every 4 cues; and when they take a value "11", they store an address at every 16 cues.

FIG. 33 shows the content of the field frequency (FQ: recording frequency) at the byte No. Bh in the block No. 000Ah in FIG. 23. As shown in FIG. 33, when in the interlaced mode, the bit No. 7 (MSB) is set to "0", and when in the progressive mode, it is set to "1". The bit Nos. 6 to 3 are reserved, bit Nos. 5 to 3 store information about video recording bit rate (data bit rate), and the bit Nos. 2 to 0 (LSB) store information about video recording frequency (field frequency). Note that when the bit Nos. 5 to 3 take a value "000", they indicate 20 Mbps (megabits per sec); when they take a value "011", they indicate 30 Mbps when they take a value "010", they indicate 40 bps; when they take a value "001", they indicate 50 bps; when they take a value "100", they indicate a bit rate for a predetermined video system; and when they take a value "101", they indicate that they are reserved. When 3 bits including Nos. 2 to 0, take a value "000", the field frequency is 29.97 Hz; when they take a value "001", the field frequency is 30 Hz; when they take a value "010", they are reserved; when they take a value "011", the field frequency is 25 Hz; when they take a value "100", the field frequency is 23.98 Hz; and when they take a value "101", the field frequency is 24 Hz.

FIG. 34 shows the content of the audio status at the byte Nos. Ch to Fh in the block No. 000Ah in FIG. 23. As shown in FIG. 34, an audio status of a channel CH2 is placed at the bit Nos. 7 to 4 of the byte No. Ch (offset address 0) in the block No. 000Ah, and an audio status of a channel CH1 is placed at the bit Nos. 3 to 0 of the same byte. An audio status of a channel CH4 is placed at the bit Nos. 7 to 4 of the byte No. Dh (offset address 1) in the block No. 000Ah, and an audio status of a channel CH3 is placed at the bit Nos. 3 to 0 of the same byte. Similarly, an audio status of a channel CH6 is placed at the bit Nos. 7 to 4 of the byte Eh (offset address 2) in the block No. 000Ah, and an audio status of a channel CH5 is placed at the bit Nos. 3 to 0 of the same byte. Also, an audio status of a channel CH8 is placed at the bit Nos. 7 to 4 of the byte No. Fh (offset address 3) in the block No. 000Ah, and an audio status of a channel CH7 is placed at the bit Nos. 3 to 0 of the same byte. When the 4-bit audio statuses of the channels CH1 to CH8 take a value "0100" for example, they indicate that the data are based on a predetermined method (e.g., ATRAC3: trademark); when they take a value "0011", they indicate that data are based on a predetermined method (e.g., Pana Data: trademark); when they take a value "0010", they indicate that the data are based on a predetermined method (e.g., AC3: trademark); when they take a value "0001", they indicate that the data are based on a predetermined method (e.g., DOLBY-E: trademark); and when they take a value "0000", they indicate that the data are based on the PCM (pulse code modulation) method.

The common area shown in FIG. 23 can be extended and additional data can be defined by setting a value of the top address (data TOPP) of the cue point data area defined at the byte Nos. 0h and 1h in the block No. 000Ah in FIG. 23. However, it is dispensable because of the limited memory capacity etc. to write data to the extended area.

As in the above, the common area in FIG. 23 can be extended. FIG. 35 shows an management table in the extended common area. Note that in FIG. 35, since the block Nos. 0003h to 000Ah are the same as in FIG. 23, they are not shown.

As shown in FIG. 35, a character string indicative of a data format ID (extended area format ID) of the extended data area is placed at 8 bytes including Nos. 0h to 7h in the block No. 000Bh, and a character string indicating the version of the data format of the extended data area is placed at 3 bytes Nos. 8h to Ah in the same block. A character string indicating a reel name (only one is defined) of the label is placed at 6 bytes including Nos. 0h to 5h in the block No. 000Ch, and a character string indicating an EDL fine name (only one is defined) defining an editing list (EDL) of the label is placed at 6 bytes including Nos. 6h to Bh in the same block. Also, a character string indicative of for example a stocked floor number of the cassette having the label attached thereto is placed at 3 bytes including Nos. 0h to 2h in the block No. 000Dh, a character string indicating for example a stocked shelf number for the cassette having the label attached thereto is placed at 6 bytes including Nos. 3h to 8h, a character string indicating for example a stocked step number for the cassette having the label attached thereto is placed at 3 bytes including Nos. 9h to Bh, and a character string indicating a stocked position of the cassette having the label attached thereto is placed at 4 bytes including Nos. Ch to Fh. Also, the total of 36 bytes in the block Nos. 000Eh and 000Fh is reserved, and a character string indicative of a comment and memorandum marked on the label is placed at a total of 40 bytes including No. 0h in the block No. 0010h to No. 7h in the block No. 0012h.

Next, data stored into the data areas in the common area and extended common area will be described herebelow. The data areas store data intended for various application. In this embodiment, the data areas have stored therein the previously described meta data and the meta data is added mainly at each of the individual clips provided from the start to end of recording. Note that the common areas have stored therein information from which the meta data is originated, and the information in the common areas is used to generate meta data in some cases. In the following description, however, meta data to be added mainly at individual clips and which is to be written or read will be described.

FIG. 36 shows the data format of the cue point indicative of one of the individual clip areas from the start to end of recording. Note that in this data format, each and all of the items are variable in length.

In the data format of the cue point, each bit of a status flag corresponds to existence/absence of each data type and only data designated by a status is placed after the status starting with the least significant bit (LSB) as shown in FIG. 36. As shown in FIG. 36, the cue point data format consists of a 2-byte status flag (Status), a 4-byte cue point (CUE point) indicative of a frame (f), seconds (s), minutes (m) and hours (h), a 4-byte in point (IN point) similarly indicating a frame (f), seconds (s), minutes (m) and hours (h), a 4-byte output point (OUT point) similarly indicating a frame (f), seconds (s), minutes (m) and hours (h), respectively, a 3-byte scene number (Scene No.) indicating a number, a 4-byte cut number (Cut No.) indicating a number, a 1-byte take number (Take No.) indicating a number a reserved 4-byte user bit (User_bit), a 4-byte real time (Real_Time) indicating a frame, seconds, minutes and hours, a 4-byte real data (Real_Data), UMID (unique material identifier) data of 53 bytes at maximum, and additional information of an arbitrary number of bytes. Note that "UMID" is a globally unique ID assigned to video and audio materials, and it is defined in SMPTE 330M for example. The UMID used in this embodiment will further be described later.

When the fifteenth one of 16 bits composing the 2 bytes of the status shown in FIG. 36 is "1", it indicates a status for start of recording; when it is "0", it indicates a normal status. When the bit Nos. 14 and 13 are "00", they indicate a default status; when they are "01", they indicate an OK status (shot 1); when they are "10", they indicate an NG status (shot 2); and when they are "11", they indicate a keep status (KEEP). When the bit No. 12 is "1", it indicates a status with additional information; and when it is "0", it indicates a status with no additional information. When the bit No. 11 is "1", it indicates a write disabled status; and when it is "0", it indicates a write enabled status. When the bit Nos. 10 and 9 are "00", they indicate a status with no UMID data; when they are "01", they indicate a status with only 6-byte material data; when they are "10", they indicate a status with 21-byte basic data; and when they are "11", they indicate a status with 53-byte extended data. When the bit No. 8 is "1", it indicates a status with data; and when it is "0", it indicates a status with no data. When the bit No. 7 is "1", it indicates a real-time status; and when it is "0", it indicates a non-real-time status. The bit No. 6 is reserved. When the bit No. 5 is "1", it indicates a status with take number; and when it is "0", it indicates a status with no take number. When the bit No. 4 is "1", it indicates a status with cut number; and when it is "0", it indicates a status with no cut number. When the bit No. 3 is "1", it indicates a status with scene number; and when it is "0", it indicates a status with no scene number. When the bit No. 2 is "1", it indicates a status with OUT point; and when it is "0", it indicates a status with no OUT point. When the bit No. 1 is "1", it indicates a status with IN point; and when it is "0", it indicates a status with no IN point. When the bit No. 0 is "1", it indicates a status with CUT point; and when it is "0", it indicates a status with no CUT point.

Each of the CUE points, IN point, OUT point and Real Time shown in FIG. 36 is a frame, seconds, minutes and hours, respectively, and each of the Scene No. and CUT No. is an ASCII character, respectively. Each of the Take No. and Reserved is a binary value of 0 to 255. The Data is time information indicating a day, month and year as a binary value. Note that the format data are stored correspondingly to the capacity of the semiconductor memory in the contactless memory tag, and the end of the data is indicated with 2 bytes of the status being set to "00h".

Figure 38:
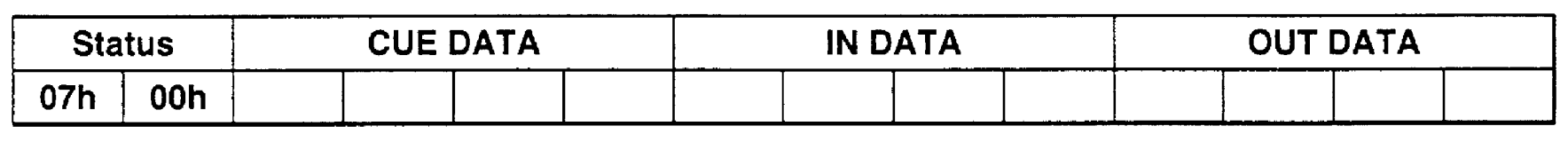

To show the format in FIG. 36 in further detail, FIG. 37 shows a data structure in which 2 bytes of a status are 01h and 00h, respectively, namely, the bit No. 0 is "1" while all the other bits are "0", that is, the structure of only the CUE point data. In FIG. 37, the data are indicated only with a total of 6 bytes. Also, to show the format in FIG. 36 in detail, FIG. 38 shows a data structure in which 2 bytes of a status are 07h and 00h, respectively, namely, the bit Nos. 0, 1 and 2 are "1" respectively while all other bits are "0", that is the structure of only the CUT, IN an OUT points. In FIG. 38, the data are indicated only with a total of 14 bytes.

FIG. 39 shows a data format of the additional information in which the bit No.12 in the status shown in FIG. 36 is "1" (it indicates a status with additional information), and FIG. 40 shows the data structure in further detail than in FIG. 39.

As shown in FIGS. 39 and 40, the additional information includes a classification (Classification), flow (Flow)/mode (Mode) type/data size (DataSize; higher 4 bits), data size (DataSize; lower 8 bits) and payload data (Data). The classification is indicated with a single ASCII character, and each of the flow, mode type and data size is indicated with a binary value. When the flow is "1", it indicates that the subset is following by another subset. The mode type indicates a data type. For example, the bit Nos. 5 and 4 being "0" indicate that the data is of a binary type, the bit No. 5 being "0" and No. 4 being "1" indicate that the data is of a shifted JIS type, and the bit No. 5 being "1" and No. 4 being "0" indicate that the data is of a unicode type.

When the single ASCII character of the Classification is "C" for example, it indicates a comment; when it is "E", it indicates an EDL (editing list); when it is "M", it indicates an SMPTE meta data version 1; when it is "U", it indicates a whole UMID; when it is "S", it indicates a UMID signature meta data; when it is "$", it indicates a user's definition. In the field of Classification, a classification name is described with ASCII characters. Note that the Classification is indicated with a single ASCII character in this embodiment but can be extended by setting a delimiter which will further be described later to "1". In case the classification is extended, for example, "CMT" indicates a comment while "CID" means a camera ID.

The bit No. 7 (MSB) of the flow/mode field is a delimiter of the classification field and indicates the end of the classification field. Flow control information is placed at the bit No. 6 of the flow/mode field, and mode control information is placed at the bit Nos. 5 and 4. The flow control information is used to define a plurality of additional information. For example, when the flow control information at the bit No. 6 is "0", it indicates the end of the additional information; and when it is "1", it indicates that other additional information exists subsequently. The mode control information is used to define the character code type in the data area. For example, when the bit Nos. 5 and 4 are "00", they indicate that the data is of a binary type; when they are "01", they indicate that the data is of a shifted JIS type; when they are "10", they indicate that the data is of a unicode type; and when they are "11", they indicate a disabled status.

The data size (number of bytes in the data area) consists of bit Nos. 3 to 0 (upper 4 bits) in the flow/mode field, and 1 byte (lower 8 bits) in a next data size field. Namely, the data size is of 12 bits. Therefore, the number of data which can be sent at a time is 4096 bytes. When the flow control information is "1", it indicates that the subset is followed by another subset.

The data length is 0 to 8191, and when the information is "0", it indicates that only the classification is to be done.

In the foregoing, the memory map and format of the semiconductor memory 37 provided in the label 32 have been described.

Next, the UMID shown in FIG. 36 will further be described.

Figure 41:
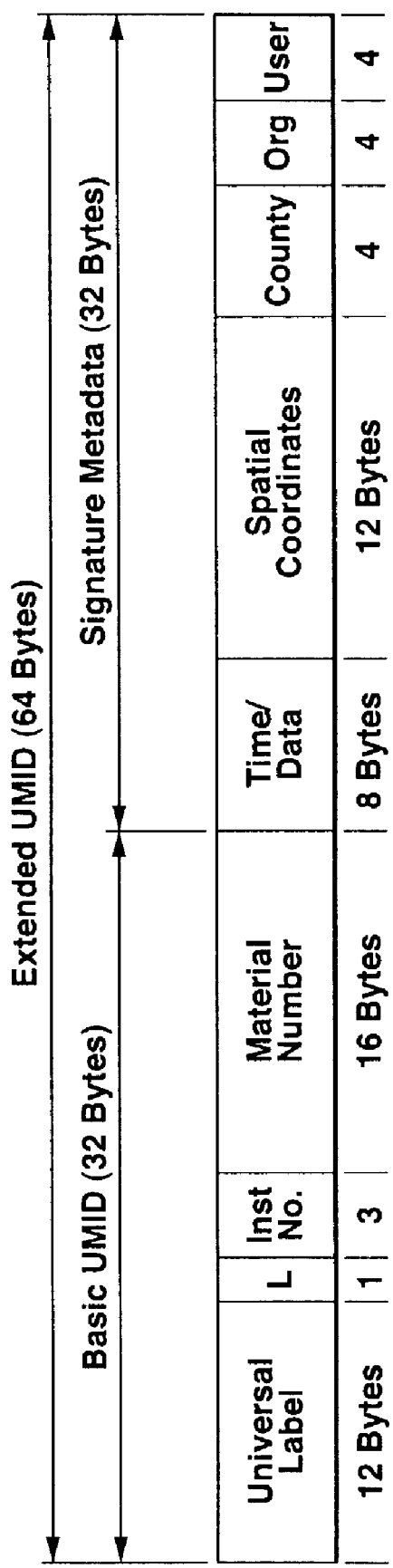
FIG. 41 explains the data format of the extended UMID defined in SMPTE 330M.

FIG. 41 shows the data format of an extended UMID defined in SMPTE 330M. As shown in FIG. 41, the extended UMID defined in SMPTE 330M consists of a total of 64 bytes including 32 bytes of a basic UMID and 32 bytes of a signature meta data. The basic UMID consists of a universal label of 12 bytes, length (L) of 1 bytes, instance number (Inst No.) of 3 bytes and a material number of 16 bytes, and the signature meta data consists of time/data of 8 bytes, spatial coordinates of 12 bytes, country code of 4 bytes, organization (Org) of 4 bytes and a user code (User) of 4 bytes. Note that the material number consists of a time snap of 8 bytes, random number (Rnd) of 2 bytes and a machine node of 5 bytes.

In this embodiment, the UMID is composed as will be described below. Note that in the following description, there will be taken, by way of example, a UMID generated by the camera signal processor 41 or CPU 21 for example in the combination camera/recorder (VTR) shown in FIG. 10.

The combination camera/recorder (VTR) in this embodiment first composes a basic UMID as will be described below.

Since the first to tenth bytes of the universal label of 12 bytes in the basic UMID form together a fixed byte string, so they will not be described here. In the VTR according to this embodiment, the front byte string including the first to tenth bytes will be added when recording or outputting data to or from the magnetic tape 30. When the byte Nos. 11 and 12 of the universal label are "04h" and "11h", respectively, when images and sounds have been recorded simultaneously and original materials. Also, since the length (L) is already known, it will be described here. Further, for original materials, the instance number (Inst. No.) has three bytes of "00h", "00h" and "00h", respectively.

The time snap of the material number consists of 8 bytes indicative of a frame, seconds, minutes and hours as shown in FIG. 42. Each of these values is generated from clock information generated by a time code generator, for example, incorporated in the VTR. It is assumed here that now is May 31, 2000 for example. The date 2000.05.31 is converted to a Julian Day (JD). The time zone is known, from the clock setting, to be Japan for example, and thus the date is set as "97h". Thus, the 8 bytes of the time snap are provided. Also, the random number (Rnd) consists of lower and upper bytes and their values are provided from an M-series generator running on a software for example.

Further, a machine node is determined from a serial number written in EEPROM or the like (not shown) usually provided near the CPU in the VTR.

As above, the basic UMID of 21 bytes as shown in FIG. 43 is assembled. In the combination camera/recorder (VTR), the basic UMID is generated at the start of a recording and written to the RAM 22.

Then, in the combination camera/recorder (VTR), the basic UMID of 21 bytes will be recorded, together with a signature meta data of 32 bytes including a Time/Data stamp of 8 bytes, Spatial coordinate of 12 bytes, Country of 4 bytes, Organization of 4 bytes and a User Code of 4 bytes (a maximum of 53 bytes in total), to the magnetic tape 30 as shown in FIG. 44. Note that at this time, a time code will also be recorded to the magnetic tape 30 at the same time.

After data corresponding to some clips are thus recorded, the magnetic tape 30 will be ejected. Solely at this time, the UMID stored in the RAM 22 will be written to the semiconductor tap of the memory tag 37. However, when writing the UMID to the semiconductor memory in the memory tag 37, the UMID will be compressed for recording in order to reduce the use of the semiconductor memory capacity. That is, since the UMID has a peculiar value in clips, it uses a capacity of tens kbytes per roll of cassette tape. For example, in case the semiconductor memory of the memory tag 37 has a small capacity, it is not preferable to store the UMID as a whole to the semiconductor memory. Also, in case the UMID is going to be sent over a transmission line having a small capacity or for an analog device, the information amount required for the UMID should desirably be reduced. Therefore, in this embodiment, the UMID is compressible as below.

The package of each clip is configured as in FIG. 36. In the combination camera/recorder (VTR) according to this embodiment, a basic UMID will be written taking a time code for the start of a recording for example as a cue.

Figures 45A, 45B:
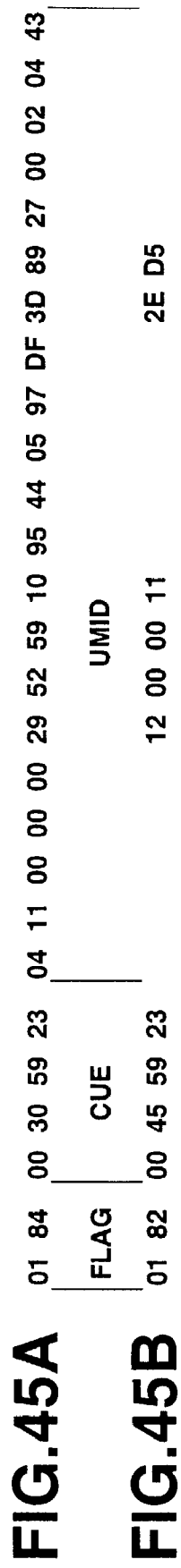
FIGS. 45A and 45B explain the initial click package in the embodiment of the present invention.

For example, the first clip includes a flag of 2 bytes, a cue of 4 bytes and UMID of 21 bytes (27 bytes in total). More particularly, the first clip is expressed in hexadecimal notation as shown in FIG. 45A. Since it is considered that the date etc. will not vary in a next clip, a differential format can be used for the UMID. Thus the UMID may be of 6 bytes as shown in FIG. 45B, and the package size will be 12 bytes. That is, owing to the differential format, the basic UMID shown in FIG. 43 may be composed only of a total of 6 bytes including 4 bytes for the frame, seconds, minutes and hours in the time snap and 2 bytes for the random number as shown in FIG. 45B with omission of the other parts.

After an image of a memory map in the semiconductor memory of the memory tag 37 is formed in the RAM 22 as above, the coil antenna 24 will actually write it to the semiconductor memory of the contactless memory tag 37.

Next, the meta data other than the UMID will be described.

It is assumed here that a main title ("The Tele-File" as an example) is prerecorded in the common area in the semiconductor memory of the contactless memory tag 37 and a sub title ("Application" as an example) is written in a next package. Also it is assumed that the meta data recorded in the magnetic tape 30 in the VTR according to this embodiment and which will be outputted to outside as SDI ANC packets includes a number of frames per seconds in addition to the above titles.

First, the generation of meta data by the VTR according to the present invention will be described.

Figure 46:
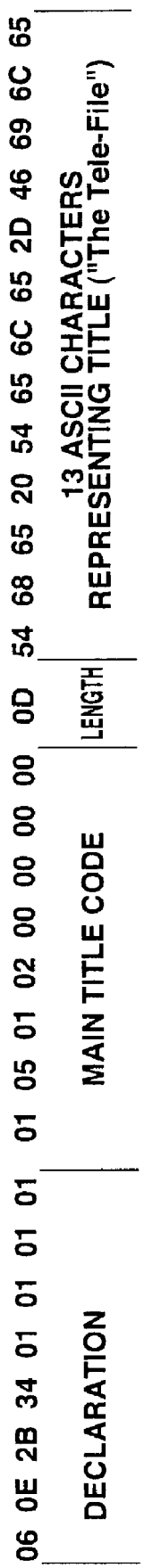
FIG. 46 shows the byte string of the main title in the embodiment of the present invention.
Figure 47:
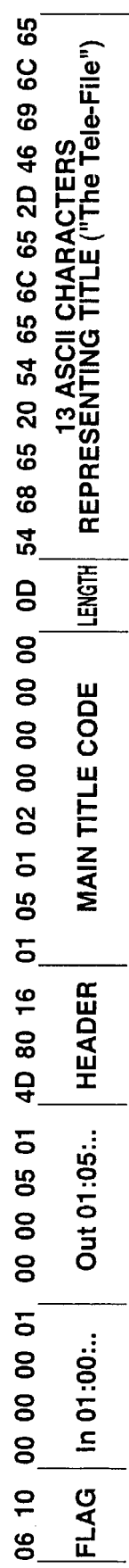
FIG. 47 shows the byte string in the clip package except for the meta data declaration in the embodiment of the present invention.

The main title is read from the semiconductor memory of the memory tag 37. The main title is represented by a byte string consisting of 8 bytes of a declaration that the data is a meta data, 8 bytes of main tile code, 1 byte of a length and 13 bytes of ASCII characters indicative of the main title ("The Tele-File" in this example) as shown in FIG. 46. Since the "meta data" declaration of 8 bytes in the leading position in FIG. 46 are always the same, it is omitted while information such as a status flag, desired in and out pointers and header shown in FIG. 36 are added to the remaining data including the main title code, length and characters of the main title as shown in FIG. 47 to generate a clip package. Note that at this time, the sub title is read from the semiconductor memory and it will be outputted to the magnetic tape or outside when the clip is recorded.

Next, a number of frames/sec for example is determined from a setting made in the VTR. For example, 30 frames/sec is represented by "1Eh" in the hexadecimal notation. These 3 types of meta data will actually form byte strings, respectively, like lines shown in FIG. 48 when the meta data declaration is omitted.

When outputting the meta data to outside or to the magnetic tape, 06h, 0Eh, 2Bh, 34h, 01h, 01h, 01h and 01h are added to their top. When writing them to the semiconductor memory in the memory tag 37, cue point information and header are added to their top. Note that the user can freely select meta data and a clip to which the meta data is to be added and he can add more than one meta data to a single clip. This addition of multiple meta data to one clip is made possible by setting the sixth bit (Flow) in a header of additional information.

Assume here that a number of frames per seconds is written between 00:58:30:00 at the top of the magnetic tape and color bar and a main title is written after the first clip 01:00:00:00 of a main part or a sub title is written in a next packet, and the byte string will be as shown in detail in FIG. 49.

The last line in FIG. 49 is an example including no meta data. The line above the last line indicates a sub title. It is a meta data originally written and written again as it is. The second top line indicates the main title. This is derived from processing, to meta data, of information cited from the common area in the memory tag 37, that is, from copying in the semiconductor memory of the memory tag 37. Of course, the meta data is generated based on an information source other than the memory tag 37 similarly to the first line in FIG. 49 as the case may be.

Note that when outputting the meta data read from the semiconductor memory of the memory tag 37 to outside or the like, the normal UMID defined by SMPTE has to be restored from the UMID read from the memory tag 37. In this embodiment, values in a table shown in FIG. 50 are placed the UMID read from the memory tag 37 to restore the normal UMID from the read UMID. Namely, to restore the normal UMID, there are placed in the blanks in the table in FIG. 50 values read from the memory tag 37, that is, the byte Nos. 11 and 12 of the aforementioned universal label, the frame, seconds, minutes and hours of the time snap and the random number. Prepositional values are placed in the columns "p" corresponding to the Least mode in FIG. 50, and finally the signature meta data follows an instruction which would be when the second bit of the UMID flag is "1". However, when a predetermined value (e.g., "s") is included in the additional information, the meta data is added only to the clip.

Note that the UMID as shown in FIG. 45A is placed after EAV (end of active video) just before the tenth line of a high-definition SID Y channel for example as shown in FIG. 51. Also, the meta data indicative of the title as shown in FIG. 48 has three items thereof placed together after SAV (start of active video) in the tenth line of the high-definition video SID Y channel as shown in FIG. 52. In FIGS. 51 and 52, a 10-bit date string is represented by three hexadecimal digits, in which 8 bits of the lower two digits indicate the same content of the bit Nos. 7 to 0 in the original meta data while the bit No. 9 indicates an even parity of the two digits. The ninth bit is an inversion of the eighth bit. In FIGS. 51 and 52, line feed is made and comments are given for the convenience of the explanation. Actually, however, they form a continuous stream. When the actual serial data has a size of 1.485 G (giga) bps, chroma data are alternately placed in words. That is, in the above example of UMID, the chroma data are 3FF, 3FF, 000,000,000,000, 2D8, 2D8, 200,000,200, 3FF, 200, 3FF, 200, 2FD, 200, 101, 200, 120, . . .

In this embodiment, the label 32 provided with the memory tag 37 to and/or from which meta data including the aforementioned UMID can be written and/or read is attached to the cassette half of the cassette 31 as having previously been described, so that the reader/writer 26 incorporated in the aforementioned VTR or combination cassette/camera (VTR) can be used to easily access the meta data for read and/or write. Also, the reader/writer 50 connected to the terminal 60 can be used to easily access and read and/or write meta data without having to play the magnetic tape. Further, for example, a title can be written before recording and meta data can be read from a recorded tape or additionally written to the recorded tape as in the aforementioned example. Also, UMID generated from information obtained from the built-in control panel and sensors and accessory unit and devices can be written to the memory tag 37. In this embodiment, the memory tag can thus be used to handle meta data in a removable recording medium such as the cassette 31 in an increased range.

Also, when the terminal 60 can read data from the memory tag 37 by means of the reader/writer 50 as in the example having been described with reference to FIG. 11, the meta data can be read without playing a recording medium like the magnetic tape 30 in the cassette 31 for example, which will be helpful to data search and checking. Since the meta data referred to herein complies with the standard such as SMPTE, it may be used in another system. Further, in case input video signals include meta data as in the example shown in FIG. 1, the meta data can be extracted and written to the memory tag 37 as well without operating the control keys or connection to the terminal 60. Moreover, even if input signals include no meta data, this embodiment permits to write meta data to the memory tag 37 by key operation or automatic meta data generation.

Also in this embodiment, UMID defined in SMPTE 330M can have a stationary part thereof omitted, can be classified according to its status flag bits, and can have the common part thereof omitted, whereby the UMID can be compressed in size efficiently. That is, since the data size of each item may be small, a larger number of items can be stored in the semiconductor memory in the memory tag 37 and the total amount of data is reduced so that the UMID can be accessed in a reduced time. Also, the compressed UMID can be restored to the normal UMID. Further, since UMID can be obtained at each cut, it can be effectively used after being edited. Also, since the UMID complies with the applicable standard such as SMPTE, it may be used in another system.

In this embodiment, meta data is generated for writing to the memory tag 37, history information about a process through which to-be-recorded essence (material data) have been created and whether the material data are currently existent is recorded during each edition, and a data format is available in which the history information is stored. Thus, when generating a list of recording media such as cassette tapes, the meta data stored in the memory tag 37 can effectively be used as original data for generation of the list. Therefore, in this embodiment, meta data generated at the time of recording, for example, can be recorded to the memory tag 37 and delivered via a path other than that for video and audio signals in a subsequent operation such as edition. Thus the reliability on the meta data is considerably improved for a higher system efficiency. Also, the listing will be a reduced burden. In effect, the tasks are standardized, and thus the video materials can more effectively be utilized as secondary resources.

Further in this embodiment, meta data prerecorded in the memory tag 37 can be recorded into the cassette 31 at the time of recording, the meta data can be written back to the memory tag 37, meta data generated based on information read from the memory tag 37 can be recorded into the cassette 31, and a new meta data generated based on the information read from the memory tag 37 can be written back to the memory tag 37 and further delivered at an external communication terminal. That is, in the embodiment, a predetermined meta data and information from which meta data can be generated can be prerecorded in the memory tag 37, which can reduce the number of devices and time and labor, required for recording input tasks. Also, in this embodiment, by writing a predetermined meta data including meta data generated at the time of recording back to the memory tag 37, information can be made consistent. Further in this embodiment, the predetermined meta data is outputted while being recorded, sent via a network for example and compiled into the data base, whereby the data base can be arranged without waiting for arrival of a medium. Also, even when no network is available, same information can be obtained from the memory tag 37, whereby the editing work can be done more freely.

Also in this embodiment, time code data including start of recording, good shot, no-good shot, login, logout, etc. can be recorded to the memory tag 37. In the edition system shown in FIG. 11, only video and audio signal materials of a necessary part for the edition can be digitized by reading data recorded in the memory tag 37. Further in the embodiment, meta data including new data (date of edition, editor, reel number, EDL number, etc.) taking place during the edition and data acquired before the edition can be recorded to the memory tag 37 in the edition system. More particularly, in this embodiment, meta data generated during the edition etc. can be recorded to the memory tag 37, and delivered to the downstream edition system via a path other than that for the video and audio signals, so that the meta data can be more reliable and handled more easily and thus the efficiency of the edition system can be improved by making the best of the meta data. Also, by reducing the burden of logging, the editing tasks can be standardized so that the resources can effectively be utilized. Further, meta data can be recorded at the instant of being generated and stored into the memory tag 37 integral with a recording medium, so that the necessary enumeration for storage of the medium can be done with a high efficiency.

As having been described in the foregoing, the meta data can be recorded to the memory tag 37 and reproduced in the embodiment of the present invention. Thus, the present invention can be applied using meta data recorded in the memory tag 37 as follows.

In one of the possible applications of the present invention, in which meta data recorded in the memory tag 37 is used, information about the aforementioned recording points can be recorded to and read from the contactless memory tag 37 by means of the reader/writer. Thus, the cassette 31 can be managed without having to reproduce signals recorded on the magnetic tape 30. For example, the last recording point can easily be accessed and the time from the confirmation that one recording has successfully be done until a next recording is started, whereby there can be built a system easier to operate or an erroneous data erasure-preventive system to prevent any data from being written over an existing record.

When the cassette 31 is inserted into the VTR according to the first embodiment of the present invention, for example, shown in FIG. 1, the reader/writer 26 incorporated in the VTR will recognize the contactless memory tag 37 installed in the cassette 31 and start reading data (meta data) from the memory tag 37. At this time, there are checked information about the ID (random number) (EOSR-ID) stated at the byte Nos. 2h and 3h in the block No. 0009h in the read meta data and used to make a search for the EOS (end of source) point, information about the remain status (RS) stated at the byte No. 4h and indicating the status of the supply reel of the cassette at the EOS point, information about the remain time (RT) stated at the byte No. 5h and which is a value corresponding to a diameter of the tape wound on the supply reel of the cassette at the EOS point, and information about the position of the EOS point stated at the byte Nos. 6h to 9h. Thus, it is possible to manage the cassette 31, access the EOS point, and prevent any data from being erroneously erased. That is, when preventing any data from being written over an existing record, for example, the EOS point should indispensably be located. In this embodiment, the erroneous data erasure is prevented by collating EOS point information recorded in the memory tag 37 with EOS point information recorded on the magnetic tape 30 to locate the end of source point.

Figure 53:
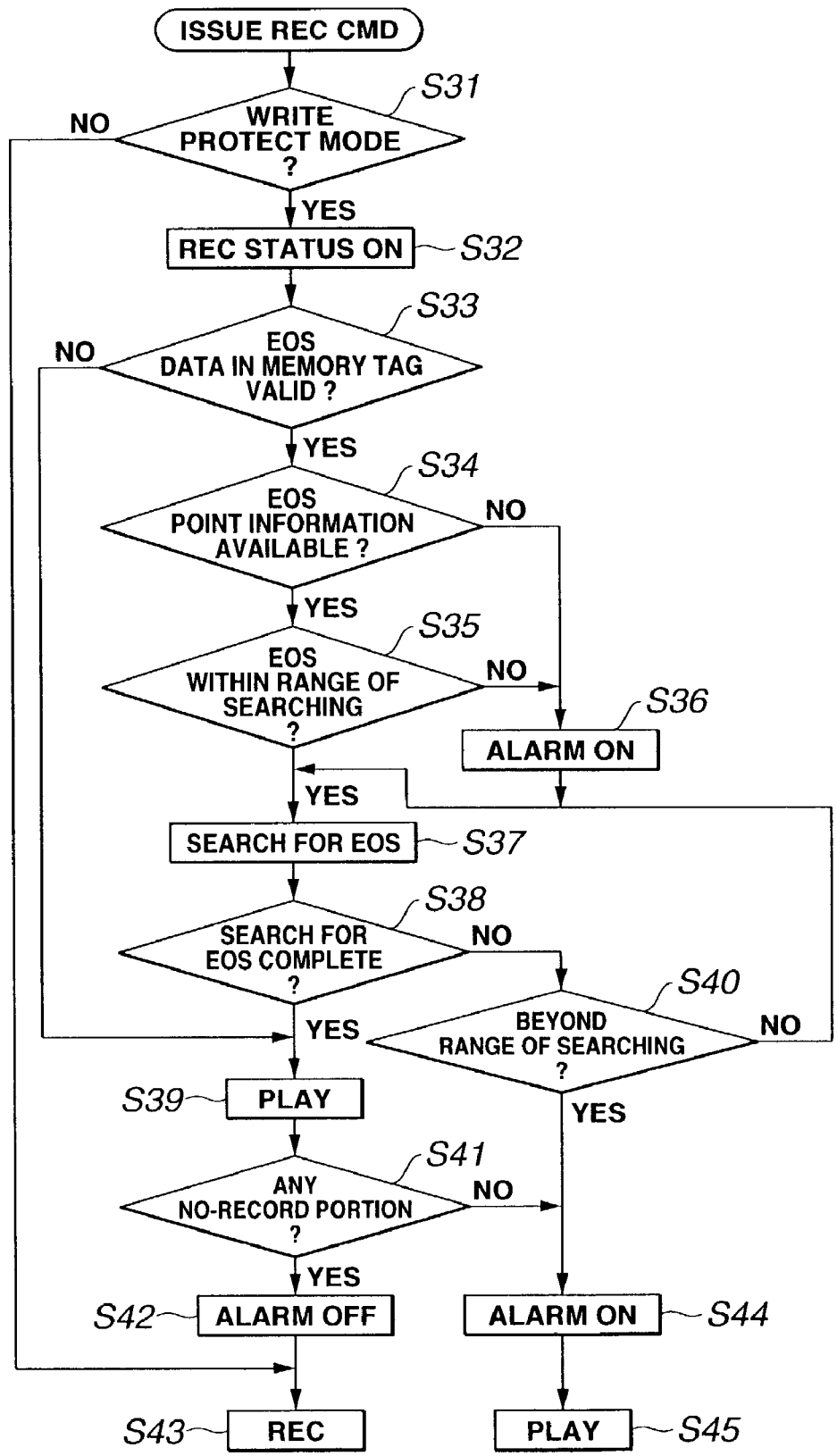
FIG. 53 shows a flow of operations affected in collating end of source point information recorded in a memory tag with end of source point information recorded on a magnetic tape to locate the end of source point and in recording information.

FIG. 53 shows a flow of operations effected in collating EOS point information recorded in the memory tag 37 in the label attached to the cassette 31 with EOS point information recording in the magnetic tape 30 to locate the EOS point and in recording information.

As shown in FIG. 53, first, when the cassette 31 is inserted into th VTR shown in FIG. 1 for example and an instruction for start of recording is made (tape recording command is issued), the CPU 21 in the VTR will judge whether or not the cassette 31 has been set to the write protect mode. When the result of judgment is negative, that is, when the magnetic tape in the cassette 31 is a fresh one or when data may be written over all existing signals in the magnetic tape, for example, the CPU 21 goes to step S43 where it will have the VTR start the recording.

On the other hand, when the result of judgment is that the cassette 31 has been set to the write protect mode, the CPU 21 goes to step S33 where it will turn on the recording status (REC status), an then judge whether or not the EOS data included in the meta data having been read by the reader/writer 26 from the memory tag 37 are valid. If the result of judgment in step S33 is negative, the CPU 21 goes to step S39. On the other hand, when the result of judgment is affirmative, the CPU 21 goes to step S34.

In step S34, the CPU 21 judges whether or not there exists EOS point information. When the result of judgment is negative, the CPU 21 goes to step S36 where it will inform the user of the fact by alarming or display on the monitor 29, and then go to step S37. On the other hand, when the result of judgment in step S34 is affirmative, the CPU 21 goes to step S35.

In step S35, the CPU 21 judges whether or not the EOS point is within a predetermined range of searching. That is, the CPU 21 will judge whether or not the EOS point is within a predetermined searching range in which the EOS point can be searched in 30 seconds which is a length of time derived from conversion of the diameter of wound tape on the reel to a searching time. When the result of the judgment made in step S35 is negative, the CPU 21 informs the user of the fact in step S36, and then goes to step S37. On the other hand, when the result of judgment is that the EOS point is within the predetermined range of searching, the CPU 21 goes to step S37.

When the result of judgment in step S34 is that there exists the EOS point information and the result of judgment in step S35 is that the EOS point is within the predetermined range of searching. the CPU 21 goes to step S37 where it will allow the EOS point searching so that the recording will be started within 5 seconds which however depends upon the distance to the EOS point.

Figure 54A:
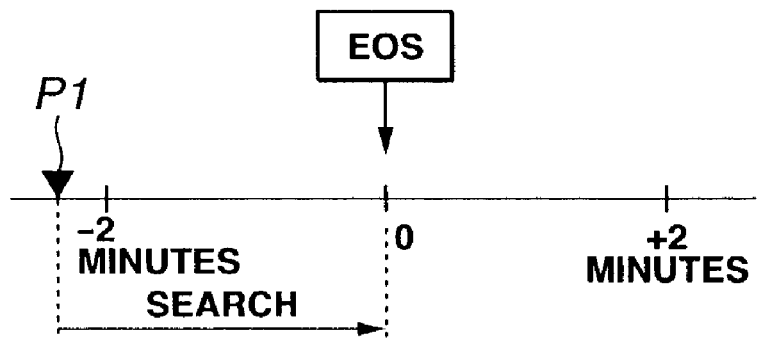
FIGS. 54A to 54D explain the operations in searching for EOS.
Figure 54B:
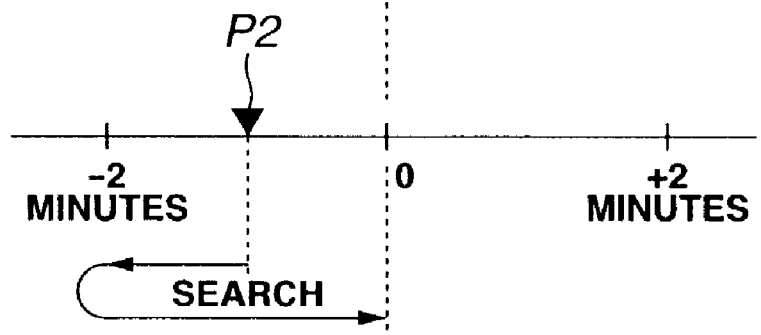
Figure 54C:
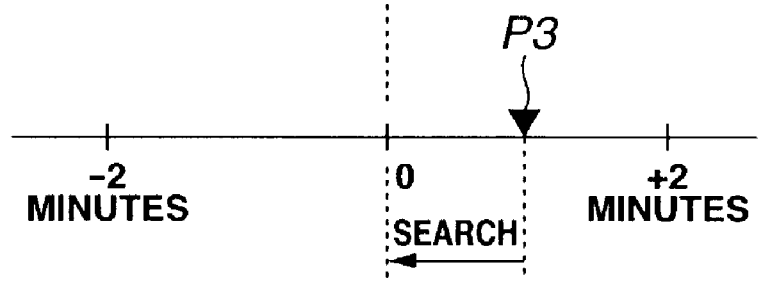
Figure 54D:
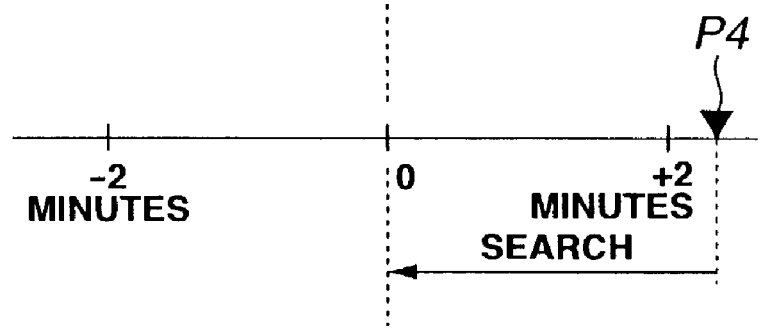

On the other hand, when the result of the judgment made in step S35 is that there exists no EOS point information within the predetermined range of searching, the CPU 21 goes to step S37 where it will allow EOS searching operations to be done as in FIGS. 54A to 54D. As shown, it is assumed that an EOS point is at 0 second. When a distance from a search start point P1 to the EOS point is not within −2 minutes for example, being a searching time derived from conversion of the diameter of the tape wound on the reel as shown in FIG. 54A for example, search is made toward the EOS point. When a search start point P2 is within −2 minutes as shown in FIG. 54B for example, search is made once in a direction away from the EOS point and then toward the EOS point. Also, when a search start point P3 is within 2 minutes from the EOS point as shown in FIG. 54C for example or when a search start point P4 is not within 2 minutes from the EOS point as shown in FIG. 54D for example, search is made toward the EOS point.

The description will be made with reference to FIG. 53 again. After completion of the operation in step S37, the CPU 21 goes to step S38 where it will judge whether or not the EOS point search is complete. That is, in step S38, the CPU 21 makes a comparison between the EOSR-ID and EOS Point time code read from the memory tag 37 and a value (time code) read from the magnetic tape 30 to judge whether or not the EOS point search is complete. When the result of the judgment in step S38 is affirmative, the CPU 21 goes to step S39.

On the other hand, when the result of judgment in step S38 is that the EOS point search is not yet complete, the CPU 21 goes to step S40 where it will judge whether or not the range of searching exceeds +2 minutes being a searching time derived from conversion of the diameter of the tape wound on the reel. When the result of judgment is affirmative, the CPU 21 goes back to step S37. On the other hand, the result of judgment is affirmative, the CPU 21 goes to step S44 where it will inform the user of the fact by alarming or display on the monitor 29, and then goes to step S45 where it will have the VTR start data reproduction and cause a lamp provided in a record button on the control panel to flicker. When the user finds the EOS point and presses the record button in this condition, the EOS point is recorded on the magnetic tape 30.

In step S39, the data reproduction will be started. Thereafter in step S41, the CPU 21 judges whether or not there exists on the magnetic tape 30 a portion of about 15 frames having no data recorded therein. When the result of judgment is negative, the CPU 21 goes to step S44. When the result of judgment is affirmative, the CPU 21 goes to step S42.

In step S42, the alarm is turned off and recording is started in step S43.

As having been described in the forgoing, this embodiment provides a system which prevents any data from being written over an existent record, for example, a system which prevents any data from being erroneously erased without having to make a menu selection or to select a cassette write protection mechanism. Also, in this embodiment, the EOS point can easily be checked even with the cassette being repeatedly inserted and ejected, and the lengths of time for access to a next EOS point and preparation for recording can easily be reduced after confirmation of a recording and reproduction. With these advantages, this embodiment permits to build a system in which the erroneous data erasure and improved recording operability are compatible in specification with each other. As a result, the user can operate the VTR more easily, erroneous data erasure can be prevented by another user of the VTR or in another VTR. Also, even a person being not any specialist such as a video engineer can safely record data with the VTR. Thus, information recording can be done with reduced labor costs and with an improved efficiency.

In a second one of the possible applications of the present invention, in which meta data recorded in the memory tag 37 is used, information about the aforementioned field frequency (FQ) can be recorded to and read from the contactless memory tag 37 by means of the reader/writer. Thus, information about the field frequency and data bit rate of video signals can be acquired without having to replay the magnetic tape 30 in a system in which the field frequency and data bit rate of video signals are variable, so that there can be effected optimum operations for the system.

When the cassette 31 is inserted into the VTR according to the first embodiment of the present invention, for example, shown in FIG. 1, the reader/writer 26 incorporated in the VTR will recognize the contactless memory tag 37 attached to the cassette 31 and start reading data (meta data) from the memory tag 37. At this time, the field frequency and data bit rate of the video signals recorded in the magnetic tape 30 can be identified by checking information about the field frequency (recording video frequency) and data bit rate (video recording bit data) recorded at the byte No. Bh in the block No. 000Ah of the read meta data as shown in FIG. 33. The VTR according to the present invention is adapted to change various settings and parameters intended for video signal processing within itself according to the field frequency and data bit rate. Thus, th video signals recorded in the magnetic tape 30 can be processed optimally. Therefore, the VTR according this embodiment can prevent video noises from being caused by signal processing with wrong field frequency and data bit rate and thus can reproduce and record images optimally and smoothly.

For example, when the previously described edition system according to the third embodiment, shown in FIG. 11, is used to make a nonlinear edition of signals recorded in the cassette 31 loaded in the VTRs 71 and 72, the signals can be off-line edited as follows. It is assumed here that the cassette 31 is first loaded into the VTR 71 and then into the VTR 72. With the cassette 31 loaded in the VTR 71, the latter will use the reader/writer 26 to read meta data from the memory tag 37 in the label attached to the cassette 31 and send the read meta data to the terminal 60. The terminal 60 stores information about the field frequency and data bit rate included in the meta data sent from the reader/writer 26 of the VTR 71. Next, when the cassette 31 is loaded in the VTR 72, the latter will also use, like the VTR 71, the reader/writer 26 to read meta data from the memory tag 37 in the label attached on the cassette 31 and send the read meta data to the terminal 60. The terminal 60 compares the information about the field frequency and data bit data sent from the reader/writer 26 of the VTR 71 with the information about the field frequency and data bit rate sent from the reader/writer 26 of the VTR 72. When these pieces of information are same in content as each other, the editor is informed, by a display on the monitor, for example, that the data can be edited as they are. On the other hand, if the pieces of information are different in content from each other, the editor is given, by displaying on the monitor or voicing, for example, an alarm that the data cannot be edited since the edition will be made using the video signals of different field frequency and data bit rate if they are edited as they are. Thus, data edition can be made without any unnecessary burden to the editor and any system trouble during the edition.

Also, for example, when the previously described edition unit 74 in the edition system according to the third embodiment, shown in FIG. 11, is used to make an on-line linear edition of signals recorded in the cassette 31 loaded in the VTRs 71 and 72, the signals can be linearly edited optimally as follows. It is assumed here that the cassette 31 is first loaded into the VTR 71 and then into the VTR 72. With the cassette 31 loaded in the VTR 71, the latter will use the reader/writer 26 to read meta data from the memory tag 37 in the label attached to the cassette 31 and send the read meta data to the edition unit 74. The edition unit 74 uses information about the field frequency and data bit rate included in the meta data sent from the reader/writer 26 of the VTR 71 to change or initialize various settings and parameters intended for use to process video signals during the on-line edition. Next, when the cassette 31 is loaded in the VTR 72, the latter will also use, like the VTR 71, the reader/writer 26 to read meta data from the memory tag 37 in the label attached on the cassette 31 and send the read meta data to the edition unit 74. The edition unit 74 compares the information about the field frequency and data bit data sent from the reader/writer 26 of the VTR 71 with the information about the field frequency and data bit rate sent from the reader/writer 26 of the VTR 72. When these pieces of information are same in content as each other, the editor is informed, by a display on the monitor, for example, that the data can be edited linearly as they are. On the other hand, if the pieces of information are different in content from each other, the editor is given, by displaying on the monitor, for example, an alarm that the data cannot be edited since the edition will be made using the video signals of different field frequency and data bit rate if they are edited as they are. Thus, data edition can be made without any unnecessary burden to the editor and any system trouble during the edition.

Information is read from the memory tag 37 on the cassette 31 loaded in the VTR by the reader/writer 26 incorporated in the VTR as above, but it should be noted that with respect to the cassette 31 not yet loaded in the VTR, for example, the reader/writer 50 designed as a handy-type unit can be used to pre-check the information about the field frequency and data bit rate. In this case, it is possible in the edition system for the above nonlinear edition to compare settings of the system itself (values stored as system settings in the terminal 60) with information about the field frequency and data bit rate of video signals recorded in the cassette 31 and read by the reader/writer 50, thereby permitting to detect a cassette 31 having been set differently from the system settings. Thus, a cassette which cannot be edited can be found before starting any data edition. Also, by storing information about the field frequency and data bit rate used in the edition system into a handy-type reader/writer 50 in advance, reading the information about the field frequency and data bit rate from the memory tag 37 of a cassette 31 the editor wants to use for edition and comparing the pieces of information thus stored and read with each other, it is possible to detect a cassette which cannot be used in the nonlinear edition system without using the terminal 60 or the like.

As above, since this embodiment can detect, before the edition system is put into use, whether the system is usable, that is, it can detect a field frequency and data bit rate of video signals to avoid the use of the system by alarming or otherwise before actually recording or reproducing the signals to or from the cassette 31, it is possible to prevent video noises from being caused by editing video signals different in field frequency and data bit rate from each other. Thus, data can smoothly be edited. Since video noises can thus be prevented, it can be avoided that the monitor may possibly malfunction due to video noises caused by any inappropriate edition, which will contribute very much to a reduction of the maintenance cost. Further, since this embodiment can use the handy-type reader/writer 50, for example, to detect a cassette which cannot be used in an off-line manner in the edition system, it is possible to prevent any unusable cassette from being loaded into the edition system. Thus, according to this embodiment, the edition system is more easily usable by the operator (editor) since it is possible to automatically detect any inapplicability of the system and thus avoid putting the system into operation.

In a third one of the possible applications of the present invention, in which meta data recorded in the memory tag 37 is used, information about the aforementioned audio stats (AD status) can be recorded to and read from the contactless memory tag 37 by means of the reader/writer. Thus, information about the recording method having been used for recording audio signals existent in the magnetic tape 30 can be acquired without having to reproduce the audio signals recorded in the magnetic tape 30, so that the signals can be processed optimally for the recording method.

When the cassette 31 is inserted in the VTR according to the first embodiment of the present invention, for example, shown in FIG. 1, the reader/writer 26 incorporated in the VTR will recognize the contactless memory tag 37 attached to the cassette 31 and start reading data (meta data) from the memory tag 37. At this time, the recording method having been used for recording the audio signals existent in the magnetic tape 30 can be detected by checking information about the audio status information recorded at the byte Nos. Ch to Fh in the block No. 000Ah of the read meta data. The VTR according to this embodiment is adapted to change various settings and parameters intended for audio signal processing within itself according to the recording method for the audio signals. Thus, th audio signals recorded in the magnetic tape 30 can be processed optimally. Therefore, the VTR according this embodiment can prevent audio noises from being caused by any inappropriate signal processing and thus can reproduce and record sounds optimally and smoothly.

For example, when the previously described edition system according to the third embodiment, shown in FIG. 11, is used to make a nonlinear edition of signals recorded in the cassette 31 loaded in the VTRs 71 and 72, the signals can be off-line edited as follows. It is assumed here that the cassette 31 is first loaded into the VTR 71 and then into the VTR 72. With the cassette 31 loaded in the VTR 71, the latter will use the reader/writer 26 to read meta data from the memory tag 37 in the label attached to the cassette 31 and send the read meta data to the terminal 60. The terminal 60 stores audio status information in the meta data sent from the reader/writer 26 of the VTR 71. Next, when the cassette 31 is loaded in the VTR 72, the latter will also use, like the VTR 71, the reader/writer 26 to read meta data from the memory tag 37 in the label attached on the cassette 31 and send the read meta data to the terminal 60. Then, the terminal 60 compares the audio status information sent from the reader/writer 26 of the VTR 71 with the audio status information sent from the reader/writer 26 of the VTR 72. When these pieces of audio status information are same in content as each other, the editor is informed, by a display on the monitor, for example, that the data can be edited as they are. On the other hand, if the pieces of information are different in content from each other, the editor is given, by displaying on the monitor or voicing, for example, an alarm that the data cannot be edited since the edition will be made using the audio signals recorded by a different recording method if they are edited as they are. Thus, data edition can be made without any unnecessary burden to the editor and any system trouble during the edition.

Also, for example, when the previously described edition unit 74 in the edition system according to the third embodiment, shown in FIG. 11, is used to make an on-line linear edition of signals recorded in the cassette 31 loaded in the VTRs 71 and 72, the signals can be linearly edited optimally as follows. It is assumed here that the cassette 31 is first loaded into the VTR 71 and then into the VTR 72. With the cassette 31 loaded in the VTR 71, the latter will use the reader/writer 26 to read meta data from the memory tag 37 in the label attached to the cassette 31 and send the read meta data to the edition unit 74. The edition unit 74 uses audio status information in the meta data sent from the reader/writer 26 of the VTR 71 to change or initialize various settings and parameters intended for use to process audio signals during the on-line edition. Next, when the cassette 31 is loaded in the VTR 72, the latter will also use, like the VTR 71, the reader/writer 26 to read meta data from the memory tag 37 in the label attached on the cassette 31 and send the read meta data to the edition unit 74. The edition unit 74 compares the audio status information sent from the reader/writer 26 of the VTR 71 with the audio status information sent from the reader/writer 26 of the VTR 72. When these pieces of information are same in content as each other, the editor is informed, by a display on the monitor, for example, that the data can be edited linearly as they are. On the other hand, if the pieces of information are different in content from each other, the editor is given, by displaying on the monitor, for example, an alarm that the data cannot be edited since the edition will be made using the audio signals having been recorded in a different recording method if they are edited as they are. Thus, data edition can be made without any unnecessary burden to the editor and any system trouble during the edition.

Information is read from the memory tag 37 on the cassette 31 loaded in the VTR by the reader/writer 26 incorporated in the VTR as above, but it should be noted that with respect to the cassette 31 not yet loaded in the VTR, for example, the reader/writer 50 designed as a handy-type unit can be used to pre-check the audio status information. In this case, it is possible in the edition system for the above nonlinear edition to compare settings of the system itself (values stored as system settings in the terminal 60) with the audio status information about the audio signals recorded in the cassette 31 and read by the reader/writer 50, thereby permitting to detect a cassette 31 having been set differently from the system settings. Thus, a cassette which cannot be edited can be found before starting any data edition. Also, by prerecording the audio status information into a handy-type reader/writer 50, reading the audio status information from the memory tag 37 of a cassette 31 the editor wants to use for edition and comparing the pieces of information thus stored and read with each other, it is possible to detect a cassette which cannot be used in the nonlinear edition system without using the terminal 60 or the like.

As above, since this embodiment can detect, before the edition system is put into use, whether the system is usable, that is, it can detect a recording method used for audio signals going to be processed to avoid the use of the system by alarming or otherwise before actually recording or reproducing the signals to or from the cassette 31, it is possible to prevent audio noises from being caused by editing audio signals having been recorded by a wrong recording method. Thus, data can smoothly be edited. Since audio noises can thus be prevented, it can be avoided that the speaker, amplifier, etc. may possibly be damaged due to audio noises caused by any inappropriate edition, which will contribute very much to a reduction of the maintenance cost. Further, since this embodiment can use the handy-type reader/writer 50, for example, to detect a cassette which cannot be used in an off-line manner in the edition system, it is possible to prevent any unusable cassette from being loaded into the edition system. Thus, according to this embodiment, the edition system is more easily usable by the operator (editor) since it is possible to automatically detect any inapplicability of the system and thus avoid putting the system into operation.

In a fourth one of the possible applications of the present invention, in which meta data recorded in the memory tag 37 is used, information about times of threading of the cassette 31 can be recorded to and read from the contactless memory tag 37 by means of the reader/writer. Thus, the use of the cassette 31 can be managed.

When the cassette 31 is inserted in the VTR according to the first embodiment of the present invention, for example, shown in FIG. 1, the reader/writer 26 incorporated in the VTR will recognize the contactless memory tag 37 attached to the cassette 31 and start reading data (meta data) from the memory tag 37. At this time, the service conditions of the cassette 31 can be known by checking information about the number of times the cassette has been threaded, recorded at the byte Nos. Ah and Bh in the block No. 0009h of the read meta data. The use of the cassette can be managed based on the result of checking, concerning whether it can be used or not and how many times it can be used subsequently. Note that the items of management and operations using the same include "management of number of times cassette has been threaded to VTR", "monitoring of number of times of cassette has been threaded and display of corresponding alarm", and "management system for number of times cassette has been used".

First, the management of the number of times the cassette has been threaded to the VTR will be described.

For example, it is assumed that the cassette 31 is loaded in the VTR in the system shown in FIG. 1. In this case, the VTR will use the reader/writer 26 incorporated therein to read meta data from the memory tag 37 in the label attached to the cassette 31, check, in the read meta data, information about the number of times the cassette 31 has been threaded, and increment the number of times of cassette threading by one and update information about the number of times the cassette 31 has been threaded, recorded in the memory tag 37.

In this embodiment, when the result of checking the number of threaded times shows that the number of threaded times has become larger than a certain value, an alarm will be issued and the following will be done correspondingly to the result of checking.

For example, the VTR shown in FIG. 1 has a function to display a maintenance prompt on the monitor 29 provided on the control panel 28. When the maintenance prompt display function is started, it is possible to check the number of times a cassette has been threaded. Also, the VTR according to this embodiment has a function to display an alarm when the number of threaded times the loaded cassette exceeds a value, and a function to judge whether an alarm has to be displayed, depending on the error level of signals reproduced from the magnetic tape 30 even if the number of threaded times is less than the value.

Figure 55:
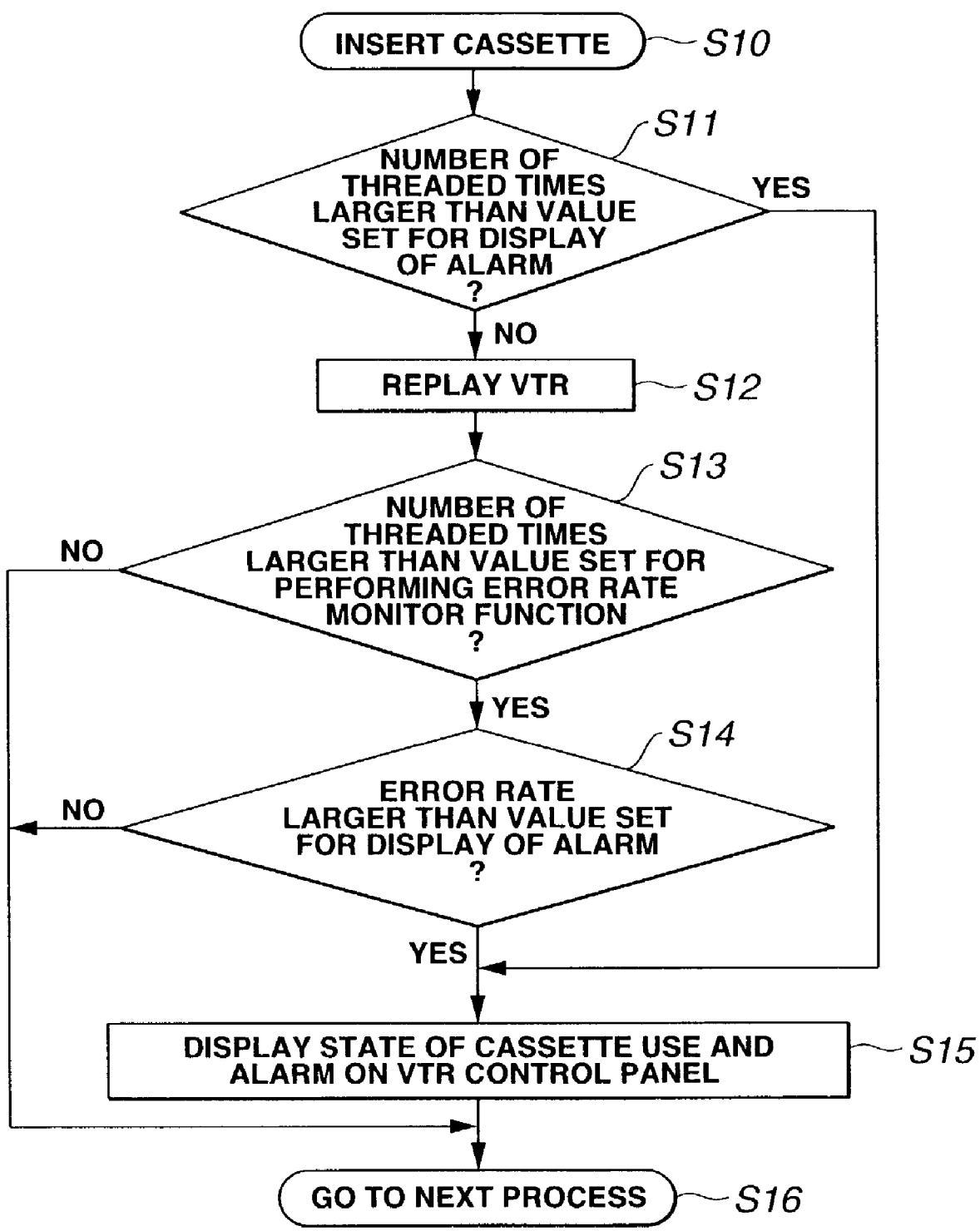
FIG. 55 shows a flow of operations in displaying an alarm depending upon the number of times of cassette threading.

FIG. 55 shows a flow of operations effected in displaying an alarm depending upon the number of threaded times. As shown in FIG. 55, first in step S10, the cassette 31 is inserted into the VTR. In step S11, the reader/writer 26 in the VTR reads meta data from the memory tag 37 in the label 32 attached to the cassette 31, check, in the read meta data, information about the number of threaded times the cassette 31 has been threaded, and judge whether the number of threaded times is larger than a set value for display of an alarm.

When the result of the judgment in step S11 is that the number of threaded times is larger than a value set for display of the alarm, an alarm concerning the use of the cassette will be displayed on the monitor 29 of the control panel 28 in step S15.

On the other hand, if the result of the judgment made in step S11 is that the number of threaded times is less than the value set for alarm display, data is read from the loaded cassette 31 in step S12.

Then in step S13, it is judged whether the number of times of cassette threading is larger than a preset value for execution of error rate monitoring.

When it is judged in step S13 that the number of times the cassette has been threaded is less than the preset value, an operation will be done in step S16 as follows.

On the other hand, if the result of the judgment made in step S13 is that the number of threaded times is larger than the preset value, it will be judged in step S14 whether the error rate of signals read from the magnetic tape 30 is larger than a value preset for display of an alarm.

If it is judged in step S14 that the error rate is less than the preset value for alarm display, an operation will be done in step S16 as follows.

On the other hand, if the result of the judgment made in step S14 is that the error rate is larger than the preset value for alarm display, an alarming of the cassette use will be displayed on the monitor 29 on the control panel 28 in step S15.

With the above operations, the VTR operator or cassette manager can know the use of the cassette.

Next, the edition system shown in FIG. 11 will be taken by way of example for description of the cassette management based on the number of times of cassette threading.

In the edition system shown in FIG. 11, the terminal 60 uses the external handy-type reader/writer 50 to read the content of the memory tag 37 provided in the label 32 attached to the cassette 31. A cassette-use management software according to this embodiment is installed in the terminal 60. That is, the cassette-use management software includes a function for initial issuance of the memory tag 37, function to manage information about the number of times of cassette threading with information recorded in the memory tag 37 provided in the label 32 on the cassette 31, and other functions. More particularly, the information recorded in the memory tag 37 provided in the label 32 on the cassette 31 is read by the reader/writer 50 and the management software instructs the user to discard the cassette or change the intended use of the cassette 31 based on the used frequency and current intended use of the cassette 31.

FIG. 56 shows an example of the management table for use to manage the cassette.

When the reader/writer 50 has read information from the memory tag 37 provided in the label 32 on each cassette 31, the management software will have the monitor at the terminal 60 display a management table based on the information read from the memory tag 37, as shown in FIG. 56 for example, and combine the intended use of the cassette 31 and information about the number of times of cassette threading to show the cassette use to the user. The management table will further be described. As shown in FIG. 56, a cassette having an ID "HD-10001", for example, will be judged to be "excellent" (that is, it is further usable) because the untended use is "library" and the current number of times the cassette has been threaded is "6". A cassette having an ID "D2-22029" will be judged to be "fair" (that is, it is still usable) because the intended use is "drama" and current number of threaded times is "20". Also, a cassette having an ID "SX-23478" will be judged to be "not fair" (that is, it should not be used any longer) because the intended use is "sharing" and number of threaded times is "100". Further, a cassette having an ID "IMX-67870" will be judged to be "good" because the intended use is "sharing" and number of threaded times is "20".

The result of judgment of the cassette having the ID "D2-22029" is different from that of the cassette having the ID "IMX-67870" thought the cassettes have been threaded the same number of times. The reason for the above lies in the difference in intended use between them. Namely, a cassette whose intended use is "drama" should be as good in usage as possible (the magnetic tape status is good) while a cassette intended for "sharing" may be allowed for a little tape degradation. In case it is prescribed that a tape intended for "sharing" should be discarded after it has been threaded more than 100 times, the cassette having the ID "SX-23478" having been threaded 100 times should be discarded, and a comment like "To be discarded on Jun. 19, 2000 " will be stated for the cassette in the management table as shown in FIG. 56.

Figure 57:
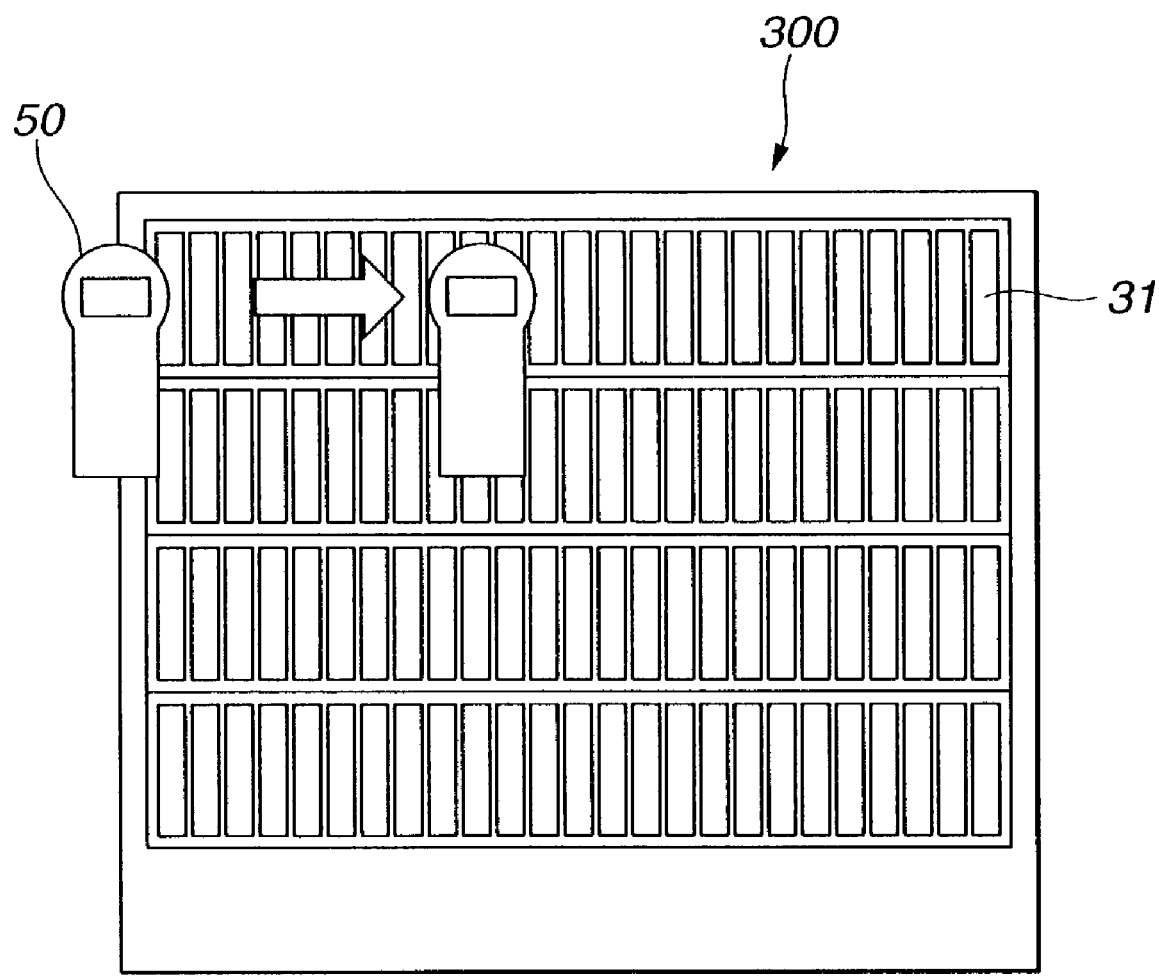
FIG. 57 explains the sequential scanning of information in the contactless memory tag of a plurality of cassettes stored in a cassette rack.

Also, in this embodiment, the terminal 60 and handy-type reader/writer 50 as shown in FIG. 11 and corresponding to the management table as shown in FIG. 56 can be used to read information about the number of times of cassette threading directly from the memory tag 37 provided in the label on the cassette 31, whereby information in the memory tag 37 in each of a plurality of cassettes 31 stored in a rack 300 as shown in FIG. 57 can sequentially be scanned to judge whether each cassette 31 stored in the rack 300 should be discarded or not and any cassette can be detected which is different in intended use from other cassettes in each of rack blocks in which cassettes whose intentions of use are in the same or similar category are stored.

Since this embodiment permits to detect a number of times the cassette has been used and the degree of deterioration of the magnetic tape 30, so it can be judged in an objective manner whether the cassette should be discarded or not. Also, since this embodiment permits to prevent a deteriorated magnetic tape 30 from being used, use of the cassette or magnetic tape can be managed for stable recording and reproduction of data. Further, since a repeatedly used cassette and work cassette and an archive cassette are used for their respective purposes, respectively, the running costs can be reduced effectively. Also, since this embodiment permits the system to automatically detect a tape having been used more than its service life and issue a warning (as a safety feature), the system operator can manage the system more easily. In addition, this embodiment permits to manage the tape in an off-line environment by the use of the handy-type reader/writer 50.

Next, the contactless memory tag 37 and its reader/writers 26 and 50 will be described in detail with reference to FIGS. 58 to 62.

Figure 58:
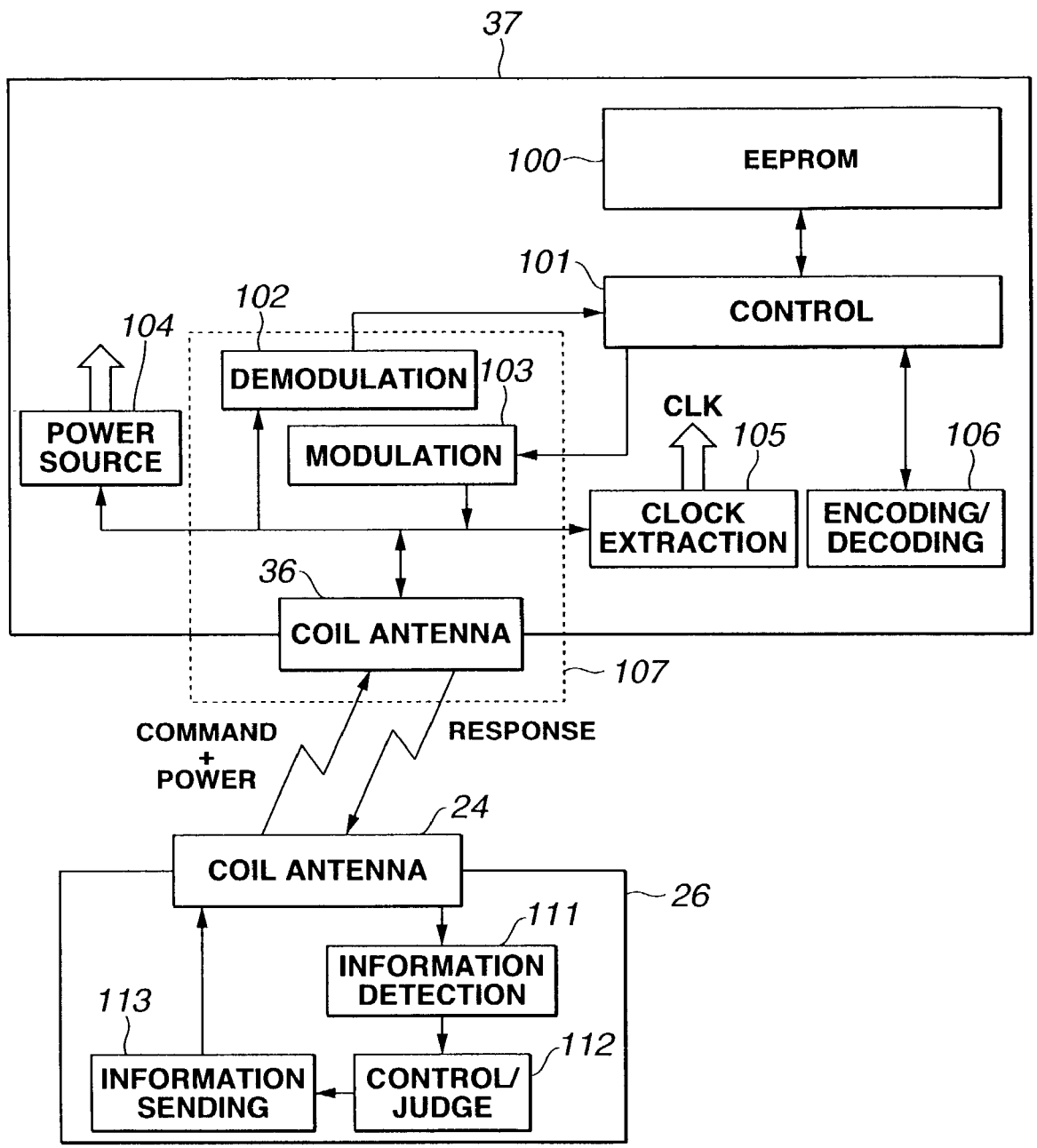
FIG. 58 is a schematic block diagram of the contactless memory tag and reader/writer.

FIG. 58 is a schematic block diagram explaining the functions of the contactless memory tag 37 and reader/writer 26.

When the distance of the contactless memory tag 37 from the reader/writer 26 which generates an electromagnetic field around itself is less than a one which it can sense the electromagnetic field, it senses the electromagnetic field and acts to exchange information with the reader/writer 26 with no contact with the latter.

Prior to detailed description of the contactless memory tag 37, there will outlined the appearance of the main components of the contactless memory tag 37 and the operations in using the memory tag 37 by the reader/writer 26.

Figure 59:
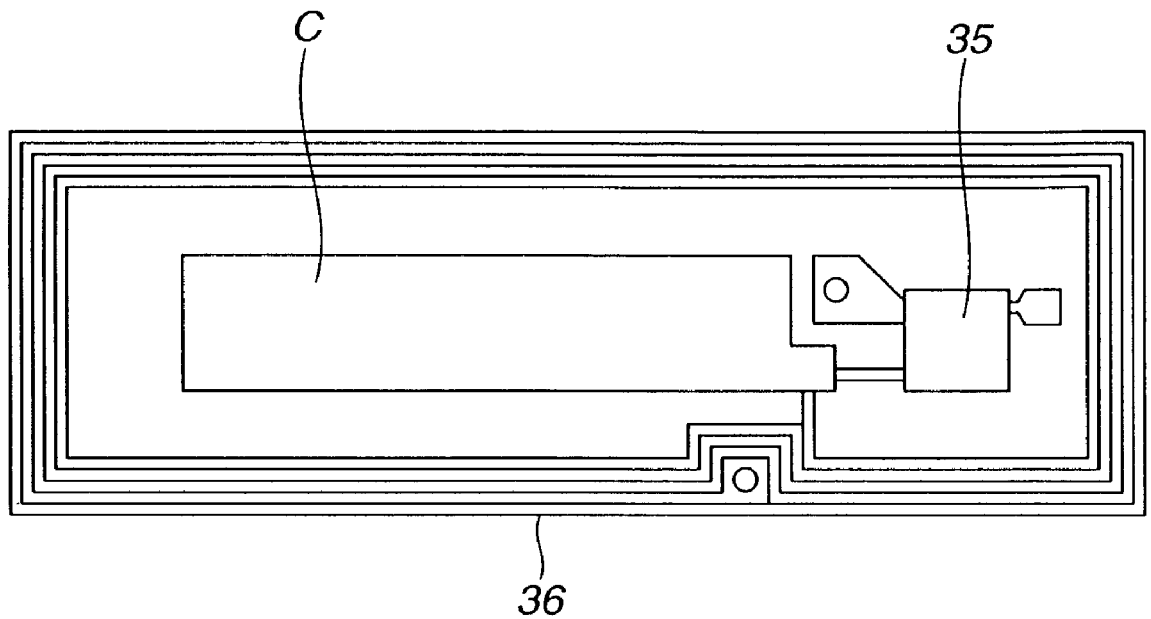
FIG. 59 is an external view of the contactless memory tag formed in a one-chip design.

FIG. 59 shows the appearance of the contactless memory tag 37 of a one-chip type. As shown in FIG. 59, the memory tag 37 includes the coil antenna 36 formed like a loop from a electroconductive pattern on a chip being a base of the antenna, and the IC chip 35 and a capacitor C connected to the coil antenna 36. Note that the capacitor C is provided to adjust a resonance frequency.

As shown, the contactless memory tag 37 includes a transmitter/receiver 107 consisting of the coil antenna 36 inductively coupled to the coil antenna 24 of the reader/writer 26 by means of the electromagnetic field to exchange information with the coil antenna 24 by mutual induction with no contact with the latter and also receive a power from the coil antenna 24, a demodulator 102 and modulator 103, a power source 104 connected to the coil antenna 36, a demodulator 102 and modulator 103, respectively, a clock extraction unit 105, a controller 101 to control the system operation, a codec 106 connected to the controller 101, and a rewritable semiconductor memory 100 connected to the controller 101 and needing not the aforementioned record holding operation.

The demodulator 102 equalizes an induced current produced in the coil antenna 36, detects and demodulates the induced current to restore information, and supplies it to the controller 101. The modulator 103 modulates a reflected wave by intermittently connecting a load impedance to the coil antenna 36 based on response information derived from encoding of the reproduced or restored information supplied from the controller 101, or intermittently connecting a load connected directly or indirectly to the power source 104 based on the response information or supplying the coil antenna 36 with a carrier wave of another frequency modulated with the response information (e.g., ASK modulation).

More particularly, in case the load impedance to the coil antenna 36 is controlled based on the response information as above, the reflectance of the coil antenna 36 is controlled by switching the load impedance from one to another based on the response information when emitted, from the reader/writer 26, the reflected component of the carrier wave from the coil antenna 36 on which the electromagnetic field acts continuously, whereby the reflected wave is modulated with the response information.

On the other hand, in case the load to the power source is controlled based on the response information, the impedance at the inductively coupled memory tag 37 is varied by changing the load applied to the power source 104 from one to another by switching the load from one to another based on the response information, whereby the reflected wave is modulated. An impedance variation at the memory tag 37 is detected as a terminal voltage variation or supplied power amount at the coil antenna 24 at the inductively coupled reader/writer 26.

As above, the reflected wave is modulated by demodulating information by processing an induced current produced due to mutual induction when the coil antenna 36 of the memory tag 37 has received electromagnetic wave emitted from the reader/writer 26, and then by transmitting the information via controlling the load impedance to the coil antenna 36 based on information transmitted to the reader/writer 26 (information transmission by the reflected component of carrier wave), via controlling the load to the power source at the memory tag 37 based on information transmitted to the reader/writer 26 (information transmission by varying the impedance) or via modulating a carrier wave of another frequency with information transmitted to the reader/writer 26 and supplying a power to the coil antenna 36 (information transmission by a wave of another frequency transmitted from the memory tag 37).

The power source 104 receives and rectifies a high frequency induced current produced by the mutual induction by the coil antenna 36 via the electromagnetic field, and supplies it to each component of the memory tag 37. For production of a stabler direct-current voltage, a voltage regulation circuit may be provided in the memory tag 37. Each of the components can operate on the power thus supplied. Therefore, the memory tag 37 needs not any special power source such as a battery. Needless to say, however, any other power source such as a battery can be used as a main or sub power source.

The clock extraction unit 105 has a frequency division circuit to generate a clock signal of a carrier frequency based on the carrier wave received by the coil antenna 36, and divide the clock signal to generate a master clock which serves as an operation reference clock for each digital circuit.

As above, the semiconductor memory 100 records meta data etc. about the cassette 31 having attached thereto a label including the memory tag 37 and recorded materials, and each piece of information is recorded and reproduced in the aforementioned memory map under the control of the controller 101.

The controller 101 sends, to the codec 106, the received demodulated signal added by the transmitter/receiver 107. The codec 106 decodes the information supplied from the controller 101 and makes error correction of the decoded information with CRC code, and returns it to the controller 101. The controller 101 extracts indicative information from the information received from the codec 106. Thus, the information added by the reader/writer 26 via the electromagnetic field is restored.

Also, the codec 106 adds error correction code such as CRC code to the information returned from the controller 101, and returns, to the controller 101, response information derived from encoding of the data having the error correction code added thereto.

The codec 106 has also a function to correct errors in a data. In addition, it may be provided with a function of encrypting/decrypting data. Further, it may be provided with any correction circuit other than the CRC correction circuit.

The controller 101 is constructed as a semiconductor logic circuit having a controlling function to send a demodulation signal supplied from the demodulator 102 to the codec 106 based on a clock supplied from the clock extraction circuit 105, extract various kinds of information based on the error-corrected signal, separate and extract recording information, analyze these pieces of indicative information and process them in a predetermined manner and procedure. The semiconductor sequence controller technology for judging conditions by following such a predetermined procedure to open and close a plurality of gates sequentially as the time elapses, is widely applied in various fields of industry, and the controller 101 utilizes this technology.

On the other hand, the modulator 103 having received information via the controller 101 modulates information in a predetermined manner. Receiving the modulated information from the modulator 103, the transmitter/receiver 107 transmits modulated signals to the reader/writer 26 via the coil antenna 36. This transmission is based on any of the aforementioned transmission methods using the transmission function of the memory tag 37, reflected wave or impedance variation.

Figure 60:
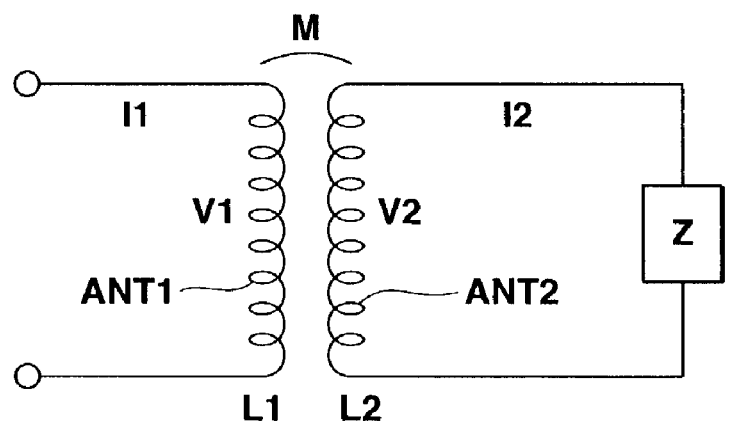
FIG. 60 is a circuit diagram of the inductively coupled four-terminal network.

Next, the theory of detection, by the reader/writer 26, of contents in the semiconductor memory 100 in the memory tag 37 will be described with reference to FIGS. 60 and 61.

The coil antenna 24 at the reader/writer 26 is taken as the first antenna while the coil antenna 36 at the memory tag 37 is taken as the second antenna. The first and second antennas are opposite to each other. A magnetic field is produced when a current flows through the first antenna. When the magnetic field is captured by the second antenna, the magnetic filed produced by the current through the first antenna varies correspondingly to a variation of the current through the first antenna. Thus, the magnetic flux through the second antenna varies and a mutual induction produces an electromotive force in the second antenna. The electromotive force V2 produced in the second antenna is proportional to the change of the current I1 through the first antenna. Under the conditions of the first and second antennas being tuned to each other, the electromotive force V2 is given by the following formula (1). A current I2 through the second antenna depends upon the characteristic of a circuit connected to the second antenna.

$$V2 = M(dI1/dt) \quad (1)$$

where M: Mutual inductance.

On the other hand, to the coil antenna 36 (second antenna) at the memory tag 37, there is connectable a resistor or reactance (inductive reactance ωL or capacitive reactance 1/ωC) as a load impedance, and the intermittent connection of the load impedance to the second antenna is controlled according to the content ("1" or "0") of data sent from the memory tag 37.

The reader/writer 26 is taken as the primary side while the memory tag 37 inductively coupled to the reader/writer by the mutual inductance is taken as the secondary side. When the total impedance of the secondary side is Z, the primary and second sides can be handled as an inductively coupled four-terminal network as shown in FIG. 60. An impedance Zie measured at the primary side is computed as follows.

Assume here that the angular frequency is ω and the inductance is L1, electromotive force is V1, the current is I1 at the coil antenna 24 of the reader/writer 26 while the inductance is L2, electromotive force is V2, and current is I2 at the coil antenna 36 of the memory tag 37, and that the mutual inductance of the coil antennas 24 and 36 is M. Under the conditions of the antennas 24 and 36 being tuned to each other, the induced electromotive force V1 is given by the following formula (2) and induced electromotive force V2 is given by the following formula (3).

$$V1 = j\omega*L1*I1 + j\omega*M*I2 \quad (2)$$

$$V2 = j\omega*M*I1 + j\omega*L2*I2 \quad (3)$$

Since the direction of the current I2 is reversed, the following formula (4) will result.

$$V2 = -Z*I2 \quad (4)$$

As above, the impedance Zie at the reader/writer 26 will be a sum of jω*(L1−M**2/L2) as the first term and jω*(M**2)*Z/L2*(Z+jω*L2) as the second term, where "**" means squaring.

By translating the above second term as the following formulae (5) and (6), 1/(u2+u3) is given.

$$u2 = L2/j\omega*(M**2) \quad (5)$$

$$u3 = (L2**2)/Z*(M**2) \quad (6)$$

Therefore, take the first term as u1, and the impedance Zie at the reader/writer 26 will be given by the following formula (7).

$$Zie = u1 + 1/(u2+u3) \quad (7)$$

Figure 61:
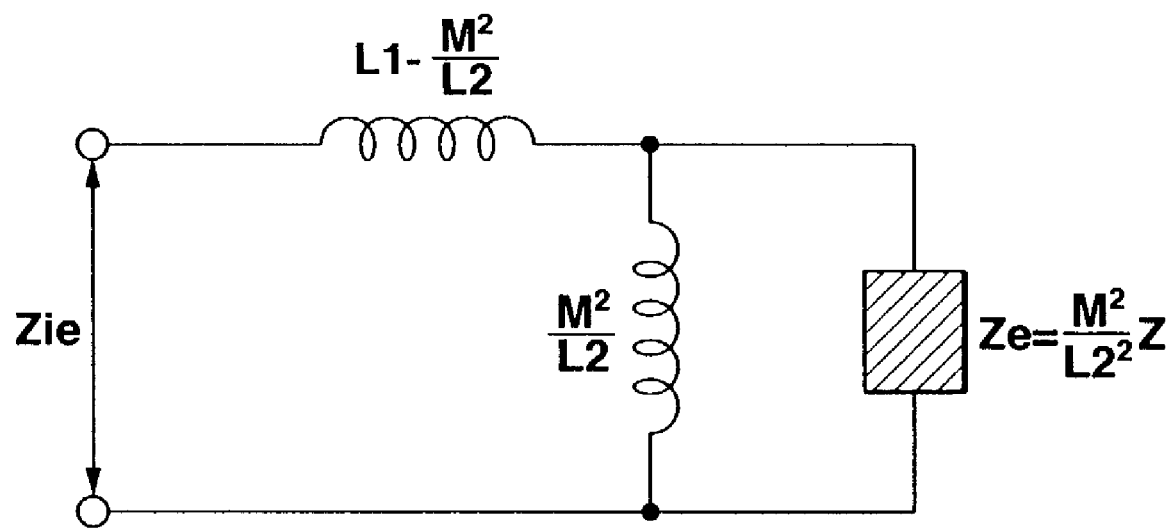
FIG. 61 is a circuit diagram of an equivalent circuit of the inductively coupled four-terminal network in FIG. 60.

As a result, an equivalent circuit of the inductively coupled four-terminal network can be formed as shown in FIG. 61.

In case the circuit is controlled so that the impedance Z at the memory tag 37 is an indefinite impedance according to the content ("1" or "0"; for example, "1") of data to be sent, the term including "Z" in the following formula (8) becomes infinitesimal. Thus, the status "1" of the data is observed as an impedance given by the following formula (9) at the reader/writer 26.

$$u3 = (L2**2)/Z*(M**2) \quad (8)$$

$$Zie1 = j\omega*L1 \quad (9)$$

On the other hand, in case the circuit is controlled so that the impedance Z at the memory tag 37 is zero impedance according to the content ("1" or "0"; for example, "0") of data to be sent, the term "1/(u2+u3)" becomes infinitesimal. Thus, the status "0" of the data is observed as an impedance given by the following formula (10) at the reader/writer 26.

$$Zie0 = j\omega*(L1 - M**2/L2) \quad (10)$$

The impedance is also given as the following formula (12) using the coupling constant k in the following formula (11) for the coil antennas 24 and 36.

$$k2 = M2/L1*L2 \quad (11)$$

$$Zie0 = j\omega*L1*(1 - k**2) \quad (12)$$

Since the data status "1" or "0" at the memory tag 37 is observed as the above different impedance values Zie1 or Zie0 at the reader/writer 26 as above, it is possible to easily detect the data status "1" or "0".

Further, by forming the equivalent circuit so that the impedance Z at the memory tag 37 can be changed to any of arbitrary different values between zero and infinity, the impedance Z can be observed as different impedances Zie corresponding to the different values. Since the mutual induction causes the impedance Zie at the primary side (reader/writer 26) to vary correspondingly to the load Z at the secondary side (memory tag 37), the status (data) at the memory tag 37 can be detected through detection of the impedance Zie at the primary side.

Next, the reader/writer 26 will be described in greater detail. The reader/writer 26 includes an information detector 111, control/judge unit 112 and information sender 113 in addition to the coil antenna 24, and operates in any of modes of data sending to and reception from the memory tag 37. In the send mode, the reader/writer 26 supplies information to be recorded to the memory tag 37. In the receive mode, the reader/writer 26 receives reproduced information from the memory tag 37.

The information sender 113 has a clock generating function, modulating function and a power amplifying function. It generates a clock signal of a carrier frequency and a master clock. In the send mode of the reader/writer 26, the information sender 113 make ASK modulation, for example, of a carrier wave based on transmit data supplied from the control/judge unit 112 to produce a modulating signal with which the carrier wave is power-amplified to drive the antenna 24. In the receive mode, the information sender 113 makes power amplification of the carrier wave without modulating it to drive the antenna 24.

The antenna 24 is formed from a loop-shaped antenna for both sending and reception. In the send mode, the antenna 24 produces an electromagnetic field based on the modulating signal, while producing an electromagnetic field based on the carrier wave. In any of the send and receive modes, the coil antenna 24 is inductively coupled by the electromagnetic field to the coil antenna 36 of the memory tag 37. The information detector 111 has an antenna terminal voltage detecting function and a demodulating function. Further, the control/judge unit 112 has an encoding/decoding function, a function of controlling the operation of the entire reader/writer 26, and also a function as the interface unit 23.

In the send mode, the control/judge unit 112 generates transmit information or command for supply to the memory tag 37 based on the signal received from the interface unit 23, while the information sender 113 modulates the carrier wave with the command and amplifies the power of the carrier wave to drive the antenna 24. Thus, an electromagnetic field is produced due to the carrier wave having the command added thereto. It supplies the command to the memory tag 37 while a power is supplied to the latter.

The transmit information includes an instruction to read information from the memory tag 37 and send it in one case or an instruction to record given data to the memory tag 37 and the data itself in the other case.

Even in the send mode, an electromagnetic field is continuously produced due to a carrier wave having no command added thereto and which is not modulated. The electromagnetic field allows the continuous power supply to the memory tag 37, while a response from the memory tag 37 is detected. The response has added thereto information read from the memory tag 37.

When the memory tag 37 varies the loaded condition of the antenna 36 at its own side or the power load at its own side correspondingly to the content of its response, the terminal voltage of the antenna 24 correspondingly to the variation of the load at the memory tag 37 since the antenna 24 is inductively coupled to the antenna 36 of the memory tag 37 for this while. The information detector 111 detects and demodulates the terminal voltage variation, and delivers it to the control/judge unit 112. The control/judge unit 112 make error correction of the demodulated terminal voltage variation to restore the response, and sends from the interface unit 23.

By sending the command having the transmit information added thereto in the send mode as above, the reader/writer 26 is allowed to read or record information from or to the memory tag 37. Especially, by sending a read command for a predetermined standard-defined meta data etc., the reader/writer 26 is allowed to read various meta data stored in the memory tag 37 and further send a record command designating meta data and meta data to be recorded, which are to be recorded to the memory tag 37.

Figure 62:
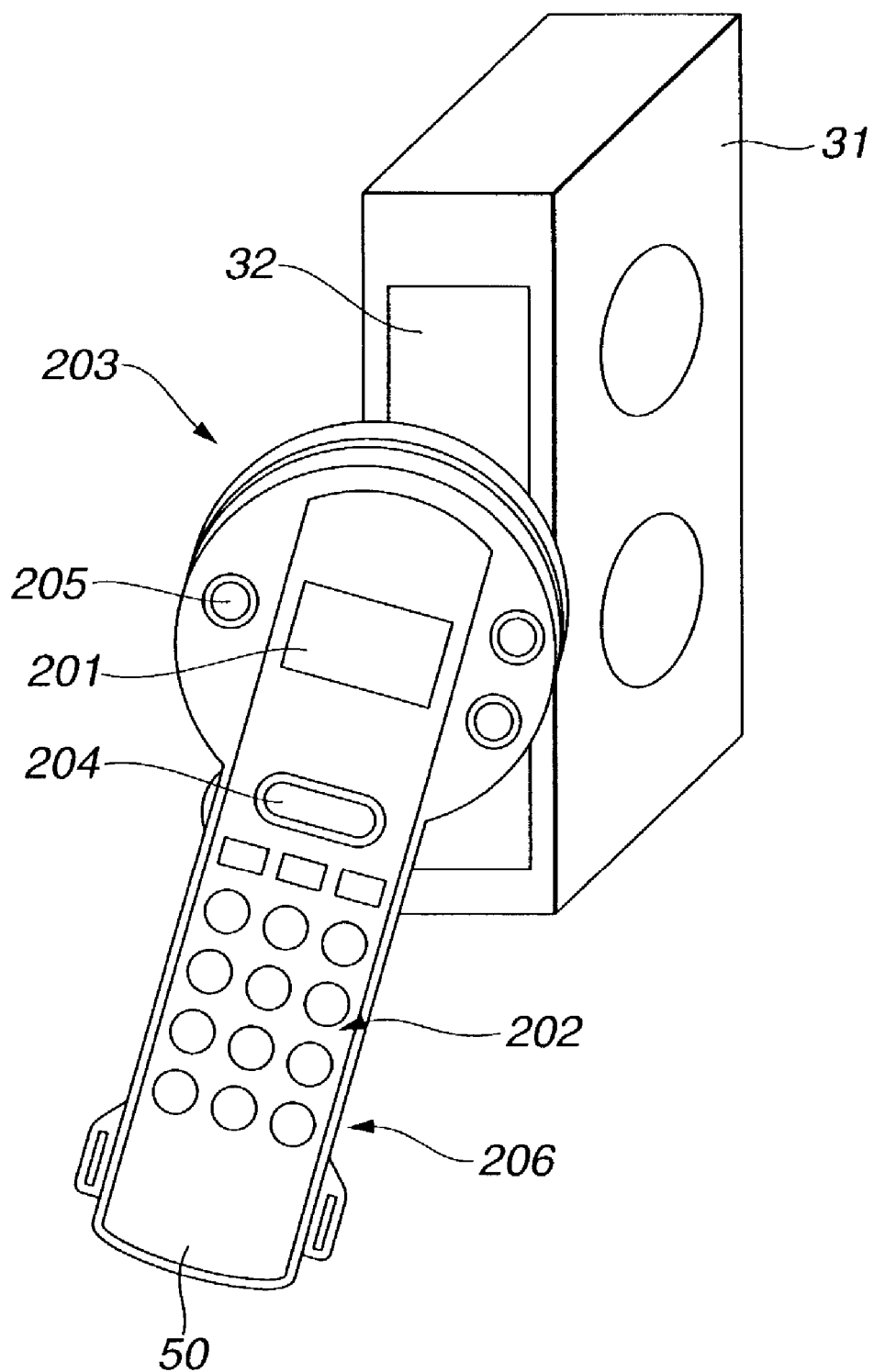
FIG. 62 explains the handy type reader/writer according to the present invention, and shows the appearance of a label with the contactless memory tag attached to a cassette half of a cassette.

Referring now to FIG. 62, there are shown the appearance and service conditions of the cassette 31 having attached thereto the label 32 incorporating the memory tag 37 and the handy-type reader/writer 50 used to send and receive data to and from the memory tag 37 in the label 32.

The cassette half of the cassette 31 has attached thereto the label 32 incorporating the memory tag 37. With the handy-type reader/writer 50 being placed over the label 32, data is written to and/or read from the memory tag 37.

As shown, the handy-type reader/writer 50 includes a head unit 203 having provided thereon the aforementioned coil antenna 24 (at the side facing the label 32 shown in FIG. 62), a display unit 201 formed from a liquid crystal display, for example, a power on/off button 205, etc., and a hand-held portion 206 having a read start button 204 and other various keys 202 disposed thereon and which is shaped for hand-holding by the user.

INDUSTRIAL APPLICABILITY

According to the present invention having been described in the foregoing, a predetermined standard-defined UMID buried in material signals to be recorded to a replaceable recording medium, or a UMID produced from information other than material signals, is written to the contactless information storage means, whereby the UMID indicating the material signals recorded in the recording medium can be acquired for use in data search, validation, etc. without actually playing back the recording medium Also, since the UMID complies with the predetermined standard, it can be used in another system. Moreover, according to the present invention, the UMID can be written to the contactless information storage means without operations such as key operation, connection or the like by extracting the UMID from material signals or generating it from information other than the material signals.

The invention claimed is:

1. An information recorder comprising:
   means for extracting a predetermined standard-defined UMID buried in material signals to be recorded to a replaceable recording medium; and
   means for writing/reading information to/from a contactless information storage means appended to or incorporated in the replaceable recording medium and which is operative responsively to an electromagnetic field to send or receive information in a contactless manner to or from outside via the electromagnetic field, the writing/reading means writing the UMID extracted by the extracting means to the contactless information storage means,
   wherein data is prevented from being written over an existing record and data is prevented from being erroneously erased by collating end of source point information recorded in the contactless information storage means with end of source point information recorded on the replaceable recording medium thereby locating an end of source point.

2. The apparatus according to claim 1, further comprising:
   means for holding the extracted predetermined standard-defined UMID; and
   an arranging means for putting the held UMID into a predetermined data format, the UMID put in the predetermined data format being written to the contactless information storage means by the writing/reading means.

3. The apparatus according to claim 2, wherein the arranging means puts the UMID into the predetermined data format with omission of a fixed part of the UMID.

4. The apparatus according to claim 2, wherein the arranging means puts the UMID into the predetermined data format with the UMID being classified according to a predetermined bit flag.

5. The apparatus according to claim 2, wherein the arranging means puts the UMID into the predetermined data format with omission of a common part of the UMID.

6. The apparatus according to claim 2, further comprising means for restoring the UMID put in the predetermined data format to the predetermined standard-defined UMID.

7. An information recording method comprising steps of:
   extracting a predetermined standard-defined UMID buried in material signals to be recorded to a replaceable recording medium; and
   writing/reading information to/from a contactless information storage means appended to or incorporated in the replaceable recording medium and which is operative responsively to an electromagnetic field to send or receive information in a contactless manner to or from outside via the electromagnetic field, the extracted UMID being written to the contactless information storage means,
   wherein data is prevented from being written over an existing record and data is prevented from being erroneously erased by collating end of source point information recorded in the contactless information storage means with end of source point information recorded on the replaceable recording medium thereby locating an end of source point.

8. The method according to claim 7, further comprising steps of:
   holding the extracted predetermined standard-defined UMID; and
   putting the held UMID into a predetermined data format, the UMID put in the predetermined data format being written to the contactless information storage means.

9. The method according to claim 8, wherein the arranging means puts the UMID into the predetermined data format with omission of a fixed part of the UMID.

10. The method according to claim 8, wherein the arranging means puts the UMID into the predetermined data format with the UMID being classified according to a predetermined bit flag.

11. The method according to claim 8, wherein the arranging means puts the UMID into the predetermined data format with omission of a common part of the UMID.

12. The method according to claim 8, further comprising means for restoring the UMID put in the predetermined data format to the predetermined standard-defined UMID.

13. An information recorder comprising:
    means for generating, from information other than material signals to be recorded to a replaceable recording medium, a UMID indicating the material signals; and
    means for writing/reading information to/from a contactless information storage means appended to or incorporated in the replaceable recording medium and which is operative responsively to an electromagnetic field to send or receive information in a contactless manner to or from outside via the electromagnetic field, the writing/reading means writing the generated UMID to the contactless information storage means,
    wherein data is prevented from being written over an existing record and data is prevented from being erroneously erased by collating end of source point information recorded in the contactless information storage means with end of source point information recorded on the replaceable recording medium thereby locating an end of source point.

14. The apparatus according to claim 13, further comprising:
    an arranging means for putting the generated UMID into a predetermined data format, the UMID put in the predetermined data format being written to the contactless information storage means by the writing/reading means.

15. An information recording method comprising steps of:
    generating, from information other than material signals to be recorded to a replaceable recording medium, a UMID indicating the material signals; and
    writing/reading information to/from a contactless information storage means appended to or incorporated in the replaceable recording medium and which is operative responsively to an electromagnetic field to send or receive information in a contactless manner to or from outside via the electromagnetic field, the generated UMID being written to the contactless information storage means,
    wherein data is prevented from being written over an existing record and data is prevented from being erroneously erased by collating end of source point information recorded in the contactless information storage means with end of source point information recorded on the replaceable recording medium thereby locating an end of source point.

16. The method according to claim 15, further comprising a step of:
    putting the generated UMID into a predetermined data format, the UMID put in the predetermined data format being written to the contactless information storage means.

17. An information recording system comprising:

means for writing/reading information to/from a contactless information storage means appended to or incorporated in the replaceable recording medium and which is operative responsively to an electromagnetic field to send or receive information in a contactless manner to or from outside via the electromagnetic field;

an information recorder for writing, to the contactless information storage means by the writing/reading means, a UMID extracted from material signals to be recorded and indicating the material signals recorded to the recording medium or a UMID generated from information other than the material signals to be recorded to the recording medium and indicating the material signals; and a UMID storage unit for storing a UMID read from the contactless information storage means appended to or incorporated in each of a plurality of recording mediums, wherein data is prevented from being written over an existing record and data is prevented from being erroneously erased by collating end of source point information recorded in the contactless information storage means with end of source point information recorded on the replaceable recording medium thereby locating an end of source point.

18. An information recording method comprising steps of:

writing a UMID extracted from material signals to be recorded and indicating the material signals or a UMID generated from information other than the material signals to be recorded to the recording medium and indicating the material signals to a contactless information storage means appended to or incorporated in the replaceable recording medium and which is operative responsively to an electromagnetic field to send or receive information in a contactless manner to or from outside via the electromagnetic field; and storing the UMID read from the contactless information storage means appended to or incorporated in each of a plurality of recording mediums, wherein data is prevented from being written over an existing record and data is prevented from being erroneously erased by collating end of source point information recorded in the contactless information storage means with end of source point information recorded on the replaceable recording medium thereby locating an end of source point.

* * * * *